US009566978B2

(12) United States Patent
Yang et al.

(10) Patent No.: US 9,566,978 B2
(45) Date of Patent: *Feb. 14, 2017

(54) VEHICLE AND DRIVE CONTROL METHOD FOR THE SAME

(71) Applicant: BYD COMPANY LIMITED, Shenzhen, Guangdong (CN)

(72) Inventors: Dongsheng Yang, Guangdong (CN); Yubo Lian, Guangdong (CN); Jintao Zhang, Guangdong (CN); Hongbin Luo, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 68 days.

This patent is subject to a terminal disclaimer.

(21) Appl. No.: 14/527,600

(22) Filed: Oct. 29, 2014

(65) Prior Publication Data
US 2015/0210266 A1   Jul. 30, 2015

(30) Foreign Application Priority Data
Jan. 30, 2014 (CN) .......................... 2014 1 0044630

(51) Int. Cl.
*B60L 9/00* (2006.01)
*B60L 11/00* (2006.01)
(Continued)

(52) U.S. Cl.
CPC ............ *B60W 20/106* (2013.01); *B60K 6/387* (2013.01); *B60K 6/442* (2013.01); *B60K 17/356* (2013.01);
(Continued)

(58) Field of Classification Search
None
See application file for complete search history.

(56) References Cited

U.S. PATENT DOCUMENTS 4,132,133 A   1/1979   Ballendux
4,610,177 A   9/1986   Mahoney
(Continued)

FOREIGN PATENT DOCUMENTS

CN   2602978 Y   2/2004
CN   1618644 A   5/2005
(Continued)

OTHER PUBLICATIONS

Chinese Search Report dated May 26, 2015, issued in related Chinese Application No. 201510024072.4 (7 pages).
(Continued)

*Primary Examiner* — Aaron L Troost
*Assistant Examiner* — Lail Kleinman

(57) ABSTRACT

A vehicle and a drive control method for the same are provided. The vehicle includes an engine unit, a transmission unit configured to selectively coupled with the engine unit, a first motor generator coupled with the transmission unit, an output unit configured to transmit a power transmitted by the transmission unit to at least one of front and rear wheels of the vehicle, a power switching device configured to adjust a power transmission between the transmission unit and the output unit, a second motor generator configured to drive the at least one of the front and rear wheels, and a power battery coupled with the first and second motor generators respectively. The drive control method includes: acquiring an operation parameter of the vehicle; and performing a drive control of the vehicle based on the operation parameter and an operation mode selected from operation modes of the vehicle.

16 Claims, 24 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60W 20/00* (2016.01)
  *B60K 6/387* (2007.10)
  *B60K 6/442* (2007.10)
  *B60W 10/02* (2006.01)
  *B60W 10/06* (2006.01)
  *B60W 10/08* (2006.01)
  *B60W 10/26* (2006.01)
  *B60K 17/356* (2006.01)

(52) U.S. Cl.
  CPC .............. *B60W 10/02* (2013.01); *B60W 10/06* (2013.01); *B60W 10/08* (2013.01); *B60W 10/26* (2013.01); *B60W 10/13* (2016.01); *B60W 20/20* (2013.01); *B60W 2510/244* (2013.01); *B60W 2520/10* (2013.01); *B60W 2540/10* (2013.01); *B60W 2550/142* (2013.01); *Y02T 10/6286* (2013.01); *Y10S 903/93* (2013.01)

(56) References Cited

U.S. PATENT DOCUMENTS

| | | |
|---|---|---|
| 4,676,115 A | 6/1987 | Morscheck et al. |
| 5,586,613 A | 12/1996 | Ehsani |
| 5,890,392 A | 4/1999 | Ludanek et al. |
| 7,296,648 B2 | 11/2007 | Tatara et al. |
| 7,395,889 B2 | 7/2008 | Sugiyama et al. |
| 7,730,982 B2 | 6/2010 | Hidaka et al. |
| 8,505,400 B2 | 8/2013 | Mellet et al. |
| 8,523,734 B2 | 9/2013 | Mepham et al. |
| 8,579,059 B2 | 11/2013 | Teraya |
| 2002/0088291 A1 | 7/2002 | Bowen |
| 2002/0177504 A1 | 11/2002 | Pels et al. |
| 2003/0078134 A1 | 4/2003 | Kojima et al. |
| 2004/0204286 A1 | 10/2004 | Stridsberg |
| 2005/0139035 A1 | 6/2005 | Lee et al. |
| 2005/0241437 A1 | 11/2005 | Gray, Jr. et al. |
| 2007/0102211 A1 | 5/2007 | Nozaki et al. |
| 2007/0175723 A1 | 8/2007 | Blessing et al. |
| 2008/0070745 A1 | 3/2008 | Ogata |
| 2010/0031910 A1 | 2/2010 | Seufert et al. |
| 2010/0120580 A1 | 5/2010 | Mepham et al. |
| 2010/0320016 A1 | 12/2010 | Wang et al. |
| 2011/0098151 A1 | 4/2011 | Ziemer |
| 2011/0245033 A1* | 10/2011 | Sato .............. B60K 6/442 477/3 |
| 2011/0263379 A1 | 10/2011 | Liang et al. |
| 2012/0010041 A1 | 1/2012 | Soliman et al. |
| 2012/0053011 A1 | 3/2012 | Onomura et al. |
| 2012/0160044 A1 | 6/2012 | Kahl |
| 2012/0245781 A1 | 9/2012 | Kanamori et al. |
| 2012/0245783 A1 | 9/2012 | Tamagawa |
| 2012/0303201 A1 | 11/2012 | Tsuneishi et al. |
| 2012/0310461 A1 | 12/2012 | Maruyama et al. |
| 2013/0068056 A1 | 3/2013 | Van Batavia et al. |
| 2013/0090202 A1* | 4/2013 | Hiraiwa .............. B60K 6/445 475/5 |
| 2013/0166118 A1* | 6/2013 | Kim .............. B60W 10/06 701/22 |
| 2013/0192417 A1 | 8/2013 | Fujita et al. |
| 2013/0231848 A1 | 9/2013 | Roberts et al. |
| 2013/0288854 A1 | 10/2013 | Kobayashi |
| 2013/0345019 A1 | 12/2013 | Kaltenbach et al. |
| 2014/0128205 A1 | 5/2014 | Phillips et al. |
| 2015/0291154 A1 | 10/2015 | Kaltenbach et al. |

FOREIGN PATENT DOCUMENTS

| | | |
|---|---|---|
| CN | 1637327 A | 7/2005 |
| CN | 1699091 A | 11/2005 |
| CN | 1728192 A | 2/2006 |
| CN | 1275790 C | 9/2006 |
| CN | 1876460 A | 12/2006 |
| CN | 101209675 A | 7/2008 |
| CN | 101219662 A | 7/2008 |
| CN | 101380887 A | 3/2009 |
| CN | 101400536 A | 4/2009 |
| CN | 201214410 Y | 4/2009 |
| CN | 101450609 A | 6/2009 |
| CN | 101516708 A | 8/2009 |
| CN | 101549634 A | 10/2009 |
| CN | 201390137 Y | 1/2010 |
| CN | 101659203 A | 3/2010 |
| CN | 201511806 U | 6/2010 |
| CN | 101973207 A | 2/2011 |
| CN | 101983150 A | 3/2011 |
| CN | 102009587 A | 4/2011 |
| CN | 201907400 U | 7/2011 |
| CN | 102259583 A | 11/2011 |
| CN | 102259584 A | 11/2011 |
| CN | 102303517 A | 1/2012 |
| CN | 102371893 A | 3/2012 |
| CN | 102381178 A | 3/2012 |
| CN | 202242966 U | 5/2012 |
| CN | 102490588 A | 6/2012 |
| CN | 202319954 U | 7/2012 |
| CN | 202345366 U | 7/2012 |
| CN | 101450608 B | 9/2012 |
| CN | 102666169 A | 9/2012 |
| CN | 102673365 A | 9/2012 |
| CN | 102673382 A | 9/2012 |
| CN | 102678839 A | 9/2012 |
| CN | 102678871 A | 9/2012 |
| CN | 202429065 U | 9/2012 |
| CN | 102781698 A | 11/2012 |
| CN | 202641355 U | 1/2013 |
| CN | 202656855 U | 1/2013 |
| CN | 102910066 A | 2/2013 |
| CN | 102951005 A | 3/2013 |
| CN | 102975607 A | 3/2013 |
| CN | 103029558 A | 4/2013 |
| CN | 103144528 A | 6/2013 |
| CN | 103332102 A | 10/2013 |
| CN | 203283020 U | 11/2013 |
| CN | 203305832 U | 11/2013 |
| CN | 103527726 A | 1/2014 |
| CN | 103697118 A | 4/2014 |
| CN | 203516615 U | 4/2014 |
| CN | 103832263 A | 6/2014 |
| CN | 103867657 A | 6/2014 |
| CN | 103912640 A | 7/2014 |
| CN | 103921674 A | 7/2014 |
| CN | 203876574 U | 10/2014 |
| CN | 203962884 U | 11/2014 |
| CN | 102555769 B | 12/2014 |
| CN | 204095490 U | 1/2015 |
| DE | 10239540 A1 | 3/2004 |
| DE | 102008002381 A1 | 12/2009 |
| DE | 102011115780 A1 | 4/2012 |
| DE | 102011086743 A1 | 5/2013 |
| DE | 102011089467 | 6/2013 |
| DE | 102013201744 A1 | 8/2014 |
| EP | 1122109 A2 | 8/2001 |
| EP | 2210758 A2 | 7/2010 |
| EP | 2255986 A1 | 12/2010 |
| EP | 2279922 A1 | 2/2011 |
| EP | 2385270 A1 | 11/2011 |
| EP | 2390127 A1 | 11/2011 |
| EP | 2439094 A1 | 4/2012 |
| EP | 2474434 A1 | 7/2012 |
| EP | 2508378 A1 | 10/2012 |
| EP | 2517938 A1 | 10/2012 |
| EP | 2641802 A2 | 9/2013 |
| EP | 2738030 A2 | 6/2014 |
| JP | H0993714 A | 4/1997 |

(56) References Cited

FOREIGN PATENT DOCUMENTS

| | | |
|---|---|---|
| JP | 2013-126365 A | 6/2013 |
| JP | 2013-240166 A | 11/2013 |
| WO | WO 99/21263 A2 | 4/1999 |
| WO | WO 2008/092353 A1 | 8/2008 |
| WO | WO 2010/054210 A1 | 5/2010 |
| WO | 2011138308 A1 | 11/2011 |
| WO | WO 2013/014510 A1 | 1/2013 |
| WO | WO 2013/031491 A1 | 3/2013 |

OTHER PUBLICATIONS

Chinese Search Report dated May 26, 2015, issued in related Chinese Application No. 201510024073.9 (7 pages).
Chinese Search Report dated May 26, 2015, issued in related Chinese Application No. 201510024171.2 (7 pages).
Chinese Search Report dated May 26, 2015, issued in related Chinese Application No. 201510024172.7 (7 pages).
Chinese Search Report dated May 26, 2015, issued in related Chinese Application No. 201510024198.1 (7 pages).
Chinese Search Report dated May 27, 2015, issued in related Chinese Application No. 201510024215.1 (8 pages).
Chinese Search Report dated May 27, 2015, issued in related Chinese Application No. 201510024314.X (8 pages).
PCT International Search Report dated Jan. 16, 2015, issued in related International Application No. PCT/CN2014/089831 (15 pages).
PCT International Search Report dated Jan. 19, 2015, issued in related International Application No. PCT/CN2014/089840 (15 pages).
PCT International Search Report dated Jan. 21, 2015, issued in related International Application No. PCT/CN2014/089837 (14 pages).
PCT International Search Report dated Jan. 21, 2015, issued in related International Application No. PCT/CN2014/089846 (14 pages).
PCT International Search Report dated Jan. 21, 2015, issued in related International Application No. PCT/CN2014/089847 (13 pages).
PCT International Search Report dated Jan. 26, 2015, issued in related International Application No. PCT/CN2014/089841 (14 pages).
PCT International Search Report dated Jan. 28, 2015, issued in related International Application No. PCT/CN2014/089829 (14 pages).
PCT International Search Report dated Jan. 28, 2015, issued in related International Application No. PCT/CN2014/089836 (14 pages).
European Search Report dated Dec. 10, 2015, issued in related European Patent Application No. 15158696.3 (8 pages).
European Search Report dated Dec. 10, 2015, issued in related European Patent Application No. 15158701.1 (8 pages).
European Search Report dated Feb. 2, 2016, issued in related European Patent Application No. 15158686.4 (9 pages)
Non-Final Office Action dated Jun. 2, 2016, issued in related U.S. Appl. No. 14/526,816 (8 pages).
Non-Final Office Action dated Mar. 8, 2016, issued in related U.S. Appl. No. 14/527,410 (21 pages).
Non-Final Office Action dated May 31, 2016, issued in related U.S. Appl. No. 14/527,446 (9 pages).
Non-Final Office Action dated May 5, 2016, issued in related U.S. Appl. No. 14/527,496 (8 pages).
Non-Final Office Action dated Sep. 24, 2015, issued in related U.S. Appl. No. 14/527,522 (17 pages).
Final Office Action dated Jun. 28, 2016, issued in related U.S. Appl. No. 14/527,410 (21 pages).
Extended European Search Report for European Application No. 15158699.7 dated Jun. 29, 2016.

* cited by examiner rotating speed of engine unit

VEHICLE AND DRIVE CONTROL METHOD FOR THE SAME

CROSS-REFERENCE TO RELATED APPLICATION

This application claims priority to and benefits of Chinese Patent Application Serial No. 201410044630.9, filed with the State Intellectual Property Office of P. R. China on Jan. 30, 2014. The entire content of the above-referenced application is incorporated herein by reference.

FIELD

The present disclosure relates to the field of vehicles, and more particularly to a vehicle and a drive control method for the vehicle.

BACKGROUND

To reduce energy consumption, development and utilization of energy-efficient vehicles have become a trend. As a new energy vehicle, a hybrid vehicle is driven by at least one of an internal combustion engine and a motor and has various operation modes, and consequently may operate with improved transmission efficiency and fuel economic efficiency.

However, in the related art, the power transmission system in the hybrid vehicle is generally complex in structure, bulky, low in transmission efficiency, and complicated in control strategy. For example, a plurality of gear shift actuating elements needs to be controlled simultaneously during the gear shifting or mode switching. In addition, the power transmission system in the related art may not meet different driving requirements. For example the dynamic property and economic efficiency of a vehicle are subjected to certain limitations, and trafficability of the terrain makes it difficult to reduce energy consumption and emissions simultaneously.

SUMMARY

Embodiments of the present disclosure seek to solve at least one of the problems existing in the related art to at least some extent.

Embodiments of the present disclosure provide a drive control method for a vehicle. The vehicle includes an engine unit, a transmission unit configured to selectively coupled with the engine unit, a first motor generator coupled with the transmission unit, an output unit configured to transmit power transmitted by the transmission unit to at least one of front and rear wheels of the vehicle, a power switching device configured to enable or interrupt power transmission between the transmission unit and the output unit, a second motor generator configured to drive the at least one of the front and rear wheels, and a power battery coupled with the first and second motor generators respectively. The drive control method includes: acquiring an operation parameter of the vehicle; and performing a drive control of the vehicle based on the operation parameter and an operation mode selected from operation modes of the vehicle.

Embodiments of the present disclosure further provide a vehicle. The vehicle includes: an engine unit, a transmission unit configured to selectively coupled with the engine unit, a first motor generator coupled with the transmission unit, an output unit configured to transmit power transmitted by the transmission unit to at least one of front and rear wheels of the vehicle, a power switching device configured to adjust a power transmission between the transmission unit and the output unit, a second motor generator configured to drive the at least one of the front and rear wheels of the vehicle, a power battery coupled with the first and second motor generators respectively, and a controller configured to acquire an operation parameter of the vehicle, and to perform a drive control of the vehicle based on the operation parameter and an operation mode selected from operation modes of the vehicle.

With the drive control method for the vehicle and the vehicle according to embodiments of the present disclosure, the power output by at least one of the engine unit and the first motor generator may be output to the output unit via the power switching device, and then output by the output unit to at least one of the front and rear wheels of the vehicle, and then the drive control of the vehicle is performed based on the operation parameter and the operation mode selected from operation modes of the vehicle. Meanwhile, by means of the provision of the second motor generator, the second motor generator may compensate for the torque of the front wheels or the rear wheels, and may also cooperate with the engine unit and the first motor generator to drive the vehicle, thus increasing the types of the operation modes of the vehicle. Therefore, the vehicle may adapt to different operating conditions, thus achieving better fuel, ensuring the dynamic property of the vehicle, and enhancing the economic efficiency, ride and steering capability of the vehicle while reducing the emissions of harmful gases.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
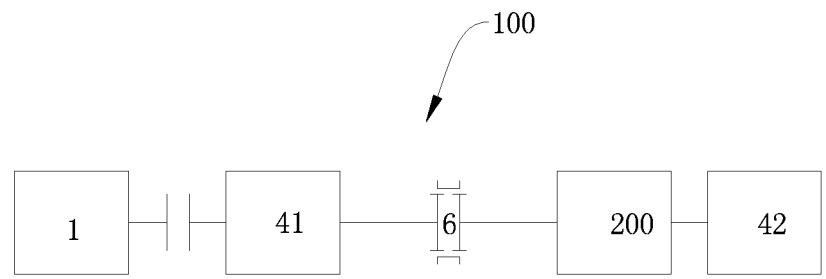
FIG. 1 is a schematic diagram of an exemplary power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, it should be understood that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by those skilled in the art according to the detail embodiment of the present disclosure.

Referring to the following descriptions and drawings, these and other aspects of the embodiments of the present disclosure will be apparent. In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure include all the variants, modifications and their equivalents within the spirit and scope of the present disclosure as defined by the claims.

In the related art, a series-parallel hybrid electric vehicle operates in a series mode and in a parallel mode simultaneously. In the series mode (series drive mode), an engine unit (i.e. a power generated by the engine unit) drives a motor generator to generate electricity. In the parallel mode (parallel drive mode), a part of the power generated by the engine unit drives wheels via a mechanical transmission, and the other part of the power generated by the engine unit drives the motor generator to generate electricity. The electric energy generated by the motor generator is transmitted to a motor to drive the vehicle, or transmitted to a battery for storage. The basic concept of its control strategy is that when the vehicle is running at a low speed, a drive system of the vehicle operates in the series mode; and when vehicle is running at a high speed, the drive system of the vehicle operates in the parallel mode.

In addition, a typical series-parallel hybrid power system of the electric vehicle is characterized in that each of the engine unit and a motor driving unit has a set of mechanical transmission mechanisms, and the two sets of mechanical transmission mechanisms are coupled via a planetary wheel structure, thus adjusting a rotating speed relationship between the engine unit and the motor. Therefore, it is possible to perform a flexible drive control on a power assembly, and the rotating speed and output power of the engine unit may be adjusted according to operating conditions of the electric vehicle.

However, the hybrid power system in the related art adopts a series or parallel drive system, thus resulting in various disadvantages. For example, when the vehicle having the series drive system is running at a high speed, the engine unit operates in a good economic region, however, there are too many energy transfer links, such that the overall efficiency of the vehicle is low. When the vehicle having the parallel drive system is running at a low speed, due to the impact of the remaining electric quantity, the engine unit helps the motor to drive the vehicle and operates in a low-efficiency region, such that the fuel consumption and emissions are high. The dynamic property, trafficability and steering performance of the vehicle having the drive system in the parallel mode and the series mode are poor. In addition, from the viewpoint of economic efficiency, an operation mode consisting of a single drive mode is monotonic, and the adjustment of the operating ranges of the engine unit and the motor is limited, such that it is impossible to ensure that both the engine unit and the motor operate in an economic region. During the braking of the vehicle, due to the power limitations of the motor, a small proportion of energy may be recovered.

Embodiments of the present disclosure provide a vehicle and a drive control method for the vehicle. With the vehicle and the drive control method according to embodiments of the present disclosure, based on a series-parallel four-wheel drive hybrid electric vehicle, it is possible to automatically switch between a front-drive mode, a rear-drive mode, and a four-wheel drive mode; to automatically switch between a series mode, a parallel mode, and a series-parallel mode; and to manually switch between an eco (economy) mode and a sport mode.

In order to facilitate understanding of the vehicle and the drive control method according to embodiments of the present disclosure, a power transmission system of the vehicle is first described below.

A power transmission system 100 according to embodiments of the present disclosure will be described in detail below with reference to FIGS. 1-19. The power transmission system 100 is applicable to a vehicle, such as a hybrid vehicle with an engine unit 1 and a motor generator.

As shown in FIGS. 1-2 and 18-19, the power transmission system 100 according to embodiments of the present disclosure may include an engine unit 1, a transmission unit 2a, a first motor generator 41, a second motor generator 42, an output unit 5 and a power switching device (e.g., a synchronizer 6, a clutch 9).

The transmission unit 2a is configured to selectively coupled with the engine unit 1. The engine unit 1 may selectively output a power generated by the engine unit 1 to the transmission unit 2a via the clutch 9. Alternatively, the transmission unit 2a may also output, for example, a starting torque from the first motor generator 41 to the engine unit 1, so as to start the engine unit 1. In the context of the present disclosure, the phase "the transmission unit 2a is coupled with the engine unit 1" means that the power can be transferred between the engine unit 1 and the transmission unit 2a directly or via other components, and that the coupling between the transmission unit 2a and the engine unit 1 is also referred to as a power coupling.

The engine unit 1 generates energy by mixing liquid or gaseous fuel and air and then combusting the mixed fuel and air therein, and the energy is converted into mechanical energy. The engine unit 1 of the vehicle may adopt a four-stroke gasoline or diesel engine. The engine unit 1 may generally include a block, a crank-connecting rod mechanism, a valve mechanism, a supply system, an ignition system, a cooling system, a lubrication system and the like.

The block of the engine unit 1 can be an assembled body of individual mechanisms and systems of the engine unit 1. The crank-connecting rod mechanism may convert the linear reciprocating motion of a piston into the rotary motion of a crankshaft, and output a drive force. The valve mechanism is configured to charge or discharge a gas at a predetermined time, so as to ensure the smooth performing of each cycle of the engine unit 1. The supply system may supply a mixture of oil and gas to a cylinder for combustion. The cooling system is configured to cool the engine unit 1, so as to ensure that the operating temperature of the engine unit 1 is within a suitable temperature range. The lubrication system is configured to lubricate individual motion pairs in the engine unit 1, so as to reduce the wear and energy loss.

It would be appreciated that the engine unit 1 as well as structures and operation principles of individual sub-systems and sub-mechanisms of the engine unit 1 are well known to those skilled in the art, so the detailed description thereof will be omitted here for clarity purpose.

The first motor generator 41 is coupled with the transmission unit 2a. In other words, the first motor generator 41 cooperates with the transmission unit 2a to transmit the power. That is, the first motor generator 41 may drive the transmission unit 2a, while the transmission unit 2a may drive the first motor generator 41.

For example, the engine unit 1 may output at least a part of the power generated thereby to the first motor generator 41 via the transmission unit 2a, and the first motor generator 41 may generate electricity and convert mechanical energy into electric energy to be stored in an energy storage component such as a battery pack. As another example, the first motor generator 41 may convert electric energy from the battery pack into mechanical energy, and output the mechanical energy to the output unit 5 via the transmission unit 2a to drive the vehicle.

The first motor generator 41 is a motor having functions of both a motor and a generator. As used herein, the term "motor generator" refers to a motor having functions of both a motor and a generator, unless specified otherwise.

The output unit 5 is configured to transfer a power transmitted by the transmission unit 2a to wheels 200 (e.g. one of front and rear wheels 210 and 220) of the vehicle. In short, the output unit 5 is configured to output the power from the transmission unit 2a.

The power switching device such as the synchronizer 6 is configured to adjust a power transmission between the output unit 5 and the transmission unit 2a. In other words, the power switching device may output the power output from the transmission unit 2a to at least one of front and rear wheels 210, 220 via the output unit 5, or the power switching device may also disconnect the transmission unit 2a from the output unit 5 and the transmission unit 2a may not output the power to the front and/or rear wheels 210, 220 via the output unit 5 directly.

As shown in FIGS. 1-13, the second motor generator 42 is configured to drive the front and/or rear wheels 210, 220.

Therefore, when the output unit 5 is configured to drive the front wheels 210 and the second motor generator 42 is also configured to drive the front wheels 210, the vehicle having the power transmission system 100 may be operable as a two-wheel drive vehicle. When the output unit 5 is configured to drive the front wheels 210 and the second motor generator 42 is configured to drive the rear wheels 220, the vehicle having the power transmission system 100 may be operable as a four-wheel drive vehicle, and may switch between a two-wheel drive mode and a four-wheel drive mode. When the output unit 5 is configured to drive the front wheels 210 and the rear wheels 220 and the second motor generator 42 is configured to drive the front wheels 210 or the rear wheels 220, the vehicle having the power transmission system 100 may be operable as a four-wheel drive vehicle.

With the power transmission system 100 according to embodiments of the present disclosure, the power output by at least one of the engine unit 1 and the first motor generator 41 may be output to the output unit 5 via the power switching device, and then output by the output unit 5 to the front and/or rear wheels 210, 220 of the vehicle.

Meanwhile, because of the provision of the second motor generator 42, the second motor generator 42 may compensate for the torque of the front wheels 210 or the rear wheels 220, and may also cooperate with the engine unit 1 and the first motor generator 41 to drive the vehicle, thus increasing the number of operation modes of the vehicle. Therefore, the vehicle may be configured to different operating conditions, thus achieving better fuel economic efficiency while reducing the emission of harmful gases.

In some embodiments, as shown in FIGS. 1-16, the power switching device is configured as a synchronizer 6, and the synchronizer 6 is configured to selectively synchronize the output unit 5 with the transmission unit 2a, so as to output the power via the output unit 5 to drive the wheels 200 of the vehicle.

Here, the function of the synchronizer 6 may be to synchronize the output unit 5 and the transmission unit 2a, i.e. under the action of the synchronizer 6, the output unit 5 and the transmission unit 2a may operate synchronously, such that the power from the transmission unit 2a may be output with the output unit 5 as a power output terminal. However, when the transmission unit 2a and the output unit 5 are not synchronized by the synchronizer 6, the power from the transmission unit 2a may not be output to the wheels 200 via the output unit 5 directly.

In short, the synchronizer 6 functions to switch the power. That is, when the synchronizer 6 is in an engaged state, the power from the transmission unit 2a may be output via the output unit 5 to drive the wheels 200; and when the synchronizer 6 is in a disengaged state, the transmission unit 2a may not transmit the power to the wheels 200 via the output unit 5. In this way, by controlling the synchronizer 6 to switch between the engaged state and the disengaged state, the switching of the drive mode of the vehicle may be realized.

Compared to a clutch, the synchronizer 6 has the following advantages.

When the synchronizer 6 is in a disengaged state, the power transmission between the engine unit 1, the transmission unit 2a, the first motor generator 41 and the wheels 200 can be severed, such that operations such as electricity generation, driving, and power/torque transmission may not influence each other, which is very important in reducing the energy consumption of the vehicle. The synchronizer 6 may meet this requirement well, while incomplete separation of friction plates usually occurs in the clutch, thus increasing the friction loss and energy consumption.

When the synchronizer 6 is in an engaged state, the synthesized (coupled) driving force of the engine unit 1 and the first motor generator 41 can be transferred to the wheels 200 after the torque multiplication of the transmission unit 2a, or the driving force of the wheels 200 can be transferred to the first motor generator 41 to generate electricity, both of which require that the power coupling device transmit a large torque and have high stability. The synchronizer 6 may meet this requirement well. However, if a clutch is used, an oversize clutch which does not match with the entire system (including an engine, a transmission, a motor, etc.) needs to be designed, thus increasing the arrangement difficulty, the weight and the cost, and having the risk of slipping under the action of an impact torque.

Moreover, the first motor generator 41 may adjust the speed of the transmission unit 2a, for example, the first motor generator 41 may adjust the speed of the transmission unit 2a with the rotating speed of the output unit 5 as a target value, so as to match the speed of the transmission unit 2a with the speed of the output unit 5 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle. Furthermore, the power transmission system 100 according to embodiments of the present disclosure is compact in structure and easy to control.

In some embodiments, as shown in FIGS. 2, 6, 7, 14, 15, 17, and 18, the transmission unit 2a includes a transmission power input part 21a and a transmission power output part 22a, the transmission power input part 21a is selectively engaged with the engine unit 1, to transmit the power generated by the engine unit 1. The transmission power output part 22a is configured to output the power from the transmission power input part 21a to the output unit 5 via the synchronizer 6.

As shown in FIGS. 2, 6, 7, 14, 15, 17, and 18, the transmission power input part 21a includes an input shaft (e.g., a first input shaft 21, a second input shaft 22) and a driving gear 25 mounted on the input shaft, the input shaft is selectively engaged with the engine unit 1, to transmit the power generated by the engine unit 1. In other words, when the engine unit 1 needs to output the power to the input shaft, the engine unit 1 may be engaged with the input shaft, such that the power output by the engine unit 1 may be transferred to the input shaft. The engagement between the engine unit 1 and the input shaft may be achieved by means of a clutch (e.g., a dual clutch 31), which will be described in detail below.

As shown in FIGS. 2, 6, 7, 14, 15, 17, and 18, the transmission power output part 22a includes an output shaft 24, and a driven gear 26 mounted on the output shaft 24 and configured to mesh with the driving gear 25 on the input shaft.

As shown in FIGS. 2-5, the output shaft 24 is configured to output at least a part of the power transmitted by the input shaft. Specifically, the output shaft 24 and the input shaft cooperate with each other to transmit the power. For example, the power transmission between the output shaft 24 and the input shaft may be realized by means of the driving gear 25 and the driven gear 26.

It would be appreciated that the power transmission between the output shaft 24 and the input shaft is not limited to this. In some embodiments, the manner of power transmission between the output shaft 24 and the input shaft may be selected according to practical applications. For example, the power transmission between the output shaft 24 and the input shaft may also be realized by means of a belt transmission mechanism, or a rack and pinion transmission mechanism.

In some embodiments, the output shaft 24 is configured to transmit at least a part of the power on the input shaft. For example, when the power transmission system 100 is in a certain transmission mode where, for example, the first motor generator 41 generates electricity, a part of the power on the input shaft may be used for the electricity generating of the first motor generator 41, and the other part of the power on the input shaft may be used to drive the vehicle to run. Certainly, all power on the input shaft may be used for the electricity generation of the first motor generator 41.

In some embodiments, the power transmission between the first motor generator 41 and one of the input shaft and the output shaft 24 may be direct or indirect. As used herein, the term "direct power transmission" means that the first motor generator 41 is directly coupled with a corresponding one of the input shaft and the output shaft 24 for power transmission, without using any intermediate transmission components such as a speed changing device, a clutch device, or a transmission device. For example, an output terminal of the first motor generator 41 can be directly fixed with one of the input shaft and the output shaft 24. The direct power transmission has the advantages of eliminating the intermediate transmission components and reducing the energy loss during the power transmission.

As used herein, the term "indirect power transmission" refers to any other power transmission manners other than the direct power transmission, for example, the power transmission by means of intermediate transmission components such as a speed changing device, a clutch device, or a transmission device. The indirect power transmission has the advantages of enabling convenient arrangement and achieving the desired transmission ratio by providing a speed changing device and the like.

The output unit 5 may be used as a power output terminal of the output shaft 24 for outputting the power on the output shaft 24. The output unit 5 and the output shaft 24 may rotate differentially (i.e., at different speed) and not synchronously. In other words, there can be a rotating speed difference between the output unit 5 and the output shaft 24, and the output unit 5 and the output shaft 24 are not fixed with each other.

The synchronizer 6 is disposed on the output shaft 24. Specifically, as shown in FIGS. 1-6, the synchronizer 6 may include a splined hub 61 and a synchronizing sleeve 62. The splined hub 61 may be fixed on the output shaft 24, such that the splined hub 61 can rotate synchronously with the output shaft 24, while the synchronizing sleeve 62 may move in an axial direction of the output shaft 24 relative to the splined hub 61 so as to selectively engage with the output unit 5, such that the output unit 5 can rotate synchronously with the output shaft 24. In this way, the power may be transferred from the output unit 5 to the front and/or rear wheels 210, 220, thus driving the wheels 200. However, it would be appreciated that the structure of the synchronizer 6 is not limited to this.

With the power transmission system 100 according to embodiments of the present disclosure, the power output by at least one of the engine unit 1 and the first motor generator 41 may be output from the output unit 5 by the engagement of the synchronizer 6, such that the power transmission system 100 is compact in structure and easy to control. Moreover, during the switching of the operating conditions of the vehicle, it is possible for the synchronizer 6 to switch from a disengaged state to an engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss. Furthermore, the radial friction force is much smaller than the average value in the related art or even there is no radial friction force during the engagement of the synchronizer 6.

In some embodiments, the output unit 5 is configured to drive a first pair of wheels, there is a pair of second motor generators 42 configured to drive the first pair of wheels. Further, the power transmission system 100 further includes at least one second motor generator 43 configured to drive a second pair of wheels. For example, as shown in FIGS. 2-8, the first pair of wheels refers to the front wheels 210 of the vehicle, and the second pair of wheels refers to the rear wheels 220 of the vehicle. It is understood that in other embodiments, the first pair of wheels can refer to the rear wheels 220 and the second pair of wheels can refer to the front wheels 210.

Therefore, the power transmission system 100 according to embodiments of the present disclosure has four types of power output sources, i.e. the engine unit 1, the first motor generator 41, the second motor generators 42 and 43, in which the engine unit 1, the first motor generator 41 and the second motor generator 42 may be configured to drive one pair of wheels of the vehicle, and the second motor generator 43 may be configured to drive the other pair of wheels of the vehicle. Therefore, the vehicle having the power transmission system 100 is operable as a four-wheel drive vehicle.

Moreover, during the switching of operating conditions of the vehicle, it is possible for the synchronizer 6 to switch from the disengaged state to the engaged state, and the first motor generator 41 may adjust the rotating speed of the output shaft 24 with the rotating speed of the output unit 5 as a target value, so as to match the rotating speed of the output shaft 24 with the rotating speed of the output unit 5 in a short time, thus facilitating the engagement of the synchronizer 6, greatly improving the transmission efficiency and reducing the energy loss.

Meanwhile, by provision of the second motor generators 42 and 43, the second motor generators 42 and 43 may compensate for the torque of the wheels 200, which is indirectly reflected in the output of output unit 5. That is, the second motor generators 42 and 43 may indirectly adjust the rotating speed of the output unit 5. For example, when the synchronizer 6 switches from the disengaged state to the engaged state, the second motor generators 42 and 43 may indirectly adjust the rotating speed of the output unit 5 according to requirements, so as to match the rotating speed of the output shaft 24 with the rotating speed of the output unit 5 in a short time, thus facilitating the engagement of the synchronizer 6.

Furthermore, the second motor generators 42 and 43 may cooperate with the first motor generator 41 to adjust the rotating speed of the output unit 5 simultaneously, so as to synchronize the rotating speed of the output shaft 24 and the rotating speed of the output unit 5 in a shorter time, thus facilitating the engagement of the synchronizer 6 and greatly improving the transmission efficiency.

In short, the first motor generator 41 may adjust the rotating speed of the output unit 5 separately. In some embodiments, at least one of the second motor generators 42 and 43 may adjust the rotating speed of the output unit 5 separately. In some embodiments, the first motor generator 41, and the second motor generators 42 and 43 may adjust the rotating speed of the output unit 5 simultaneously.

In this way, the output of the power from the transmission unit 2a may be controlled by the engagement/disengagement of the synchronizer 6, and when the synchronizer 6 switches from the disengaged state to the engaged state, at least one of the first motor generator 41, the second motor generators 42 and 43 may compensate for the speeds of the output shaft 24 and the output unit 5, so as to match the rotating speed of the output shaft 24 with the rotating speed of the output unit 5 rapidly, thus realizing no torque engagement of the synchronizer 6 rapidly.

In some embodiments, as shown in FIGS. 2-9, there is a plurality of the input shafts, i.e. two or more input shafts. The input shafts are coaxially nested sequentially. For example, if there are N input shafts, the $K^{th}$ input shaft is fitted over the $(K-1)^{th}$ input shaft, where N≥K≥2, and central axes of the N input shafts coincide with each other.

In some embodiments, as shown in FIGS. 2-7 and 9-19, when there are two input shafts, e.g. the first input shaft 21 and the second input shaft 22, the second input shaft 22 is fitted over the first input shaft 21 and central axes of the two input shafts coincide with each other. In some embodiments as shown in FIG. 8, when there are three input shafts, e.g. the first input shaft 21, the second input shaft 22 and a third the input shaft 23, the third input shaft 23 is fitted over the second input shaft 22, the second input shaft 22 is fitted over the first input shaft 21, and central axes of the three input shafts coincide with each other.

When the engine unit 1 transmits the power to the input shaft or is coupled with the input shaft for power transmission, the engine unit 1 may be selectively engaged with one of the input shafts. In other words, when the power from the engine unit 1 needs to be output, the output terminal of the engine unit 1 may be engaged with one of the input shafts, so as to rotate synchronously with the one of the input shafts. When the engine unit 1 does not need to operate or the engine unit 1 is idle, the engine unit 1 may be disconnected from individual input shafts respectively, i.e. the engine unit 1 is not coupled with any input shaft, so as to interrupt the power transmission between the engine unit 1 and individual input shafts.

Further, as shown in FIGS. 2-6, one driving gear 25 is fixed on each input shaft, and the driving gear 25 rotates synchronously with the input shaft. The fixing between the driving gear 25 and the corresponding input shaft is not limited here, for example, the driving gear 25 and the corresponding input shaft may be fixed by, for example, key fit or hot pressing, or may be formed integrally, as long as the synchronous rotation of the driving gear 25 and the corresponding input shaft is ensured.

In some embodiments, a plurality of driven gears 26 are fixed on the output shaft 24, and the driven gears 26 rotate synchronously with the output shaft 24. By way of example and without limitation, the fixing between the driven gear 26 and the output shaft 24 may be realized by key fit or hot pressing, or may be formed integrally.

However, the present disclosure is not limited to this. For example, the number of the driving gears 25 on each input shaft is not limited to one, and accordingly a plurality of driven gears 26 are fixed on the output shaft 24 to form a plurality of gears.

As shown in FIGS. 2-6, the driven gears 26 are configured to mesh with the driving gears 25 on the input shafts respectively. In one embodiment, the number of the driven gears 26 may be the same as that of the input shafts. For example, when there are two driven gears 26, there are two input shafts, such that the two driven gears 26 may be configured to mesh with the driving gears 25 on the two input shafts to transmit the power, to make the two pairs of gears form two gears for power transmission.

In some embodiments, three or more input shafts may be provided according to the power transmission requirements, and each input shaft may be provided with one driving gear 25. Therefore, the larger the number of the input shafts, the larger the number of the gears is, and the wider range of the transmission ratio of the power transmission system 100 is, so as to adapt to the power transmission requirements of various vehicles.

In some embodiments, as shown in FIGS. 2-7, the input shafts include the first input shaft 21 and the second input shaft 22. The second input shaft 22 is fitted over the first input shaft 21. The second input shaft 22 is a hollow shaft, and the first input shaft 21 is preferably a solid shaft. Alternatively, the first input shaft 21 may also be a hollow shaft.

In some embodiments, the first input shaft 21 may be supported by bearings. For example, a plurality of bearings can be disposed in an axial direction of the first input shaft 21 at a position not influencing the assembly of other components. Similarly, the second input shaft 22 may also be supported by bearings.

Further, in some embodiments, as shown in FIGS. 2-7, a dual clutch 31 is disposed between the engine unit 1 and the first and second input shafts 21, 22. The dual clutch 31 may be a dry dual clutch 31 or a wet dual clutch 31.

The dual clutch 31 has an input terminal 313, a first output terminal 311 and a second output terminal 312. The engine unit 1 is coupled with the input terminal 313 of the dual clutch 31. Specifically, the engine unit 1 may be coupled with the input terminal 313 of the dual clutch 31 via for example, a flywheel, a damper, or a torsion plate.

The first output terminal 311 of the dual clutch 31 is fixed with and rotates synchronously with the first input shaft 21. The second output terminal 312 of the dual clutch 31 is fixed with and rotates synchronously with the second input shaft 22.

The input terminal 313 of the dual clutch 31 may be a shell of the dual clutch 31, and the first output terminal 311 and the second output terminal 312 of the dual clutch 31 may be two driven discs. The shell may be disconnected from the two driven discs, such that the input terminal 313 is disconnected from the first output terminal 311 and the second output terminal 312. When one driven disc needs to be engaged, the shell can be controlled to engage with the corresponding driven disc to rotate synchronously with the driven disc, e.g. the input terminal 313 is engaged with one of the first output terminal 311 and the second output terminal 312, such that the power transmitted from the input terminal 313 may be output via one of the first output terminal 311 and the second output terminal 312. Typically, the shell is engaged with one driven disc at a time.

It would be appreciated that the engagement of the dual clutch 31 is influenced by a control strategy. The control strategy may be set according to the desired power transmission mode, e.g. switching between a mode in which the input terminal 313 is disconnected from the first output terminal 311 and the second output terminal 312 and a mode in which the input terminal 313 is engaged with one of the first output terminal 311 and the second output terminal 312.

In some embodiments, as shown in FIGS. 2-7, since the input shaft has a concentric biaxial structure and each input shaft is provided with a driving gear 25, the transmission unit 2a has two different gears, and the engine unit 1 may output the power to the output unit 5 via the two gears, while the synchronizer 6 can remain in an engaged state to engage the output shaft 24 with the output unit 5.

During the gear shift, the synchronizer 6 may not need to be first disengaged and then move axially to engage with other gears. According to embodiments of the present disclosure, only the engagement/disengagement of the dual clutch 31 needs to be controlled, while the synchronizer 6 can remain in the engaged state. In this way, when the engine unit 1 outputs the power to the output unit 5, only one gear shift actuating element, e.g. the dual clutch 31 needs to be controlled, thus simplifying the control strategy greatly, reducing the number of engagement/disengagement times of, for example, the synchronizer 6, and extending its life.

In some embodiments, the first motor generator 41 is configured to cooperate with one of the driving gear 25 and the driven gear 26 for power transmission. In other words, indirect power transmission between the first motor generator 41 and one of the input shaft and the output shaft 24 is performed.

Further, in some embodiments, an intermediate transmission mechanism may be disposed between the first motor generator 41 and the corresponding gear, and by way of example and without limitation, the intermediate transmission mechanism may be a worm and worm gear transmission mechanism, a one-stage or multi-stage gear pair transmission mechanism, or a chain wheel transmission mechanism, or may be a combination of the above transmission mechanisms in the case of no conflicting. In this way, the first motor generator 41 may be provided in different locations as needed, thus reducing the arrangement difficulty of the first motor generator 41.

Figure 2:
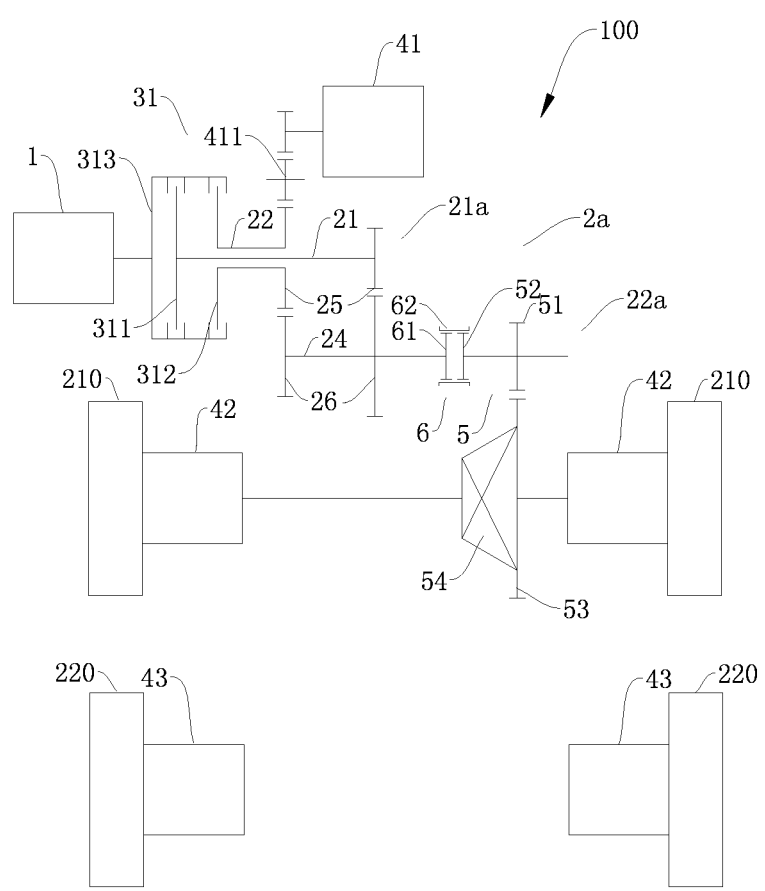
FIG. 2 is a schematic view of an exemplary power transmission system according to an embodiment of the present disclosure.

In order to facilitate the spatial arrangement, in some embodiments, the first motor generator 41 may transmit the power via an intermediate gear 411. In some embodiments, as shown in the example shown in FIGS. 2-3, indirect power transmission between the first motor generator 41 and the driving gear 25 on the first input shaft 21 via the intermediate gear 411 can be performed. In some embodiments, as shown in FIG. 2, indirect power transmission between the first motor generator 41 and the driving gear 25 on the second input shaft 22 via the intermediate gear 411 can be performed.

However, the present disclosure is not limited to this. In some embodiments, the first motor generator 41 is configured to connect with one of the first input shaft 21 and the output shaft 24. In some embodiments, the first motor generator 41 is directly connected with the first input shaft 21. In some embodiments, the first motor generator 41 is directly connected with the output shaft 24. Direct connection between the first motor generator 41 and the corresponding shaft may make the structure of the power transmission system 100 more compact, and decrease the circumferential dimension of the power transmission system 100, such that the power transmission system 100 may be easily disposed in a compartment of the vehicle.

Figure 4:
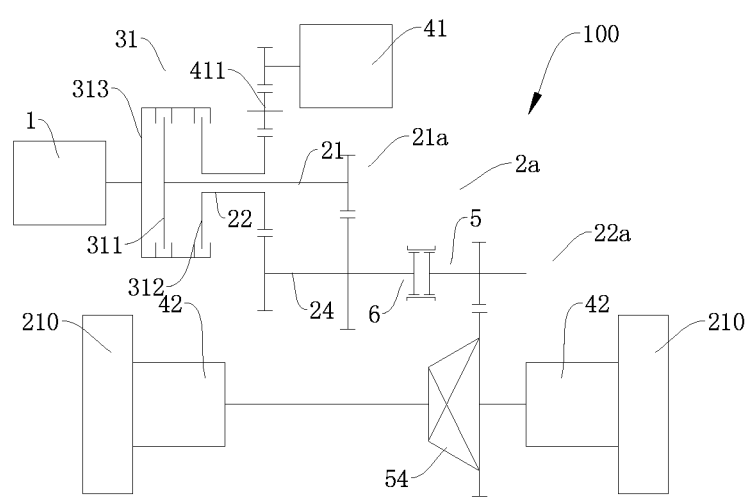
FIG. 4 is a schematic view of an exemplary power transmission system according to still another embodiment of the present disclosure.
Figure 4:
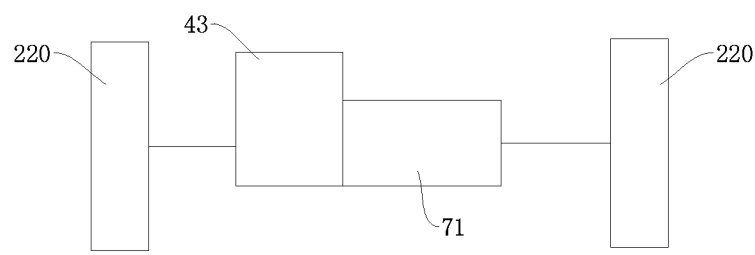

In some embodiments, as shown in FIG. 4, the first motor generator 41 is arranged coaxially with the first input shaft 21, and the first motor generator 41 is arranged coaxially with the engine unit 1, which allows a rotation axis of a rotor of the first motor generator 41 to substantially coincide with a rotation axis of a crankshaft of the engine unit 1. Therefore, the power transmission system 100 becomes more compact in structure.

In some embodiments, as shown in FIGS. 2-6, the output unit 5 may include an output gear 51 and an engagement gear ring 52. The output gear 51 may rotate relative to the output shaft 24, i.e. rotate differentially relative to the output shaft 24, and the engagement gear ring 52 is fixedly connected with the output gear 51, i.e. the engagement gear ring 52 rotates synchronously with the output gear 51.

Therefore, when the synchronizer 6 needs to engage the output unit 5 with the output shaft 24, the synchronizing sleeve 62 of the synchronizer 6 may axially move toward the engagement gear ring 52, and after the rotating speed of the output unit 5 is synchronized with the rotating speed of the output shaft 24, the synchronizing sleeve 62 may be engaged with the engagement gear ring 52, to form a rigid connection between the output shaft 24, the synchronizer 6 and the output unit 5, so as to rotate the output shaft 24, the synchronizer 6 and the output unit 5 synchronously.

In order to reduce the number of intermediate transmission components, to reduce the energy loss, and to enhance the transmission efficiency of the power transmission system 100, in some embodiments, as shown in FIGS. 2-6, the output gear 51 may be a driving gear of a main reducer and is configured to directly mesh with a driven gear 53 of the main reducer to output the power, so as to drive the wheels 200. However, the present disclosure is not limited to this, and other intermediate transmission components may also be disposed between the output gear 51 and the main reducer.

In some embodiments, as shown in FIGS. 2-10, a differential 54 is disposed between the first pair of wheels such as the front wheels 210. The differential 54 cooperates with the output unit 5 for power transmission. In some embodiments, the differential 54 is provided with the driven gear 53 thereon, and the output gear 51 becomes the driving gear of the main reducer configured to mesh with the driven gear 53, such that the power may be transferred to the two front wheels 210 via the driving gear of the main reducer, the driven gear 53 of the main reducer and the differential 54 sequentially.

The function of the differential 54 is to distribute the power to the two front wheels 210. The differential 54 may be a gear differential, a mandatory locking differential, or the Torsen differential, which may be selected according to different vehicles.

Figure 5:
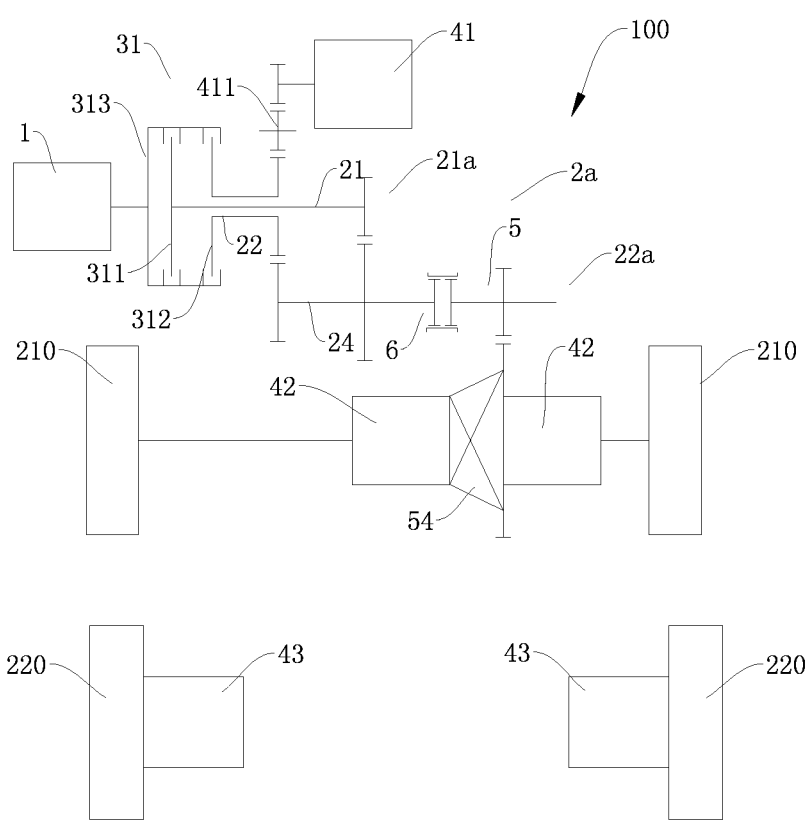
FIG. 5 is a schematic view of an exemplary power transmission system according to yet another embodiment of the present disclosure.
Figure 6:
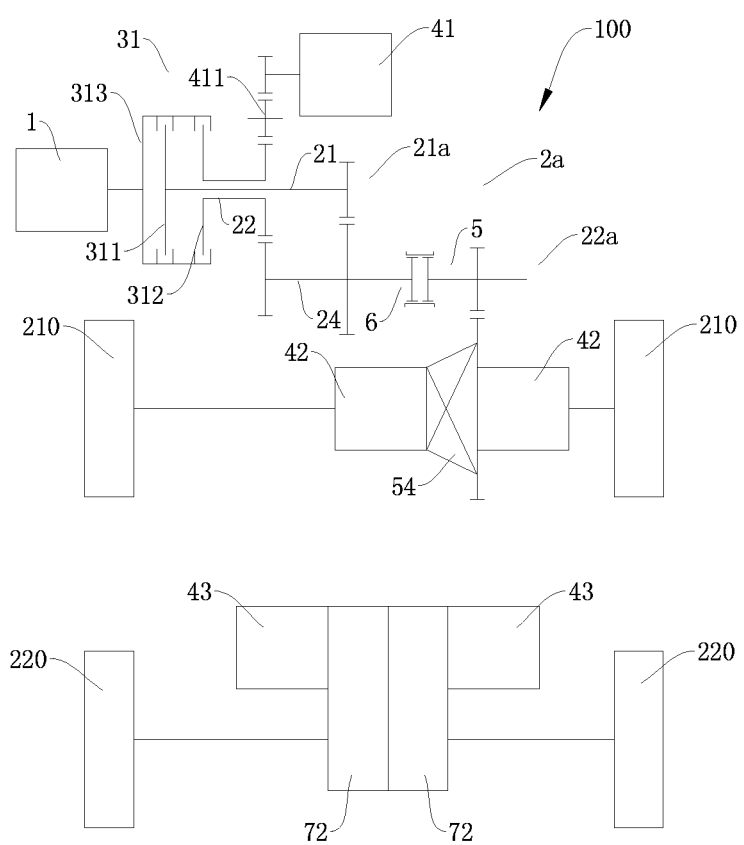
FIG. 6 is a schematic view of an exemplary power transmission system according to yet another embodiment of the present disclosure.
Figure 7:
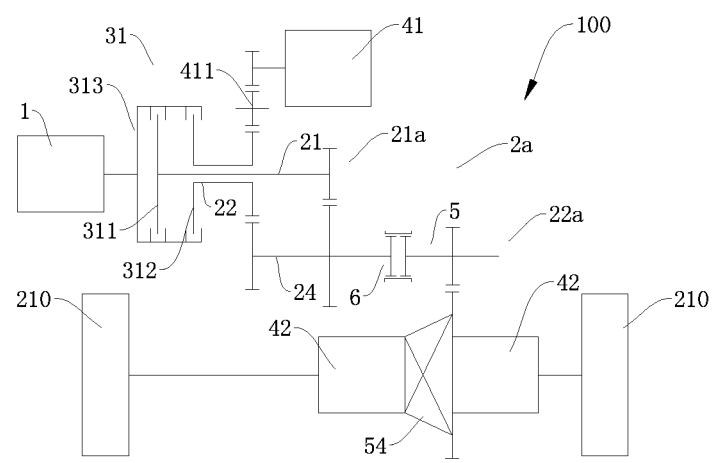
FIG. 7 is a schematic view of an exemplary power transmission system according to yet another embodiment of the present disclosure.
Figure 8:
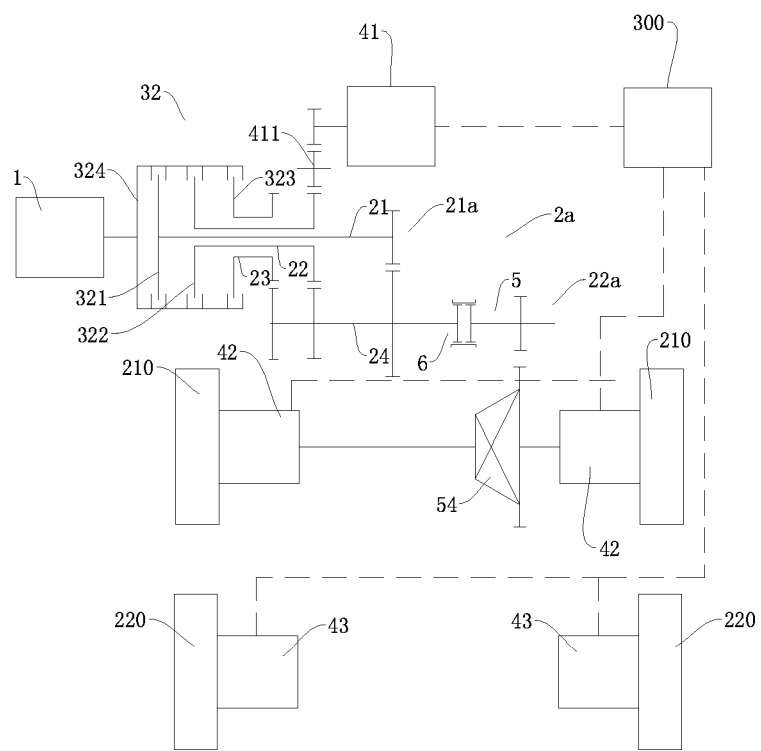
FIG. 8 is a schematic view of an exemplary power transmission system according to yet another embodiment of the present disclosure.
Figure 10:
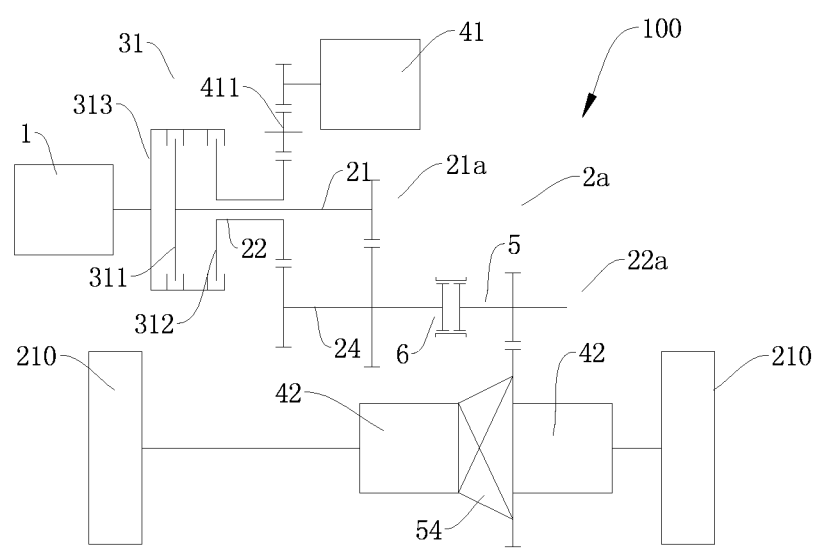
FIG. 10 is a schematic view of an exemplary power transmission system according to yet another embodiment of the present disclosure.

In some embodiments, as shown in FIGS. 5-7 and 10, a pair of second motor generators 42 is disposed on two sides of the differential 54 back to back. For example, a pair of second motor generators 42 is disposed on two sides of the differential 54 and integrally formed with the differential 54. For example, the left second motor generator 42 can be disposed between a left half shaft and the differential 54, and the right second motor generator 42 can be disposed between a right half shaft and the differential 54. The power transmission system 100 in FIGS. 5-7 is operable in a four-wheel drive mode, and the power transmission system 100 in FIG. 10 is operable in a two-wheel drive mode. It should be noted that in the following, when referring to "motor generators are disposed on two sides of the differential 54 back to back," it means that the motor generators are disposed on two sides of the differential 54 respectively and integrally formed with the differential 54.

Figure 3:
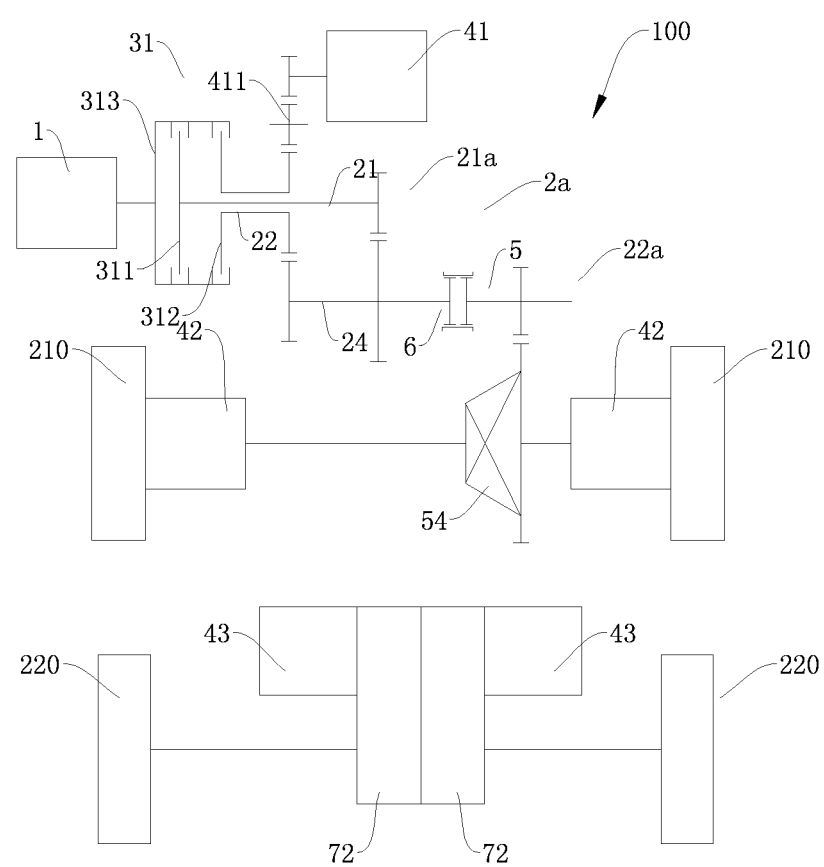
FIG. 3 is a schematic view of an exemplary power transmission system according to another embodiment of the present disclosure.
Figure 9:
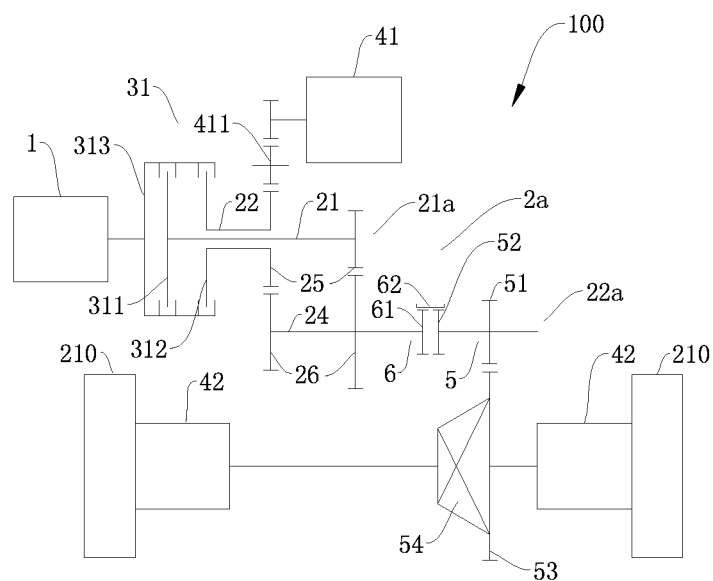
FIG. 9 is a schematic view of an exemplary power transmission system according to yet another embodiment of the present disclosure.

In some embodiments, as shown in FIGS. 2-4 and 9, the second motor generator 42 is a wheel-side motor. One of the second motor generators 42 is disposed at an inner side of the left front wheel and the other of the second motor generators 42 is disposed at an inner side of the right front wheel, and the second motor generator 42 may transfer the power to a hub of a corresponding wheel via a gear mechanism. The power transmission system 100 in FIGS. 2-4 is operable in a four-wheel drive mode, and the power transmission system 100 in FIG. 9 is operable in a two-wheel drive mode.

In some embodiments, two second motor generators 43 are provided, and the second motor generators 43 are a wheel-side motor, as shown in FIGS. 2 and 5. In other words, in the examples shown in FIGS. 2 and 5, one of the second motor generators 43 is disposed on an inner side of the left rear wheel, and the other of the second motor generators 43 is disposed on an inner side of the right rear wheel, and the second motor generator 43 may transfer the power to a corresponding rear wheel via a gear mechanism.

In some embodiments, one second motor generator 43 is provided, and the second motor generator 43 drives the second pair of wheels via a first speed changing mechanism 71, as shown in FIG. 7. The first speed changing mechanism 71 can be a reducing mechanism, and the reducing mechanism may be a one-stage or multi-stage reducing mechanism. The reducing mechanism may include, but is not limited to, a gear reducing mechanism, or a worm and worm gear reducing mechanism.

In this embodiment, the second pair of wheels may be connected with each other via an axle which may have an integral structure. The second motor generator 43 may directly drive the integral axle via the first speed changing mechanism 71, to drive the two wheels to rotate synchronously.

In some embodiments, two second motor generators 43 are provided, and each second motor generator 43 drives one of the second pair of wheels via a second speed changing mechanism 72, as shown in FIGS. 3 and 6. The second speed changing mechanism 72 is a reducing mechanism, and the reducing mechanism may be a one-stage or multi-stage reducing mechanism. The reducing mechanism may include, but is not limited to, a gear reducing mechanism, or a worm and worm gear reducing mechanism.

In this embodiment, the two wheels in the second pair may be connected with the corresponding second motor generators 43 and the corresponding second speed changing mechanisms 72 via two half axles respectively. In other words, one of the second motor generators 43 may drive a corresponding half axle via one of the second speed changing mechanisms 72, so as to drive the wheel at an outer side of the half axle to rotate.

Figure 11:
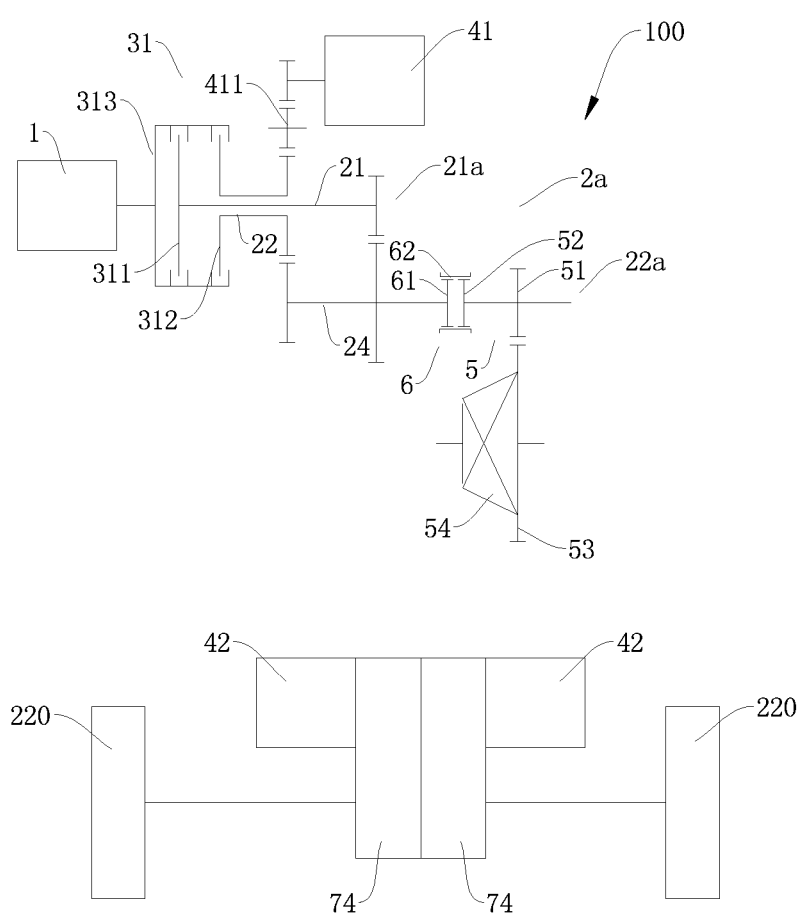
FIG. 11 is a schematic view of an exemplary power transmission system according to yet another embodiment of the present disclosure.
Figure 12:
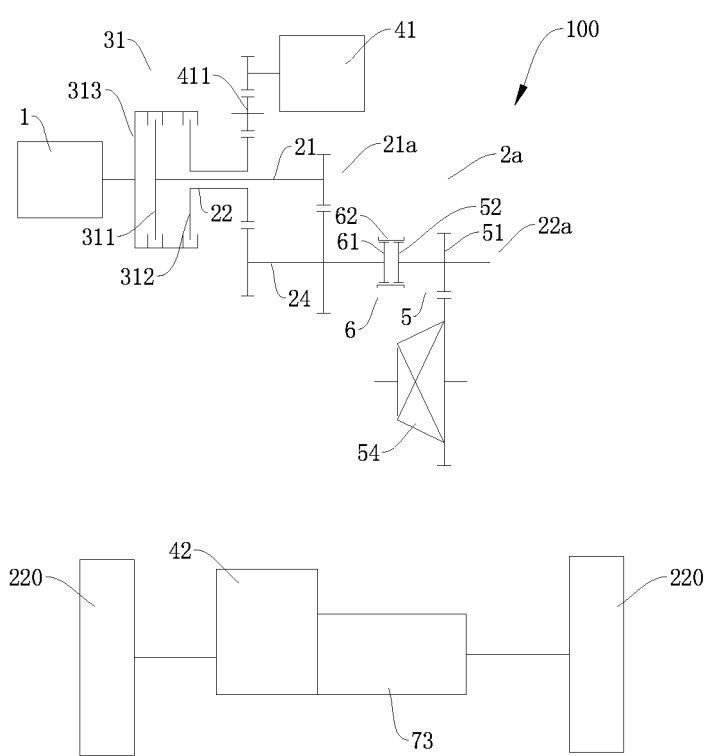
FIG. 12 is a schematic view of an exemplary power transmission system according to yet another embodiment of the present disclosure.
Figure 13:
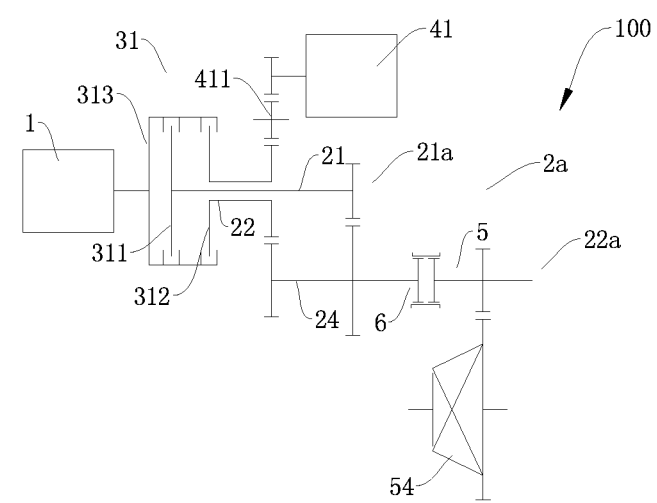
FIG. 13 is a schematic view of an exemplary power transmission system according to yet another embodiment of the present disclosure.
Figure 13:
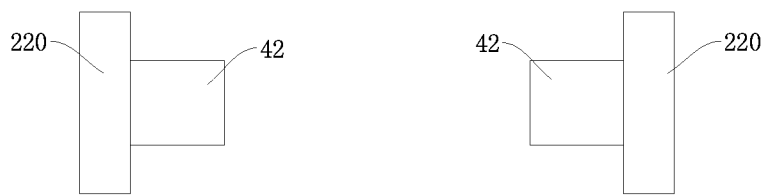

In some embodiments, as shown in FIGS. 9-10, the power transmission system 100 is operable in a two-wheel drive mode. In an example shown in FIG. 9, the output unit 5 drives the front wheels 210, and the second motor generator 42 is a wheel-side motor and is configured to drive the front wheels 210. In the example shown in FIG. 10, the output unit 5 drives the front wheels 210, and the second motor generators 42 are disposed at two sides of the differential 54 back to back, for example, the second motor generators 42 are disposed at two sides of the differential 54 respectively and integrally formed with the differential 54. In some embodiments, as shown in FIGS. 11-13, the power transmission system 100 is operable in a four-wheel drive mode. In an example shown in FIG. 11, the output unit 5 drives the front wheels 210, two second motor generators 42 are provided, and each second motor generator 42 drives one rear wheel 220 via one fourth speed changing mechanism 74. In an example shown in FIG. 12, the output unit 5 drives the front wheels 210, one second motor generator 42 is provided, and the second motor generator 42 drives the rear wheels 220 via one third speed changing mechanism 73. In an example shown in FIG. 13, the output unit 5 drives the front wheels 210, two second motor generators 42 are provided and are a wheel-side motor, which are configured to drive the rear wheels 220.

The third speed changing mechanism 73 may be the same as the first speed changing mechanism 71. Similarly, the fourth speed changing mechanism 74 may be the same as the second speed changing mechanism 72. Therefore, the third speed changing mechanism 73 and the fourth speed changing mechanism 74 will not be described in detail here.

In some embodiments, the power transmission system 100 may also include a battery pack 300. The battery pack 300 is connected with the first motor generator 41, the second motor generator 42 and the third motor generator 43 respectively. Therefore, the first motor generator 41 is driven by the engine unit 1 to generate electricity or electric energy recovered by the first motor generator 41 during the braking may be supplied to and stored in the battery pack 300, and electric energy recovered by the second motor generator 42 and the third motor generator 43 during the braking may also be supplied to and stored in the battery pack 300. When the vehicle is operated in an EV mode, the battery pack 300 may supply electric energy to at least one of the first motor generator 41, the second motor generator 42 and the third motor generator 43. It would be appreciated that the dotted lines shown in FIG. 8 indicates that the battery pack 300 is electrically connected with the first motor generator 41, the second motor generator 42 and the third motor generator 43 respectively.

In some embodiments, as shown in FIG. 8, the power transmission system 100 comprises input shafts which include three shafts, e.g. the first input shaft 21, the second input shaft 22 and the third input shaft 23, with the second input shaft 22 fitted over the first input shaft 21, and the third input shaft 23 fitted over the second input shaft 22.

In these embodiments, the power transmission system 100 further includes a triple clutch 32. The triple clutch 32 has an input terminal 324, a first output terminal 321, a second output terminal 322 and a third output terminal 323. The engine unit 1 is coupled with the input terminal 324 of the triple clutch 32, the first output terminal 321 of the triple clutch 32 is coupled with the first input shaft 21, the second output terminal 322 of the triple clutch 32 is coupled with the second input shaft 22, and the third output terminal 323 of the triple clutch 32 is coupled with the third input shaft 23.

In some embodiments, the input terminal 324 of the triple clutch 32 may be a shell thereof, and the first, second and third output terminals 321, 322, and 323 of the triple clutch 32 may be three driven discs. The input terminal 324 may be engaged with one of the first, second and third output terminals 321, 322, and 323, or may be disconnected with the first, second and third output terminals 321, 322, 323. It would be appreciated that the operation principle of the triple clutch 32 is similar to that of the dual clutch 31, so the detailed description thereof will be omitted here.

Other parts such as the power transmission manner between the first motor generator 41 and the first input shaft 21 or the output shaft 24 as well as the position and drive mode of the second motor generators 42 and 43, are also similar to those described with respect to the dual clutch 31, so the detailed description thereof will be omitted here.

Figure 14:
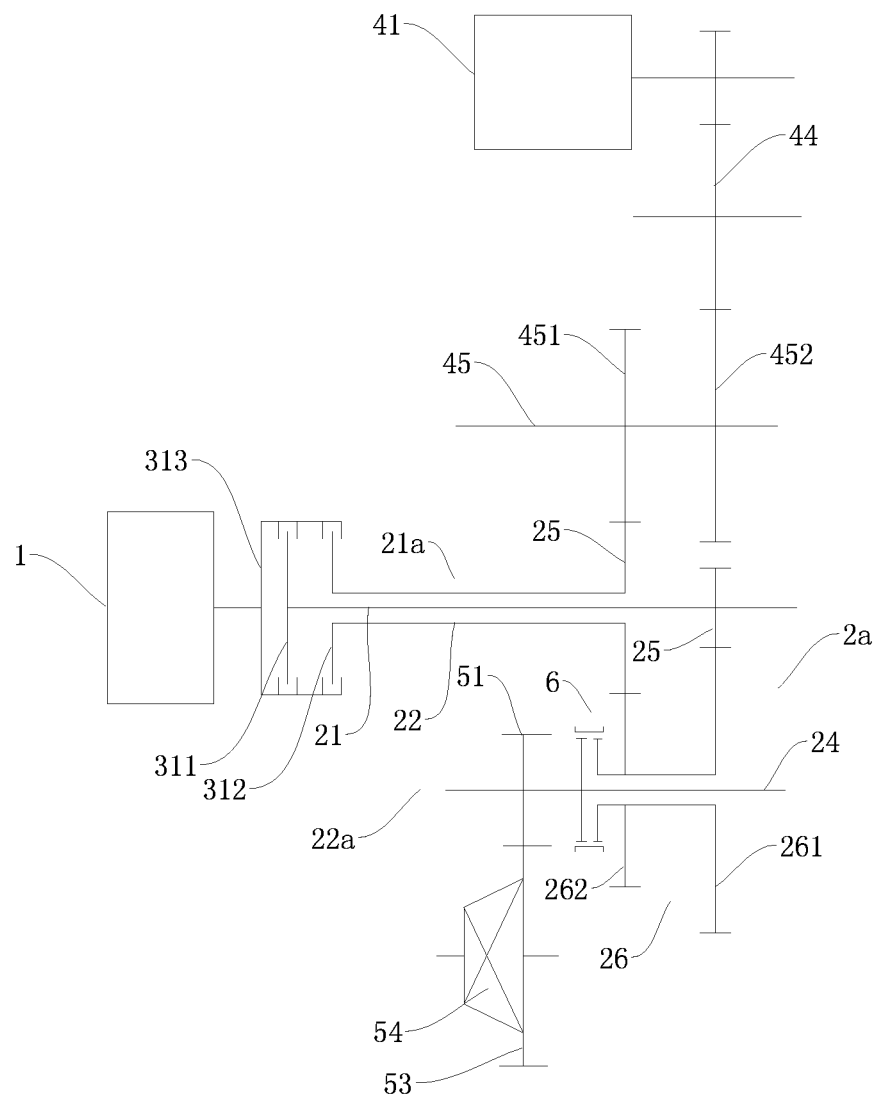
FIG. 14 is a schematic view of an exemplary power transmission system according to yet another embodiment of the present disclosure.
Figure 15:
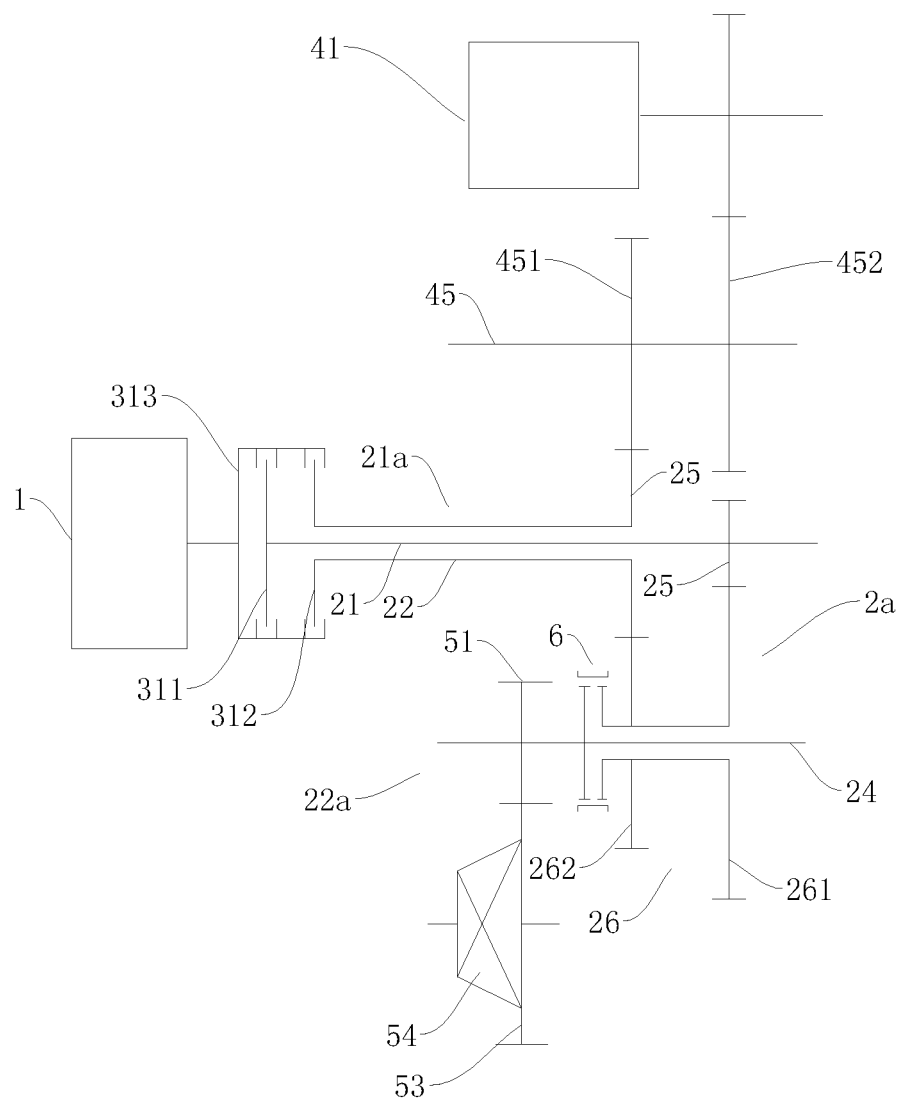
FIG. 15 is a schematic view of an exemplary power transmission system according to yet another embodiment of the present disclosure.
Figure 16:
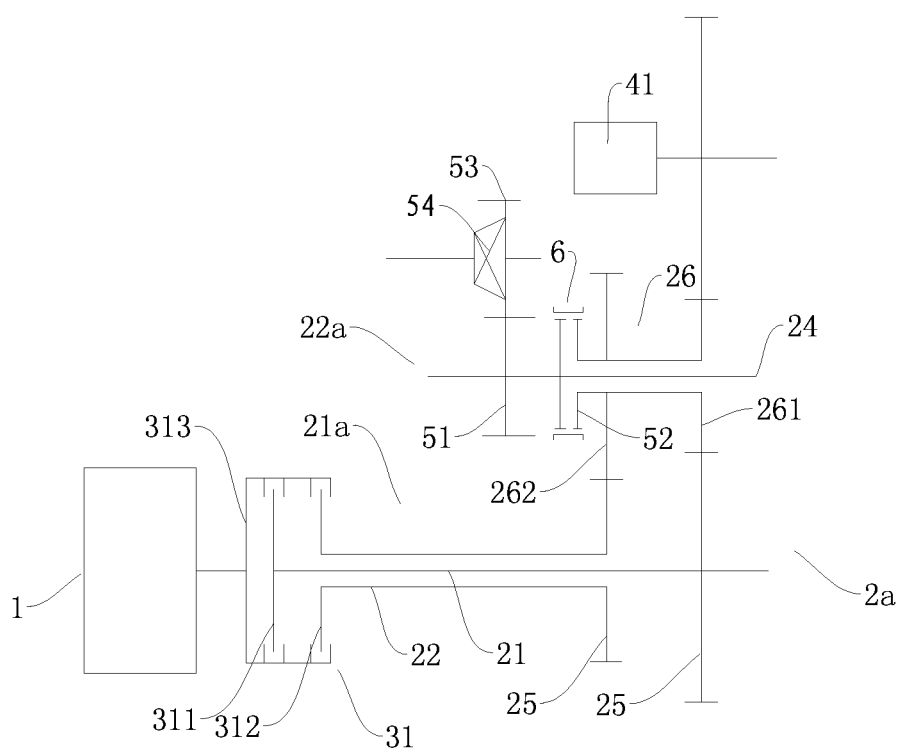
FIG. 16 is a schematic view of an exemplary power transmission system according to yet another embodiment of the present disclosure.

In some embodiments, as shown in FIGS. 14-16, in this power transmission system 100, the power transmission system 100 comprises a driven gear 26 which is configured as a linked gear, and the linked gear 26 is freely fitted over the output shaft 24 and rotates differentially relative to the output shaft 24. The synchronizer 6 is disposed on the output shaft 24 and may be selectively engaged with the linked gear 26.

In these embodiments, two input shafts are provided, e.g. the first input shaft 21 and the second input shaft 22, and each input shaft is provided with one driving gear 25. The linked gear 26 can be a double-linked gear. The double-linked gear 26 has a first gear part 261 and a second gear part 262, and the first gear part 261 and the second gear part 262 are configured to mesh with two driving gears 25 respectively.

When the power transmission system 100 in this embodiment transmits the power, the synchronizer 6 may be engaged with the double-linked gear 26, such that the power output by at least one of the engine unit 1 and the first motor generator 41 may be output via the output unit 5 (e.g., the driving gear 51 of the main reducer).

In these embodiments, the power transmission between the first motor generator 41 and the output shaft 24 may be direct or indirect, and is similar to that described in the above embodiments, so the detailed description thereof will be omitted here. The arrangement of other components such as the clutch (e.g., the dual clutch 31 or the triple clutch 32) between the engine unit 1 and the input shaft is similar to that described in the above embodiments, so the detailed description thereof will also be omitted here.

In these embodiments, as shown in FIGS. 14-16, the power transmission system 100 may include an engine unit 1, a plurality of input shafts, an output shaft 24, an output unit 5 (e.g., the driving gear 51 of the main reducer), a synchronizer 6 and a first motor generator 41.

The power transmission system 100 in these embodiments may include a driven gear 26 which is configured as a linked gear and can be freely fitted over the output shaft 24. With the output unit 5 fixed on the output shaft 24, the synchronizer 6 can be configured to engage with the linked gear. In these embodiments, the arrangement of the first motor generator 41 may slightly differ from that of the first motor generator 41 in the power transmission system 100 shown in FIGS. 2-13.

In some embodiments, as shown in FIGS. 14-16, a plurality of input shafts are provided, the input shafts are provided with the driving gears 25 thereon. The linked gear 26 is freely fitted over the output shaft 24. The linked gear 26 has a plurality of gear parts (for example, the first gear part 261, and the second gear part 262), and the gear parts are configured to mesh with the driving gears 25 on the input shafts respectively.

As shown in FIGS. 14-16, the output unit 5 is configured to output the power from the output shaft 24. For example, the output unit 5 is fixed on the output shaft 24. In some embodiments, by way of example and without limitation, the output unit 5 may include the driving gear 51 of the main reducer.

The synchronizer 6 is disposed on the output shaft 24. The synchronizer 6 is configured to selectively engage with the linked gear 26, so as to output the power via the output unit 5 to drive the wheels of the vehicle. The power transmission between the first motor generator 41 and one of the input shaft and the output shaft 24 may be direct or indirect.

In these embodiments, the function of the synchronizer 6 is substantially the same as that of the synchronizer 6 shown in FIGS. 2-13. The synchronizer 6 in these embodiments is configured to engage the linked gear 26 with the output shaft 24, while the synchronizer 6 shown in FIGS. 2-13 is configured to engage the output unit 5 with the output shaft 24.

Specifically, in these embodiments, the function of the synchronizer 6 is to synchronize the linked gear 26 with the output shaft 24, so that the linked gear 26 and the output shaft 24 can operate synchronously, to output the power from at least one of the engine unit 1 and the first motor generator 41 with the output unit 5 as a power output terminal. When the linked gear 26 and the output shaft 24 are not synchronized by the synchronizer 6, the power from at least one of the engine unit 1 and the first motor generator 41 may not be directly output to the wheels 200 via the output unit 5.

In these embodiments, the synchronizer 6 functions to switch the power. That is, when the synchronizer 6 is in an engaged state, the power from at least one of the engine unit 1 and the first motor generator 41 may be output via the output unit 5 to drive the wheels 200; and when the synchronizer 6 is in a disengaged state, the power from at least one of the engine unit 1 and the first motor generator 41 may not be transmitted to the wheels 200 via the output unit 5. In this way, by controlling the synchronizer 6 to switch between the engaged state and the disengaged state, the switching of the drive mode of the vehicle may be realized.

Moreover, the first motor generator 41 may adjust the speed of the linked gear 26 with the rotating speed of the output shaft 24 as a target value, so as to match the speed of the linked gear 26 with the speed of the output shaft 24 in a time efficient manner, thus reducing the time required by the synchronization of the synchronizer 6 and reducing the energy loss. Meanwhile, no torque engagement of the synchronizer 6 may be achieved, thus greatly improving the transmission efficiency, synchronization controllability and real-time synchronization of the vehicle. In addition, the life of the synchronizer 6 may be further extended, thus reducing the maintenance cost of the vehicle.

In addition, by using the linked gear 26, the power transmission system 100 is more compact in structure and easy to arrange, and the number of the driven gears may be decreased so as to reduce the axial dimension of the power transmission system 100, thus reducing the cost and the arrangement difficulty.

Furthermore, the synchronizer 6 may be controlled by one separate fork, such that the control steps are simple and the reliability is high.

In some embodiments, the input shafts are coaxially nested, and each input shaft is provided with one driving gear 25. In some embodiments, the input shafts include a first input shaft 21 and a second input shaft 22, and each input shaft is provided with one driving gear 25. The linked gear 26 is a double-linked gear, the double-linked gear 26 has a first gear part 261 and a second gear part 262, and the first gear part 261 and the second gear part 262 are configured to mesh with two driving gears 25 respectively.

In some embodiments, a dual clutch 31 may be disposed between the engine unit 1 and the first and second input shafts 21 and 22. In some embodiments, the dual clutch 31 may be provided with a damping structure thereon, for example, the damping structure may be arranged between a first output terminal and an input terminal of the dual clutch 31, to adapt to start the vehicle at a low gear.

As shown in FIGS. 14-16, direct or indirect power transmission between an output terminal of the first motor generator 41 and one driving gear can be performed.

For example, the power transmission system 100 in these embodiments further includes an intermediate shaft 45. A first intermediate shaft gear 451 and a second intermediate shaft gear 452 are fixed on the intermediate shaft 45. One of the first and second intermediate shaft gears 451 and 452 is configured to mesh with one driving gear 25. For example, as shown in FIGS. 14-15, the first intermediate shaft gear 451 is configured to configured to mesh with the driving gear 25 on the second input shaft 22. Of course, the present disclosure is not limited to these examples.

In some embodiments, direct power transmission between the output terminal of the first motor generator 41 and one of the first and second intermediate shaft gears 451 and 452, or indirect power transmission between the output terminal of the first motor generator 41 and one of the first and second intermediate shaft gears 451 and 452 via an intermediate idler 44 can be performed. For example, as shown in FIG. 14, indirect power transmission between the output terminal of the first motor generator 41 and the second intermediate shaft gear 452 via an intermediate idler 44 is performed. As another example, as shown in FIG. 15, the output terminal of the first motor generator 41 is configured to directly mesh with the second intermediate shaft gear 452 for power transmission.

As shown in FIG. 16, the output terminal of the first motor generator 41 is configured to directly mesh with one gear part of the linked gear 26. For example, the output terminal of the first motor generator 41 can be configured to directly mesh with the first gear part 261 for power transmission.

However, it would be appreciated that, the present disclosure is not limited to this. The position of the first motor generator 41 may be designed according to practical requirements. For example, the position of the first motor generator 41 may be the same as that described above, or may be as shown in FIGS. 2-13, which will not be described in detail here.

As shown in FIGS. 14-15, the first gear part 261 inputs a torque to the engine unit 1 separately, and from the second gear part 262, which may input a torque to at least one of the engine unit 1 and the first motor generator 41.

As shown in FIGS. 14-16, an engagement gear ring 52 is fixed on a side of the linked gear 26 facing the synchronizer 6, and the synchronizer 6 is configured to engage with the engagement gear ring 52, such that the linked gear 26 is fixed with the output shaft 24 to rotate synchronously with the output shaft 24.

Figure 17:
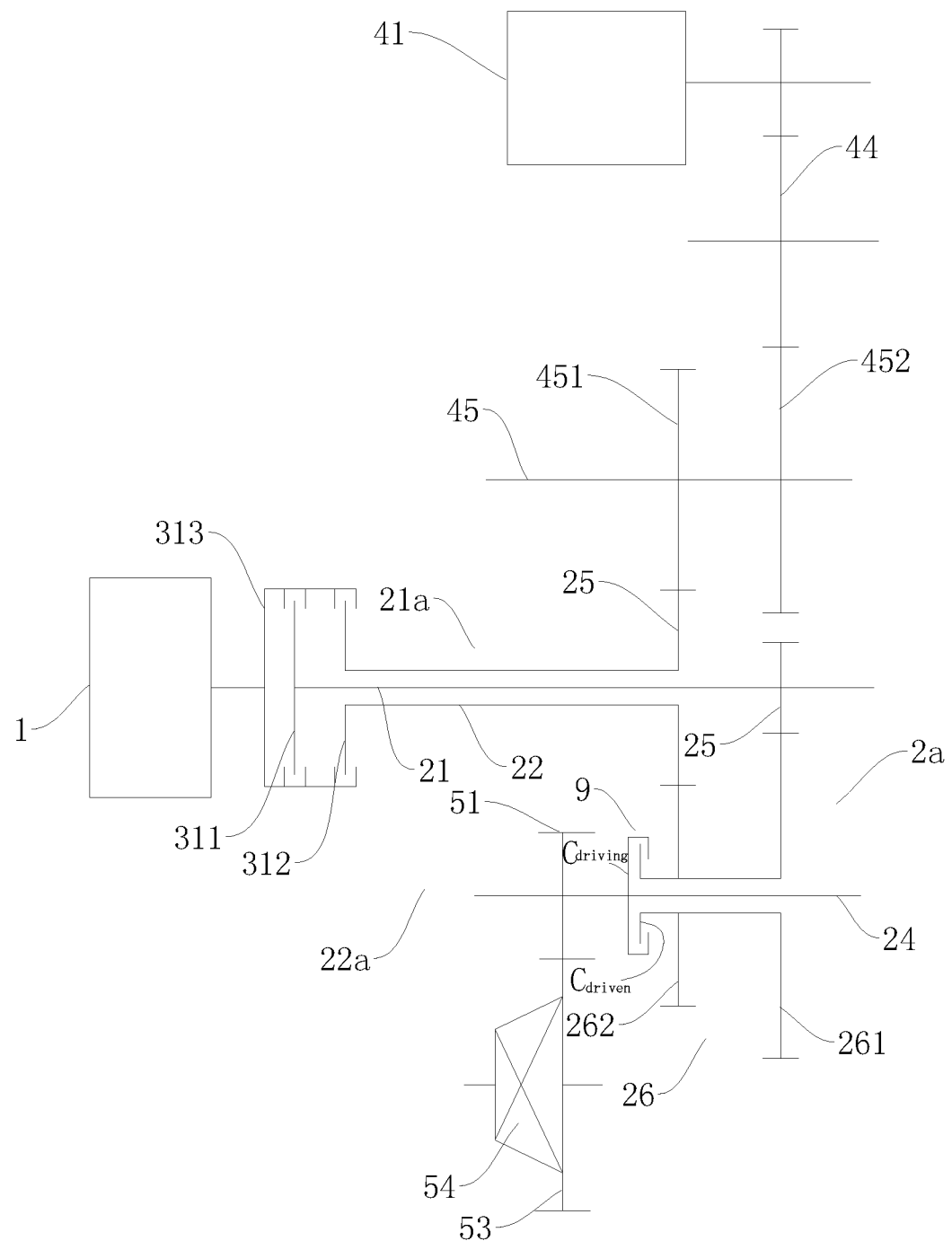
FIG. 17 is a schematic view of an exemplary power transmission system according to yet another embodiment of the present disclosure.
Figure 18:
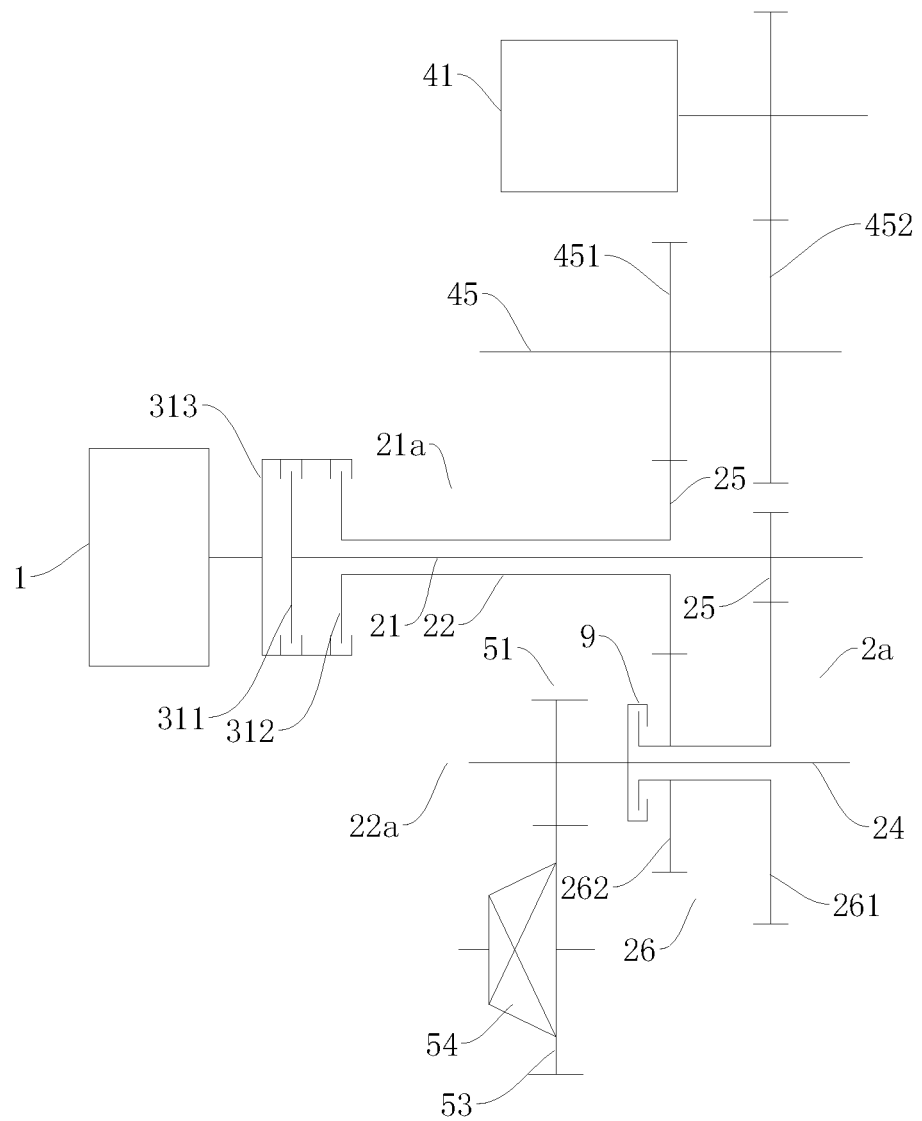
FIG. 18 is a schematic view of an exemplary power transmission system according to yet another embodiment of the present disclosure.
Figure 19:
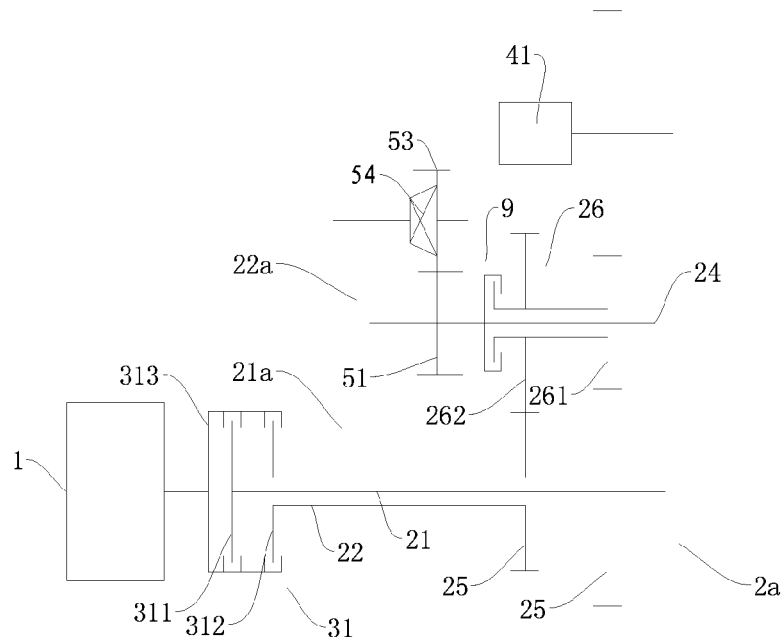
FIG. 19 is a schematic view of an exemplary power transmission system according to yet another embodiment of the present disclosure.

In some embodiments, as shown in FIGS. 17-19, the synchronizer 6 in the above embodiments can be replaced with a clutch 9.

Specifically, in these embodiments, as shown in FIGS. 17-19, the power switching device is a clutch 9. The clutch 9 is configured to enable or interrupt a power transmission between the transmission unit 2a and the output unit 5. For example, by the engagement of the clutch 9, the transmission unit 2a and the output unit 5 may operate synchronously, and the output unit 5 may output the power from the transmission unit 2a to the wheels 200. When the clutch 9 is in a disengaged state, the power output by the transmission unit 2a may not be directly output via the output unit 5.

In these embodiments, the double-linked gear 26 is freely fitted over the output shaft 24, and the output unit 5 is fixed on the output shaft 24. The clutch 9 has a driving part ($C_{driving}$ in FIG. 17) and a driven part ($C_{driven}$ in FIG. 17). One of the driving part and the driven part of the clutch 9 is disposed on a linked gear such as a double-linked gear 26, and the other of the driving part and the driven part of the clutch 9 is disposed on the output shaft 24. The driving part and the driven part of the clutch 9 may be disengaged from or engaged with each other. For example, as shown in FIG. 17, the driving part may be disposed on the output shaft 24, and the driven part may be disposed on the linked gear 26, but the present disclosure is not limited to this.

Therefore, after the driving part and the driven part of the clutch 9 are engaged with each other, the output shaft 24 is engaged with the double-linked gear 26 freely fitted over the output shaft 24, so as to output the power via the output unit 5. After the driving part and the driven part of the clutch 9 are disengaged from each other, the linked gear 26 is freely fitted over the output shaft 24, and the output unit 5 does not transfer the power from the transmission unit 2a.

With the power transmission system 100 according to embodiments of the present disclosure, since the synchronizer 6 is used for power switching and has advantages of small volume, simple structure, large torque transmission and high transmission efficiency, the power transmission system 100 according to embodiments of the present disclosure has a reduced volume, a more compact structure and high transmission efficiency, and may meet the large-torque transmission requirements.

Meanwhile, by the speed compensation of at least one of the first motor generator 41, the second motor generators 42 and 43, no torque engagement of the synchronizer 6 may be realized, the ride comfort is better, the engagement speed is higher, and the dynamic response is faster. Compared to a clutch transmission in the related art, larger torque may be withstood without failure, thus greatly improving the stability and reliability of the transmission.

In some embodiments, as shown in FIGS. 2, 3, 5, 6 and 8, four motor generators are used, and each motor generator is configured to drive one wheel. In the related art, a mechanical four-wheel drive vehicle may only achieve the torque distribution of front and rear wheels, and a full-time four-wheel drive vehicle may only achieve small difference in instantaneous torque of left and right wheels. However, in these embodiments, since four motors are used for driving the vehicle, +100% to −100% torque difference adjustment of the left and right wheel motors may be realized, thus greatly enhancing the steering stability during the high-speed turning, and improving the understeer and oversteer performance. Furthermore, the turning radius of the vehicle may be greatly reduced by the rotation of the left and right wheels in opposite directions when the vehicle runs at a low speed, such that the vehicle is easy to operate.

The construction and operating conditions of the power transmission system 100 in various examples will be described below with reference to FIGS. 2-19.

EXAMPLE 1

As shown in FIG. 2, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, and indirect power transmission between the first motor generator 41 and the driving gear 25 on the second input shaft 22 is performed via one intermediate gear 411. The output shaft 24 is provided with two driven gears 26, and the two driven gears 26 are configured to mesh with the driving gears 25 on the first input shaft 21 and the second input shaft 22, so as to form two gears.

The synchronizer 6 is disposed on the output shaft 24, the driving gear (e.g. the output gear 51) of the main reducer may rotate differentially relative to the output shaft 24, while the engagement gear ring 52 configured to the synchronizer 6 is fixed at a left side of the driving gear of the main reducer. The driving gear of the main reducer is externally configured to mesh with the driven gear 53 of the main reducer, and the driven gear 53 of the main reducer may be fixed on the differential 54, to transfer the power to the differential 54. The differential 54 distributes the power and adaptively transfers the distributed power to half axles on two sides of the vehicle, to drive the wheels 200.

Two second motor generators 42 constitute wheel-side motors configured to drive two front wheels 210 respectively, and two second motor generators 43 constitute wheel-side motors configured to drive two rear wheels 220 respectively. That is, each of the four wheels is provided with one wheel-side motor.

With the power transmission system 100 in this example, by the engagement or disengagement of the dual clutch 31, the power from the engine unit 1 may be transferred to the output shaft 24 with two different transmission ratios respectively. The first motor generator 41 may transfer the power to the output shaft 24 with a constant transmission ratio via a shift gear set. When the synchronizer 6 is in an engaged state, the power from the output shaft 24 may be transferred to the front wheels 210 via the main reducer and the differential 54. When the synchronizer 6 is in a disengaged state, the power from the output shaft 24 may not be transferred to the front wheels 210. The two second motor generators 42 are wheel-side motors, and may directly drive two front wheels 210 respectively. The two second motor generators 43 are wheel-side motors, and may directly drive two rear wheels 220 respectively.

The power transmission system 100 in this example may have at least the following operating conditions: a pure EV (electric vehicle) operating condition of the second motor generator 43, a pure EV four-wheel drive operating condition, a parallel operating condition, a series operating condition, and a braking/decelerating feedback operating condition.

First Operating Condition

This operating condition is a pure EV operating condition of the second motor generator 43. The dual clutch 31 is in a disengaged state, the synchronizer 6 is in a disengaged state, the engine unit 1, the first motor generator 41 and the second motor generator 42 do not operate, and two second motor generators 43 drive two rear wheels 220 respectively. This operating condition is mainly applicable to a situation where a load is small and an electric quantity of a battery is large, for example, during uniform motions or under urban operating conditions.

This operating condition has the advantages that since the second motor generators 43 directly drive the rear wheels 220, compared to a front-wheel drive vehicle, the vehicle in this example has better acceleration performance, gradeability and steering capability. Moreover, since the second motor generators 43 independently drive the left rear wheel and the right rear wheel respectively, an electronic differential function may be achieved, thus increasing the operating stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in a disengaged state, the first motor generator 41 does not operate, two second motor generators 42 are configured to drive two front wheels 210 respectively, and two second motor generators 43 are configured to drive two rear wheels 220 respectively. This operating condition is mainly applicable to a situation where a load is large and an electric quantity of a battery is large, for example, during acceleration, climbing, overtaking, or high-speed running.

This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Moreover, compared to a front-wheel drive vehicle and a rear-wheel drive vehicle, a pure EV four-wheel drive vehicle has better acceleration performance, gradeability, handling performance and off-road capability. Since two second motor generators 42 and 43 drive four wheels independently, the wheels may obtain different torques and rotating speeds, so as to achieve the individual control on the four wheels, thus maximizing the dynamic performance, operating stability and off-road performance. Furthermore, when torques in different directions are applied to the left and right wheels by corresponding motor generators, the in-situ steering of the vehicle may be realized.

Third Operating Condition

This operating condition is a parallel operating condition. The dual clutch 31 is in an engaged state, the synchronizer 6 is in an engaged state, and the engine unit 1 and the first motor generator 41 transfer the power to the driving gear 51 of the main reducer via the shift gear set and the synchronizer 6, and the driving gear 51 of the main reducer transfers the power to the front wheels 210 via the differential 54, while two second motor generators 42 transfer the power to the corresponding front wheels 210 and two second motor generators 43 transfer the power to the corresponding rear wheels 220. This operating condition is mainly applicable to a situation where a load is the largest, for example, during quick acceleration, or climbing steep slopes.

This operating condition has the advantages motor generators (e.g. 42 and 43) and the engine unit 1 drive the vehicle simultaneously, thus maximizing the dynamic performance. Compared to a front-wheel drive vehicle and a rear-wheel drive vehicle, a HEV four-wheel drive vehicle has better acceleration performance, gradeability, handling performance and off-road capability. Moreover, since the second motor generators 43 independently drive the left rear wheel and the right rear wheel respectively, an electronic differential function may be achieved, and a mechanical differential in the related art is avoided, thus reducing parts while increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 are configured to drive the front wheels 210 respectively, and the second motor generators 43 are configured to drive the rear wheels 220 respectively. This operating condition is mainly applicable to a situation where a load is medium and an electric quantity of a battery is small.

This operating condition has the advantages that, when compared to a front-wheel drive vehicle and a rear-wheel drive vehicle, the vehicle under the series (i.e. four-wheel drive series) operating condition has better acceleration performance, gradeability, handling performance and off-road capability. Since two second motor generators 42 and 43 drive four wheels independently, the wheels may obtain different torques and rotating speeds, so as to achieve the individual control on the four wheels, thus maximizing the dynamic performance, handling stability and off-road performance. Furthermore, when torques in different directions are applied to the left and right wheels by corresponding motor generators, the in-situ steering of the vehicle may be realized. Moreover, the first motor generator 41 may keep the engine unit 1 running in an optimal economic region through the torque and speed control, thus reducing fuel consumption during the electricity generation.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generators 42 brake the front wheels 210 and generate electricity, and the second motor generators 43 brake the rear wheels 220 and generate electricity. This operating condition is mainly used for braking or decelerating the vehicle.

This operating condition has the advantages that, since the second motor generators 42 and 43 brake four wheels respectively during the decelerating or braking, whether the vehicle is turning or moving straightly, the power of each wheel may be fully absorbed, in the premise of ensuring the braking force and stability of the vehicle, thus maximizing the energy feedback. Moreover, because of the disengagement of the synchronizer 6, while the four motor generators brake the four wheels respectively, the engine unit 1 and the first motor generator 41 may continue generating electricity, so as to enable a stable electricity generation state, avoid frequent switching, and extend the life of components.

Sixth Operating Condition

This operating condition is a series-parallel operating condition. The dual clutch 31 is in an engaged state, the synchronizer 6 is in an engaged state, a part of the power from the engine unit 1 drives the first motor generator 41 via the dual clutch 31 and the shift gear set to generate electricity, the other part of the power from the engine unit 1 is transferred to the driving gear 51 of the main reducer via the shift gear set and the synchronizer 6, the second motor generators 42 drive the front wheels 210 directly via the driving gear 51 of the main reducer, and the second motor generators 43 drive the rear wheels 220 respectively. This operating condition is mainly applicable to a situation where a load is large and an electric quantity of a battery is small, for example, during acceleration or climbing. This operating condition has the advantages of exploiting all the power from the engine unit 1, ensuring the dynamic property of the vehicle while generating electricity, and maintaining the electric quantity of the battery.

The above six operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear of the main reducer as a target value through the rotating speed control, so as to match the rotating speed of the output shaft 24 with the rotating speed of the driving gear of the main reducer as far as possible, thus facilitating the engagement of the synchronizer 6.

During the matching, the second motor generators 42 and 43 may respond to the needs of the driver to increase the torque, such that the vehicle is accelerated, unlike a vehicle in the related art, the vehicle needs not to be accelerated only when the synchronizer 6 is in an engaged state. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The second motor generators 42 and 43 may meet the braking feedback requirements, and the feedback of the first motor generator 41 is not needed. At this time, the second motor generators 42 and the second motor generators 43 may respond to the needs of the driver to brake the wheels and feed back the electric quantity, which need not be like a vehicle in the related art which feeds back the electric quantity only when the synchronizer 6 is in an engaged state.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 can be difficult due to the changing speed of the vehicle. Even if the first motor generator 41 may adjust the rotating speed of the output shaft 24 through the rotating speed control, since the rotating speed of the driving gear of the main reducer along with the speed of the vehicle may not be controllable, the speed adjusting accuracy and rate of the first motor generator 41 may be reduced. Under such road conditions, since the second motor generators 42 and 43 may compensate for the torque of the vehicle, the speed of the vehicle may be stabilized effectively, thus improving the driving experience of the vehicle and simplifying the engagement of the synchronizer 6.

EXAMPLE 2

As shown in FIG. 3, the power transmission system 100 in this example differs from the power transmission system 100 shown in FIG. 2 in the arrangement of the second motor generators 43. In this example, each second motor generator 43 drives a corresponding rear wheel 220 via one second speed changing mechanism 72. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, except that the power transfer between the second motor generators 43 and the corresponding rear wheels 220 is performed via the second speed changing mechanism 72, which will not be detailed here.

EXAMPLE 3

As shown in FIG. 4, the power transmission system 100 in this example differs from the power transmission system 100 shown in FIG. 2 in the arrangement of the second motor generators 43. In this example, one second motor generator 43 is provided and drives the rear wheels 220 via one first speed changing mechanism 71. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, except that since two rear wheels 220 are driven by one second motor generator 43 and one first speed changing mechanism 71, in the premise of no new components, the differential rotation of the rear wheels 220 may not be realized by means of only one motor and one speed changing mechanism, however, it would be appreciated that a differential integrally formed with the first speed changing mechanism 71 may be added to realize the differential rotation of the two rear wheels 220.

EXAMPLE 4

As shown in FIG. 5, the power transmission system 100 in this example differs from the power transmission system 100 shown in FIG. 2 in the arrangement of the second motor generators 42. In this example, the second motor generators 42 are disposed at two sides of the differential 54 back to back respectively. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, which will not be detailed here.

EXAMPLE 5

As shown in FIG. 6, the power transmission system 100 in this example differs from the power transmission system 100 shown in FIG. 5 in the arrangement of the second motor generators 43. In this example, each second motor generator 43 drives a corresponding rear wheel 220 via one second speed changing mechanism 72. Other parts in this example are substantially the same as those in the power transmission system 100 shown in FIG. 2, so the detailed description thereof will be omitted here. The operating conditions of the power transmission system 100 in this example are substantially the same as those of the power transmission system 100 shown in FIG. 2, which will not be detailed here.

EXAMPLE 6

As shown in FIG. 7, the power transmission system 100 in this example differs from the power transmission system 100 shown in FIG. 5 in the arrangement of the second motor generators 43. In this example, one second motor generator 43 is provided and drives the rear wheels 220 via one first speed changing mechanism 71. Other parts in this example are substantially the same as those in the power transmission system 100 shown in FIG. 5, so the detailed description thereof will be omitted here. The operating conditions of the power transmission system 100 in this example are substantially the same as those of the power transmission system 100 shown in FIG. 5, except that since two rear wheels 220 are driven by one second motor generator 43 and one first speed changing mechanism 71, in the premise of no new components, the differential rotation of the rear wheels 220 may not be realized by means of only one motor and one speed changing mechanism, however, it would be appreciated that a differential integrally formed with the first speed changing mechanism 71 may be added to realize the differential rotation of the two rear wheels 220.

EXAMPLE 7

As shown in FIG. 8, the power transmission system 100 in this example differs from the power transmission system 100 shown in FIG. 2 in the type of the clutch as well as the number of the input shafts, the driving gears 25 and the driven gears 26. In this example, the clutch is a triple clutch 32, three input shafts are provided, and correspondingly three pairs of driving gears 25 and driven gears 26 are provided. Other parts in this example are substantially the same as those in the power transmission system 100 shown in FIG. 2, so the detailed description thereof will be omitted here.

EXAMPLE 8

As shown in FIG. 9, the power transmission system 100 in this example differs from the power transmission system 100 shown in FIG. 2 in that the second motor generators 43 in the example shown in FIG. 2 are eliminated, and the power transmission system 100 in this example is in a two-wheel drive mode.

The power transmission system 100 in this example may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and the second motor generators 42 drive the front wheels 210 directly. This operating condition is mainly applicable to a situation where a load is small and an electric quantity of a battery is large, for example, during uniform motions or under urban operating conditions.

This operating condition has the advantages that, since the second motor generators 42 directly drive the front wheels 210, the transmission chain is the shortest, and operating components is the fewest, thus achieving maximum transmission efficiency and minimum noise. Moreover, since the second motor generators 42 independently drive the left front wheel 210 and the right front wheel 210 respectively, an electronic differential function may be achieved, thus increasing the handling stability and reducing the amount of tire wear.

Second Operating Condition

This operating condition is a pure EV operating condition of three motors. The dual clutch 31 is in a disengaged state, the synchronizer 6 is in an engaged state, the engine unit 1 does not operate, the first motor generator 41 transfers the power to the driving gear 51 of the main reducer via the shift gear set and the synchronizer 6, and the driving gear 51 of the main reducer evenly distributes the power to the left and right front wheels 210 via the differential 54, while the second motor generators 42 directly drive the left and right front wheels 210.

This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road).

Third Operating Condition

This operating condition is a parallel operating condition. The dual clutch 31 is in a disengaged state, the synchronizer 6 is in an engaged state, the engine unit 1 and the first motor generator 41 transfer the power to the driving gear 51 of the main reducer via the shift gear set and the synchronizer 6, the driving gear 51 of the main reducer evenly distributes the power to the left and right front wheels 210 via the differential 54, and the second motor generators 42 directly drive the left and right front wheels 210. This operating condition is mainly applicable to a situation where a load is the largest, for example, during quick acceleration, or climbing steep slopes.

This operating condition has the advantages that three motors and the engine unit 1 drive the vehicle simultaneously, thus maximizing the dynamic performance.

Fourth Operating Condition

This operating condition is a series operating condition. The dual clutch 31 is in an engaged state, the synchronizer 6 is in a disengaged state, the engine unit 1 drives the first motor generator 41 via the dual clutch 31 and the shift gear set to generate electricity, the second motor generators 42 directly drive the front wheels 210. This operating condition is mainly applicable to a situation where a load is medium and an electric quantity of a battery is small.

This operating condition has the advantages that, since the second motor generators 42 directly drive the front wheels 210, the transmission chain is the shortest, and operating components is the fewest, thus achieving maximum transmission efficiency and minimum noise.

Meanwhile, the first motor generator 41 may keep the engine unit 1 running in an optimal economic region through the torque and speed control, thus reducing fuel consumption during the electricity generation. Moreover, since the second motor generators 42 independently drive the left front wheel 210 and the right front wheel 210 respectively, an electronic differential function may be achieved, thus increasing the handling stability and reducing the amount of tire wear.

Fifth Operating Condition

This operating condition is a braking/decelerating feedback operating condition. The dual clutch 31 is in an engaged state, the synchronizer 6 is in a disengaged state, the engine unit 1 drives the first motor generator 41 to generate electricity, the second motor generator 42 directly brake the front wheels 210 and generate electricity. This operating condition is mainly used for braking or decelerating the vehicle. This operating condition has the advantages that, since the second motor generator 42 brake two wheels respectively during the decelerating or braking of the vehicle, the braking energy may be absorbed to the largest extent and converted into electric energy, and the engine unit 1 and the first motor generator 41 may continue generating electricity, so as to enable a stable electricity generation state and avoid frequent switching.

The above five operating conditions may be switched, and typical switching between operating conditions is switching from the fourth operating condition to the third operating condition, or switching from the fourth operating condition to the fifth operating condition.

Specifically, the switching from the fourth operating condition to the third operating condition will be described as follows. For example, when it is necessary to quickly accelerate for overtaking or avoiding obstacles, according to the throttle demand of a driver, the power transmission system 100 may switch from the fourth operating condition to the third operating condition. At this time, the first motor generator 41 may adjust the rotating speed of the output shaft 24 with the rotating speed of the driving gear 51 of the main reducer as a target value through the rotating speed control, so as to match the rotating speed of the output shaft 24 with the rotating speed of the driving gear 51 of the main reducer as far as possible, thus facilitating the engagement of the synchronizer 6.

During the matching, the second motor generators 42 may respond to the needs of the driver to increase the torque, such that the vehicle is accelerated, unlike a vehicle in the related art, the vehicle does not require the synchronizer 6 to be in an engaged state in order to be accelerated. The torque compensation in advance may greatly shorten the torque response time and improve the instantaneous acceleration performance of the vehicle.

As another example, the switching from the fourth operating condition to the fifth operating condition will be described as follows. When the vehicle needs to be braked or decelerated, according to the throttle demand or the brake pedal operation of the driver, the power transmission system 100 may switch from the fourth operating condition to the fifth operating condition. The second motor generators 42 may meet the braking feedback requirements, and the feedback of the first motor generator 41 is not needed. At this time, the second motor generators 42 may respond to the needs of the driver to brake the wheels and feed back the electric quantity, unlike a vehicle in the related art, the vehicle does not require the synchronizer 6 to be in an engaged state to feed back the electric quantity.

Meanwhile, the engine unit 1 and the first motor generator 41 may be kept generating electricity, under the braking operating condition and the series operating condition. The torque compensation in advance may greatly shorten the motor braking response time and increase the feedback electric quantity.

Specifically, under complex road conditions, for example, when the vehicle runs uphill, downhill, on a bumpy road, or under a low adhesion condition, the engagement of the synchronizer 6 can be difficult due to the changing speed of the vehicle. Even if the first motor generator 41 may adjust the rotating speed of the output shaft 24 through the rotating speed control, since the rotating speed of the driving gear of the main reducer along with the speed of the vehicle is not controllable, the speed adjusting accuracy and rate of the first motor generator 41 may be reduced. Under these road conditions, since the second motor generators 42 may compensate for the torque of the vehicle, the speed of the vehicle may be stabilized effectively, thus improving the driving experience of the vehicle and simplifying the engagement of the synchronizer 6.

EXAMPLE 9

As shown in FIG. 10, the power transmission system 100 in this example differs from the power transmission system 100 shown in FIG. 9 in the arrangement of the second motor generators 42. In this example, the second motor generators 42 are disposed at two sides of the differential 54 back to back respectively. Other parts in this example are substantially the same as those in the power transmission system 100 shown in FIG. 9, so the detailed description thereof will be omitted here.

EXAMPLE 10

As shown in FIG. 11, the power transmission system 100 in this example differs from the power transmission system 100 shown in FIG. 9 in the arrangement of the second motor generators 42. In this example, two second motor generators 42 are provided, and each second motor generator 42 drives a corresponding rear wheel 220 via one fourth speed changing mechanism 74. Other parts in this example are substantially the same as those in the power transmission system 100 shown in FIG. 9, so the detailed description thereof will be omitted here.

The power transmission system 100 in this example may have at least the following operating conditions.

First Operating Condition

This operating condition is a pure EV operating condition of the second motor generator 42. The dual clutch 31 is in a disengaged state, the synchronizer 6 is in a disengaged state, the engine unit 1 and the first motor generator 41 do not operate, and each second motor generator 42 drives one rear wheel 220 via a corresponding fourth speed changing mechanism 74. This operating condition is mainly applicable to a situation where a load is small and an electric quantity of a battery is large, for example, during uniform motions or under urban operating conditions. This operating condition has the advantages that, since the second motor generators 42 drive the rear wheels 220, compared to a front-wheel drive vehicle, the vehicle in this example has better acceleration performance, gradeability and steering capability. Moreover, since the second motor generators 42 independently drive the left rear wheel and the right rear wheel respectively, an electronic differential function may be achieved, thus increasing the handling stability and reducing the amount of tire wear. In a front-wheel drive part, since the association between the output gear 51 and the front wheels 210 is interrupted by the synchronizer 6, there is no mechanical loss in the front-wheel drive part, thus reducing the energy consumption of the vehicle.

Second Operating Condition

This operating condition is a pure EV four-wheel drive operating condition. The dual clutch 31 is in a disengaged state, the synchronizer 6 is in an engaged state, the engine unit 1 does not operate, the first motor generator 41 drives the front wheels 210 respectively, and the second motor generators 42 drive the rear wheels 220 respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Third Operating Condition

This operating condition is a parallel operating condition. The dual clutch 31 is in a disengaged state, the synchronizer 6 is in an engaged state, the engine unit 1 and the first motor generator 41 drive the front wheels 210 simultaneously, and the second motor generators 42 drive the rear wheels 220 respectively. This operating condition is mainly applicable to a situation where a load is the largest, for example, during quick acceleration, or climbing steep slopes. This operating condition has the advantages that two motor generators and the engine unit 1 drive the vehicle simultaneously, thus maximizing the dynamic performance. Compared to a front-wheel drive vehicle and a rear-wheel drive vehicle, a HEV four-wheel drive vehicle has better acceleration performance, gradeability, handling performance and off-road capability. Moreover, since the second motor generators 42 independently drive the left rear wheel and the right rear wheel respectively, an electronic differential function may be achieved, thus increasing the handling stability and reducing the amount of tire wear.

Fourth Operating Condition

This operating condition is a series operating condition. The dual clutch 31 is in an engaged state, the synchronizer 6 is in a disengaged state, the engine unit 1 drives the first motor generator 41 to generate electricity, and the second motor generators 42 drive the rear wheels 220 respectively. This operating condition is mainly applicable to a situation where a load is medium and an electric quantity of a battery is small. This operating condition has the advantages that, since the two second motor generators 42 independently drive the left rear wheel and the right rear wheel respectively, an electronic differential function may be achieved, thus increasing the handling stability and reducing the amount of tire wear. Compared to a front-wheel drive vehicle, the vehicle under the series operating condition has better acceleration performance, gradeability, and steering capability. Moreover, the first motor generator 41 may keep the engine unit 1 running in an optimal economic region through the torque and speed control, thus reducing fuel consumption during the electricity generation.

Fifth Operating Condition

This operating condition is a braking/decelerating feedback operating condition. The dual clutch 31 is in a disengaged state, the synchronizer 6 is in an engaged state, the engine unit 1 does not operate, and the first motor generator 41 and the second motor generators 42 brake the vehicle and generate electricity simultaneously. This operating condition has the advantages that, since three motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle. Moreover, two second motor generators 42 may control the braking force independently, thus improving the handling stability of the vehicle during braking when turning, and further increasing the feedback energy.

Similarly, the operating conditions of the power transmission system 100 in this example may be switched, and typical switching between operating conditions is switching from the fourth operating condition to the third operating condition, or switching from the fourth operating condition to the fifth operating condition. The switching between the operating conditions of the power transmission system 100 in this example is similar to that in the above examples, so the detailed description thereof will be omitted here.

EXAMPLE 11

As shown in FIG. 12, the power transmission system 100 in this example differs from the power transmission system 100 shown in FIG. 9 in the arrangement of the second motor generators 42. In this example, one second motor generators 42 is provided, and the second motor generator 42 drives the rear wheels 220 via one third speed changing mechanism 73. Other parts in this example are substantially the same as those in the power transmission system 100 shown in FIG. 9, so the detailed description thereof will be omitted here.

In this example, the second motor generator 42 may be used to drive the vehicle separately. At this time, the dual clutch 31 and the synchronizer 6 are in a disengaged state. This operating condition is mainly applicable to a situation where a load is small and an electric quantity of a battery is large, for example, during uniform motions or under urban operating conditions. This operating condition has the advantages that, since the second motor generators 42 directly drive the rear wheels 220 via the third speed changing mechanism 73, compared to a front-wheel drive vehicle, the vehicle in this example has better acceleration performance, gradeability and steering capability. In a front-wheel drive part, since the association between the output gear 51 and the front wheels 210 is interrupted by the synchronizer 6, there is no mechanical loss in the front-wheel drive part, thus reducing the energy consumption of the vehicle. In a rear-wheel drive part, a differential integrally formed with the third speed changing mechanism 73 may also be provided.

In this example, the power transmission system 100 may also have a pure EV four-wheel drive operating condition. At this time, the dual clutch 31 is in a disengaged state, the synchronizer 6 is in an engaged state, the engine unit 1 does not operate, the first motor generator 41 drive the front wheels 210 respectively, and the second motor generator 42 drives the rear wheels 220 respectively. This operating condition is mainly applicable to a situation where a load is large and an electric quantity of a battery is large, for example, during acceleration, climbing, overtaking, or high-speed running. This operating condition has the advantages of having better dynamic performance than a single-motor drive, and having better economic efficiency and lower noise than a hybrid drive. A typical application highlighting the advantages of this operating condition is traffic congestion at a steep slope (mountain road). Moreover, compared to a front-wheel drive vehicle and a rear-wheel drive vehicle, a pure EV four-wheel drive vehicle has better acceleration performance, gradeability, handling performance and off-road capability.

In this example, the power transmission system 100 may also have a parallel operating condition. The dual clutch 31 is in an engaged state, the synchronizer 6 is in an engaged state, the engine unit 1 and the first motor generator 41 drive the front wheels 210 simultaneously, and the second motor generator 42 drive the rear wheels 220. This operating condition is mainly applicable to a situation where a load is the largest, for example, during quick acceleration, or climbing steep slopes. This operating condition has the advantages that two motor generators and the engine unit 1 drive the vehicle simultaneously, thus maximizing the dynamic performance. Compared to a front-wheel drive vehicle and a rear-wheel drive vehicle, a HEV four-wheel drive vehicle has better acceleration performance, gradeability, handling performance and off-road capability.

In this example, the power transmission system 100 may also have a series operating condition. The dual clutch 31 is in an engaged state, the synchronizer 6 is in a disengaged state, the engine unit 1 drives the first motor generator 41 to generate electricity, and the second motor generator 42 drive the rear wheels 220. This operating condition is mainly applicable to a situation where a load is medium and an electric quantity of a battery is small. This operating condition has the advantages that compared to a front-wheel drive vehicle, the vehicle under the series operating condition has better acceleration performance, gradeability, handling performance and steering capability. Moreover, the first motor generator 41 may keep the engine unit 1 running in an optimal economic region through the torque and speed control, thus reducing fuel consumption during the electricity generation.

In this example, the power transmission system 100 may also have a braking/decelerating feedback operating condition. The dual clutch 31 is in a disengaged state, the synchronizer 6 is in an engaged state, the engine unit 1 does not operate, and the first motor generator 41 and the second motor generator 42 brake the vehicle and generate electricity simultaneously. This operating condition has the advantages that, since two motors brake the vehicle simultaneously during the decelerating or braking of the vehicle, the braking energy may be absorbed to the largest extent and converted into electric energy. By the disengagement of the dual clutch, the braking of the vehicle by the friction torque of the engine unit may be eliminated, so that more power is left to be absorbed by the motor. Because of the braking feedback of the front-wheel drive and the rear-wheel drive, the braking force may be distributed to front and rear motors in the premise of ensuring the braking force of the vehicle, and more electric energy may be fed back compared to a front-wheel drive vehicle or a rear-wheel drive vehicle.

Similarly, the operating conditions of the power transmission system 100 in this example may be switched, and typical switching between operating conditions is switching from the fourth operating condition to the third operating condition, or switching from the fourth operating condition to the fifth operating condition. The switching between the operating conditions of the power transmission system 100 in this example is similar to that in the above examples, so the detailed description thereof will be omitted here.

EXAMPLE 12

As shown in FIG. 13, the power transmission system 100 in this example differs from the power transmission system 100 shown in FIG. 9 in the arrangement of the second motor generators 42. In this example, two second motor generators 42 are provided and are wheel-side motors, and each second motor generator 42 drives a corresponding rear wheel 220. The power transmission manner in this example is similar to that shown in FIG. 11, and other parts in this example are substantially the same as those in the power transmission system 100 shown in FIG. 9, so the detailed description thereof will be omitted here.

EXAMPLE 13

As shown in FIG. 14, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25 by fixing, the double-linked gear 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. Indirect power transmission between the output terminal of the first motor generator 41 and the second intermediate shaft gear 452 via an intermediate idler 44 is performed.

The synchronizer 6 is disposed on the output shaft 24 and configured to engage with the double-linked gear 26. The driving gear 51 of the main reducer is fixed on the output shaft 24. The driving gear 51 of the main reducer is externally configured to mesh with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels 200.

EXAMPLE 14

As shown in FIG. 15, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22.

A first intermediate shaft gear 451 and a second intermediate shaft gear 452 are fixed on the intermediate shaft 45. The first intermediate shaft gear 451 is configured to mesh with the driving gear 25 on the second input shaft 22. The output terminal of the first motor generator 41 is directly configured to mesh with the second intermediate shaft gear 452 for power transmission.

The synchronizer 6 is disposed on the output shaft 24 and configured to engage with the double-linked gear 26. The driving gear 51 of the main reducer is fixed on the output shaft 24. The driving gear 51 of the main reducer is externally configured to mesh with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels 200.

EXAMPLE 15

As shown in FIG. 16, the engine unit 1 is coupled with the input terminal 313 of the dual clutch 31, the first output terminal 311 of the dual clutch 31 is coupled with the first input shaft 21, the second output terminal 312 of the dual clutch 31 is coupled with the second input shaft 22, and the second input shaft 22 is coaxially fitted over the first input shaft 21.

Each of the first input shaft 21 and the second input shaft 22 is provided with one driving gear 25, the double-linked gear 26 (i.e. a driven gear) is freely fitted over the output shaft 24, the first gear part 261 of the double-linked gear 26 is configured to mesh with the driving gear 25 on the first input shaft 21, and the second gear part 262 of the double-linked gear 26 is configured to mesh with the driving gear 25 on the second input shaft 22. The output terminal of the first motor generator 41 is directly configured to mesh with the first gear part 261 for power transmission.

The synchronizer 6 is disposed on the output shaft 24 and configured to engage with the double-linked gear 26. The driving gear 51 of the main reducer is fixed on the output shaft 24. The driving gear 51 of the main reducer is externally configured to mesh with the driven gear 53 of the main reducer, and the driven gear 53 of the main reducer may be fixed on a housing of the differential 54, so as to transfer the power to the differential 54. The differential 54 distributes the power and adaptively transfers the distributed power to half axles at two sides of the vehicle, so as to drive the wheels 200.

EXAMPLE 16

As shown in FIG. 17, the power transmission system 100 in this example differs from the power transmission system 100 shown in FIG. 14 in that the clutch 9 is provided instead of the synchronizer 6 of the power transmission system 100 in FIG. 14, and the driving gear 51 of the main reducer is fixed on the output shaft 24.

EXAMPLE 17

As shown in FIG. 18, the power transmission system 100 in this example differs from the power transmission system 100 shown in FIG. 15 in that the clutch 9 is provided instead of the synchronizer 6 of the power transmission system 100 in FIG. 15, and the driving gear 51 of the main reducer is fixed on the output shaft 24.

EXAMPLE 18

As shown in FIG. 19, the power transmission system 100 in this example differs from the power transmission system 100 shown in FIG. 16 in that the clutch 9 is provided instead of the synchronizer 6 of the power transmission system 100 in FIG. 16, and the driving gear 51 of the main reducer is fixed on the output shaft 24.

It should be noted that, as shown in FIGS. 14-19, the power transmission system 100 may further include at least one of the second motor generators 42 and 43 (not shown in FIGS. 14-19), and the arrangement of at least one of the second motor generators 42 and 43 may be the same as that in FIGS. 2-13, for example, being in a wheel-side form, or being disposed at two sides of the differential back to back. For example, alternatively, the driving gear 51 of the main reducer of the power transmission system 100 shown in FIGS. 14-19 may be configured to drive the front wheels 210, and the rear-wheel drive may be the same as that shown in FIG. 12, i.e. the rear wheels 220 are driven by one second motor generator 42 and one reducing mechanism.

Embodiments of the present disclosure further provide a vehicle including the abovementioned power transmission system 100. It would be appreciated that, other components (e.g., a driving system, a steering system, and a braking system) of the vehicle according to embodiments of the present disclosure are well known to those skilled in the art, so the detailed description thereof will be omitted here.

Based on the abovementioned power transmission system of the vehicle, a drive control method for a vehicle according to embodiments of the present disclosure will be described in detail below.

The vehicle includes an engine unit, a transmission unit configured to selectively coupled with the engine unit, a first motor generator coupled with the transmission unit, an output unit configured to transfer a power transmitted by the transmission unit to at least one of front and rear wheels of the vehicle, a power switching device configured to adjust a power transmission between the transmission unit and the output unit, a second motor generator configured to drive the at least one of the front and rear wheels, and a power battery coupled with the first and second motor generators respectively. The power switching device is configured as a synchronizer configured to selectively synchronize the output unit and the transmission unit.

Figure 20:
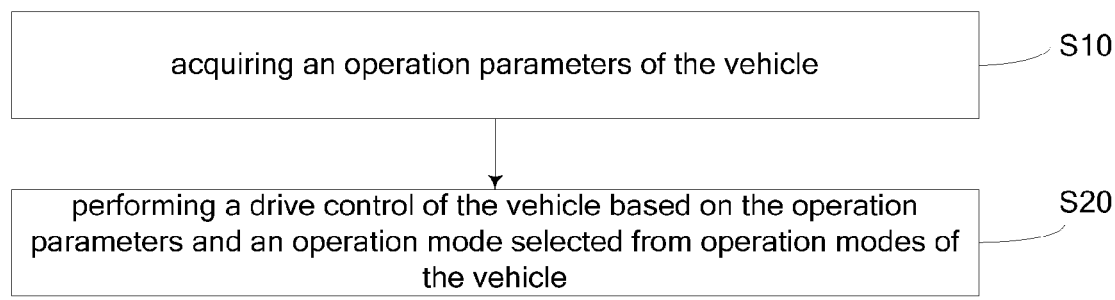
FIG. 20 is a flow chart illustrating an exemplary drive control method for a vehicle according to an embodiment of the present disclosure.

FIG. 20 is a flow chart of a drive control method for a vehicle according to an embodiment of the present disclosure. As shown in FIG. 20, the drive control method for the vehicle according to an embodiment of the present disclosure includes the following steps.

In step 10, an operation parameter of the vehicle is acquired.

In some embodiments, the operation parameter of the vehicle includes at least one of an electric quantity of the power battery, a speed of the vehicle, a maximum discharge power of the power battery, a slope of a road where the vehicle runs on, a required torque of the vehicle, and a required power of the vehicle.

In step 20, a drive control of the vehicle is performed based on the operation parameter and an operation mode selected from operation modes of the vehicle.

In some embodiments, the operation modes of the vehicle may include an electric vehicle (EV) mode and a hybrid electric vehicle (HEV) mode. For example, "EV mode" may refer to the pure EV operating conditions of the power transmission system of the vehicle discussed above. "HEV mode" is a hybrid mode. In such a mode, the engine unit and the motor generator can supply energy simultaneously. The HEV mode may include at least one of: a series operation mode, a parallel operation mode, a series-parallel operation mode.

In some embodiments, each of the EV mode and a HEV mode includes a front-wheel drive operation mode, a rear-wheel drive operation mode, and a four-wheel drive operation mode. The HEV mode may include a series operation mode, a parallel operation mode, and a series-parallel operation mode. For example, the EV mode may include an EV-eco (electric-vehicle-economy) mode and an EV-s (electric-vehicle-sport) mode, and the HEV mode includes a HEV-eco (hybrid-electric-vehicle-economy) mode and a HEV-s (hybrid-electric-vehicle-sport) mode. Specifically, depending on factors such as the driver's intent, operating conditions of various system components of the vehicle, and road conditions, it is possible to automatically select one operation mode among the series operation mode, the parallel operation mode, and the series-parallel operation mode; to automatically select one operation mode among the front-wheel drive operation mode, the rear-wheel drive operation mode, and the four-wheel drive operation mode; and to manually switch between the EV-eco mode, the EV-s mode, the HEV-eco mode, and the HEV-s mode.

As shown in FIG. 12, by way of example and without limitation, the drive control mode for the vehicle according to embodiments of the present disclosure will be described with reference to a rear-wheel drive power transmission system 100 of a series-parallel four-wheel vehicle. The series-parallel power transmission system 100 includes an engine unit 1, a first motor generator 41, a second motor generator 42 (including a reducing mechanism), a dual clutch 31 including the first and second output terminals 311, 322, a dual transmission 2a, and a synchronizer 6. As used herein, the term "series operation mode" means that the engine unit 1 drives the first motor generator 41 to generate electricity which is supplied to the second motor generator 42 or the power battery for storage, and the second motor generator 42 drives the vehicle to run. Specifically, as shown in FIG. 12, when the vehicle operates in the series operation mode, the engine unit 1 drives the first motor generator 41 via the second output terminal 322 (engaged) in the dual clutch 31 to generate electricity, which is supplied to the second motor generator 42 to drive the vehicle.

As used herein, the term "parallel operation mode" means that the engine unit and the motor generator simultaneously drive the vehicle to run. Specifically, by the engagement of any one of the first and second output terminals 311 and 322 in the dual clutch, the engine unit can transfer the power thereof to the transmission (third gear or sixth gear), and finally the power is transmitted to a differential via the synchronizer so as to transmit the power to the wheels, while the first motor generator transmits the power to the wheels via the transmission and the synchronizer.

The series-parallel operation mode combines the advantages of the series operation mode and the parallel operation mode, and avoids the disadvantages of the series operation mode and the parallel operation mode. When the vehicle operates in the series-parallel operation mode, a part of the power of the engine unit drives the wheels via the second output terminal 322 (engaged), and the remaining power of the engine unit drives the first motor generator via a series path to generate electricity, which is supplied to the second motor generator to drive the vehicle.

In the EV mode, when a low power is needed, the second motor generator can drive the vehicle separately; and when a high power is needed, the first and second motor generators can drive the vehicle simultaneously. In the HEV mode, when a low power is needed, the motor generator drives the vehicle separately; when a medium power is needed, the engine unit drives the vehicle separately, and the surplus power of the engine unit may be converted into electric energy via the first motor generator, and the electric energy can be stored in the power battery; and when a high power is needed, the engine unit and the motor generator simultaneously drive the vehicle to run.

As used herein, the term "rear-wheel drive operation mode" means that the second motor generator separately drives the vehicle to run, while the first motor generator and the engine unit do not operate or cooperate to generate electricity. As used herein, the term "front-wheel drive operation mode" means that at least one of the first motor generator and the engine unit drives the vehicle to run. As used herein, the term "four-wheel drive operation mode" means that front-wheel drive motors and rear-wheel drive motors simultaneously drive the vehicle to run, e.g. the motor generators corresponding to four wheels simultaneously drive the vehicle to run.

After the operation parameter of the vehicle is acquired, the drive control of the vehicle is performed based on the operation parameter, and the operation mode selected among the operation modes of the vehicle. Step 20 will be described in detail below with reference to various embodiments.

In some embodiments, if the vehicle runs in the EV mode, when an instruction of switching from the EV mode to the HEV mode is received, the vehicle is controlled to switch to the HEV mode; when the instruction of switching from the EV mode to the HEV mode is not received, if the electric quantity of the power battery is less than or equal to a first electric quantity threshold, or if the maximum discharge power of the power battery is less than or equal to a first discharge power threshold, or if the slope of the road where the vehicle runs on is greater than or equal to a first slope threshold, the vehicle can be controlled to switch to the HEV mode. Otherwise, the vehicle is controlled to remain in the EV mode.

Figure 21:
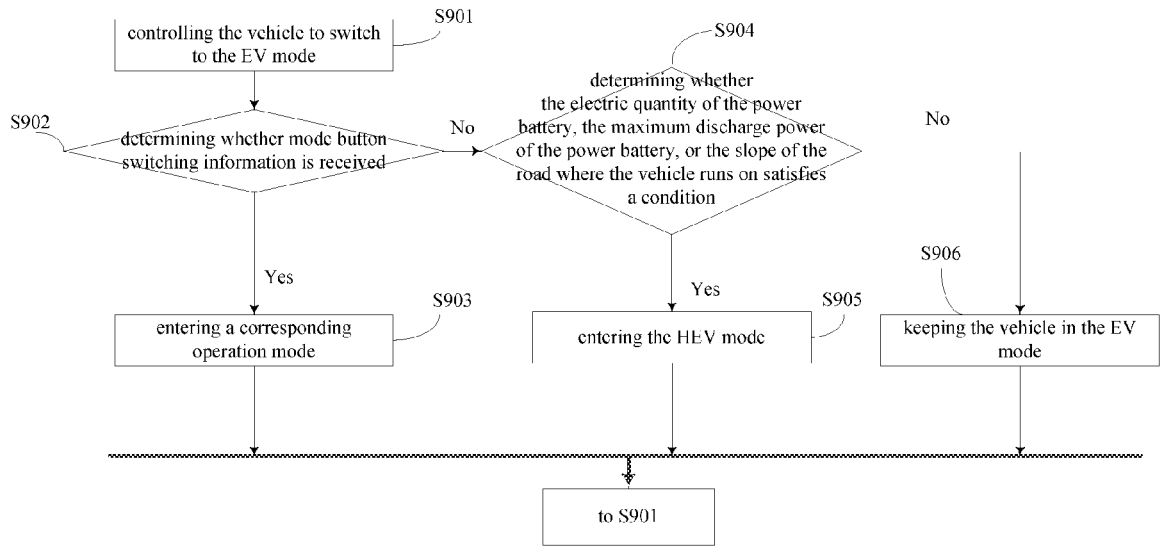
FIG. 21 is a flow chart illustrating an exemplary method of switching from an EV mode to a HEV mode of a four-wheel drive electric vehicle in a series-parallel operation mode, according to an embodiment of the present disclosure.

FIG. 21 is a flow chart illustrating an exemplary method of switching from an EV mode to a HEV mode for a four-wheel drive electric vehicle in a series-parallel operation mode, according to an embodiment of the present disclosure. As shown in FIG. 21, the switching from the EV mode to the HEV mode includes the following steps:

In step 901, the vehicle is controlled to switch to the EV mode.

In step 902, it is determined whether mode button switching information is received, if yes, step 903 is executed; otherwise, step 904 is executed.

For example, manual mode button switching information is acquired, and the mode button switching information may be either a HEV mode button switching operation or an EV mode button switching operation.

In step 903, a corresponding operation mode is entered.

For example, when switching from the EV mode to the HEV mode, the vehicle is controlled to run in the HEV mode, which will be described in detail below. For example, if the button operation occurs, a corresponding operation mode (e.g., a HEV or EV mode) is entered according to the manual button operation.

In step 904, it is determined whether the electric quantity of the power battery, the maximum discharge power of the power battery, or the slope of the road where the vehicle runs on satisfies a condition, if yes, step 905 is executed; otherwise, step 906 is executed.

For example, if no button operation occurs, it is determined whether SOC≤Soc1, or Pb≤Pb1, or i≥i1, where SOC (state of charge) is the electric quantity of the power battery, Soc1 is the first electric quantity threshold, Pb is the maximum discharge power of the power battery, Pb1 is the first discharge power threshold, i is the slope of the road where the vehicle runs on, and i1 is the first slope threshold.

In step 905, the HEV mode is entered.

Specifically, if SOC≤Soc1, or Pb≤Pb1, or i≥i1, the HEV mode is entered automatically.

In step 906, the vehicle is kept in the EV mode.

Specifically, if the condition SOC≤Soc1, or Pb≤Pb1, or i≥i1 is not satisfied, the vehicle is kept in the EV mode.

In some embodiments, if the vehicle runs in the HEV mode, when an instruction of switching from the HEV mode to the EV mode is received, if the electric quantity of the power battery is greater than a second electric quantity threshold, and if the maximum discharge power of the power battery is greater than a second discharge power threshold, and if the slope of the road where the vehicle runs on is less than a second slope threshold, and if the speed of the vehicle is less than a first speed threshold, the vehicle will be controlled to switch to the EV mode. Otherwise, the vehicle is controlled to be kept in the HEV mode.

Figure 22:
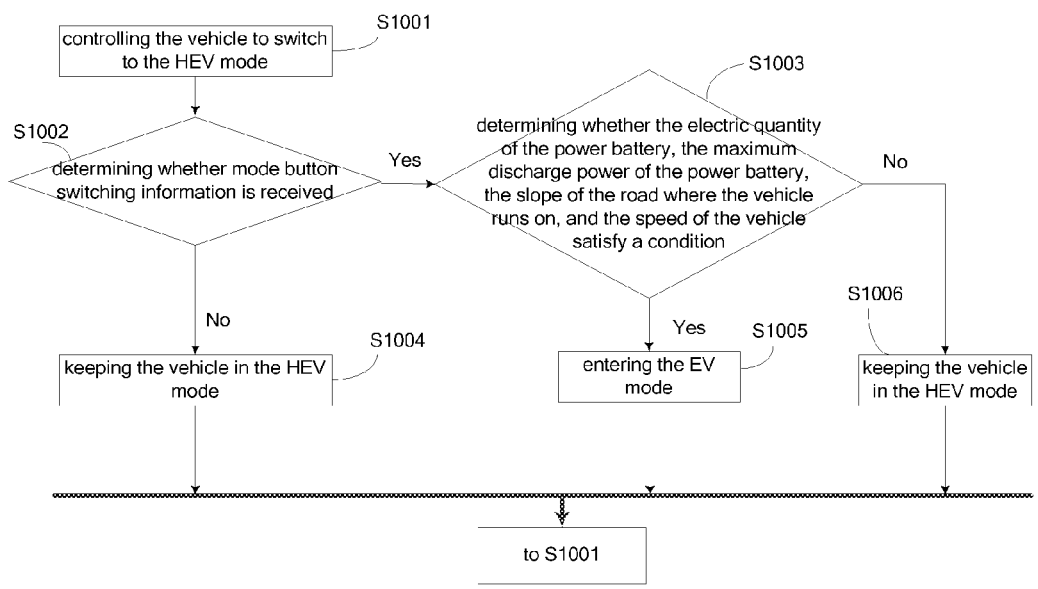
FIG. 22 is a flow chart illustrating an exemplary method of switching from a HEV mode to an EV mode of a series-parallel electric vehicle, according to an embodiment of the present disclosure.

FIG. 22 is a flow chart illustrating an exemplary method of switching from a HEV mode to an EV mode of a series-parallel electric vehicle according to an embodiment of the present disclosure. As shown in FIG. 22, the switching from the HEV mode to the EV mode includes the following steps.

In step 1001, the vehicle is controlled to switch to the HEV mode.

In step 1002, it is determined whether mode button switching information is received, if yes, step 1003 is executed; otherwise, step 1004 is executed.

For example, manual mode button switching information is acquired, and the mode button switching information may be either a HEV mode button switching operation or an EV mode button switching operation.

At step 1003, it is determined whether the electric quantity of the power battery, the maximum discharge power of the power battery, the slope of the road where the vehicle runs on, and the speed of the vehicle satisfy a condition, if yes, step 1005 is executed; otherwise, step 1006 is executed.

For example, if the button operation occurs, it is determined whether SOC>Soc2, Pb>Pb2, i<i2, and V<$V_{max}$, where SOC is the electric quantity of the power battery, Soc2 is the second electric quantity threshold, Pb is the maximum discharge power of the power battery, Pb2 is the second discharge power threshold, i is the slope of the road where the vehicle runs on, i2 is the second slope threshold, V is the speed of the vehicle, and $V_{max}$ is a first speed threshold.

In step 1004, the vehicle is kept in the HEV mode.

For example, if no button operation is detected, the vehicle is kept in the HEV mode.

In step 1005, the EV mode is entered.

Specifically, if SOC>Soc2, Pb>Pb2, i<i2, and V<$V_{max}$, the EV mode is entered, i.e. the vehicle is controlled to run in the EV mode.

In step 1006, the vehicle is kept in the HEV mode.

Specifically, if the condition SOC>Soc2, Pb>Pb2, i<i2, and V<$V_{max}$ is not satisfied, the vehicle is kept in the EV mode.

Hereinafter, the EV mode and the HEV mode of the vehicle will be described in detail based on the operation parameter of the vehicle.

In some embodiments, when the selected operation mode is the EV mode, it is determined whether the speed of the vehicle is greater than a second speed threshold; if the speed of the vehicle is less than or equal to the second speed threshold, it is determined whether the required torque of the vehicle is less than or equal to a first torque threshold; if the required torque of the vehicle is less than or equal to the first torque threshold, the synchronizer will be controlled to disengage and the second motor generator operates with the required torque; if the required torque of the vehicle is greater than the first torque threshold, it is determined whether the required torque of the vehicle is greater than a sum of the first torque threshold and a second torque threshold; if the required torque of the vehicle is less than or equal to the sum of the first torque threshold and the second torque threshold, the synchronizer will be controlled to engage, the second motor generator operates with the first torque threshold, and the first motor generator operates with a difference between the required torque and the first torque threshold; if the required torque of the vehicle is greater than the sum of the first torque threshold and the second torque threshold, the synchronizer is controlled to engage, a first operation torque of the second motor generator is calculated according to the required torque, the first torque threshold and the second torque threshold, the second motor generator can operate with the first operation torque, and the first motor generator can operate with a torque difference between the required torque and the first operation torque.

Figure 23:
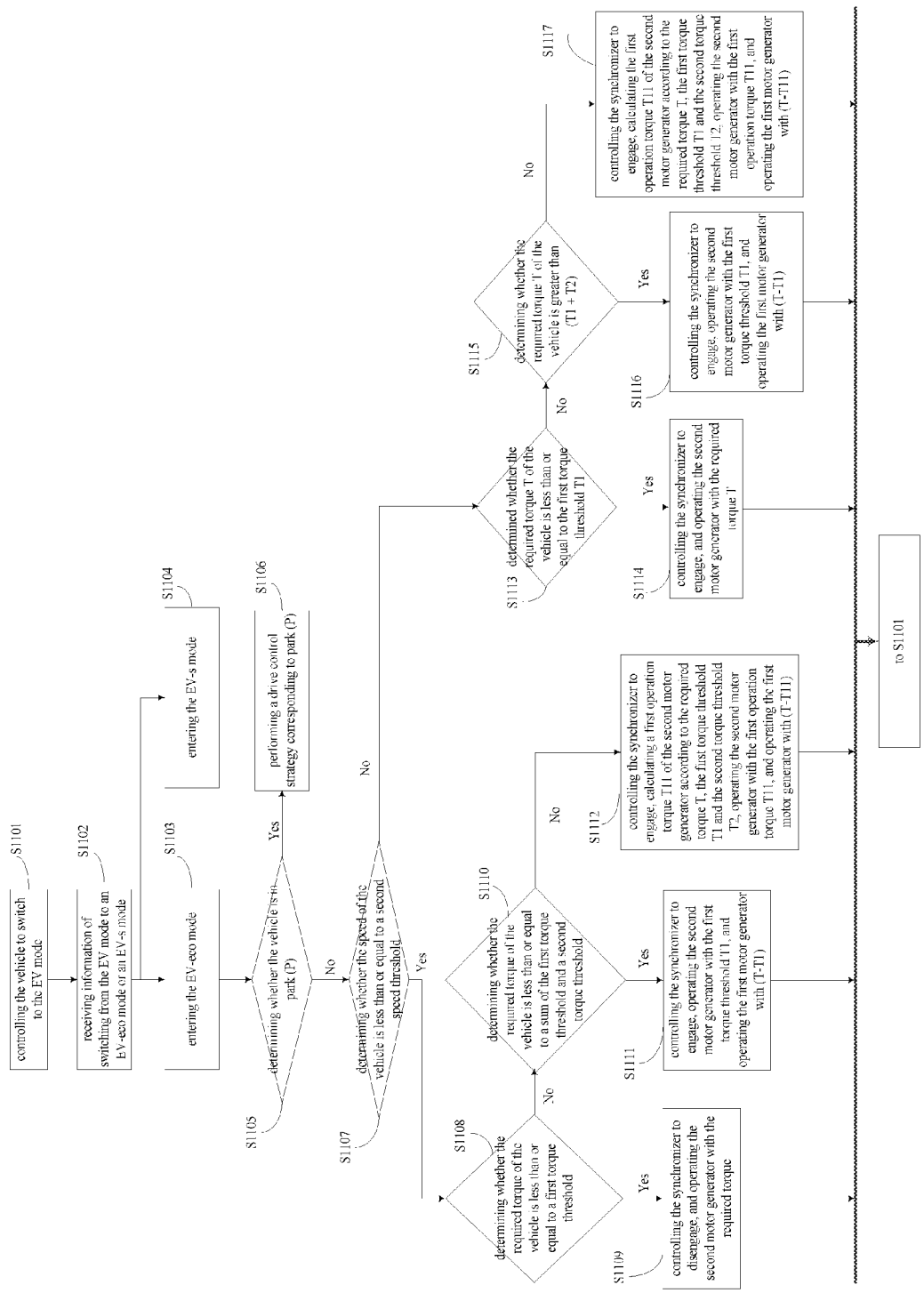
FIG. 23 is a flow chart illustrating an exemplary drive control method of a vehicle in an EV mode, according to an embodiment of the present disclosure.

FIG. 23 is a flow chart illustrating an exemplary drive control process of a vehicle in an EV mode, according to an embodiment of the present disclosure, in which the vehicle is operated as a series-parallel four-wheel drive electric vehicle. As shown in FIG. 23, the drive control process of the vehicle in the EV mode according to an embodiment of the present disclosure includes the following steps.

In step 1101, the vehicle is controlled to switch to the EV mode.

In step 1102, information of switching from the EV mode to an EV-eco mode or an EV-s mode is received.

Specifically, according to a manual switching button operation, the EV-eco mode or the EV-s mode is entered. If the EV-eco mode is selected, step 1103 is executed. If the EV-s mode is selected, step 1104 is executed.

In step 1103, the EV-eco mode is entered.

Specifically, an EV-eco mode button can be pressed manually to switch to the EV-eco mode, and a corresponding drive control strategy is performed. In the EV-eco mode, the torque changes more slowly.

In step 1104, the EV-s mode is entered.

Specifically, an EV-s mode button can be pressed manually to switch to the EV-s mode, and a corresponding drive control strategy is performed. In the EV-s mode, the torque changes more quickly. The drive control strategy of the EV-s mode is substantially the same as that of the EV-eco mode.

The drive control process of the EV-eco mode will be described in detail below. The drive control process of the EV-s mode is substantially the same as that of the EV-eco mode, except that the torque in the EV-s mode changes more quickly than that in the EV-eco mode, so the detailed description thereof will be omitted here.

In step 1105, it is determined whether the vehicle is in a parking state (P).

Specifically, it is determined whether a gear state is in a parking state (P) according to a gear signal. If yes, step 1106 is executed; otherwise, step 1107 is executed.

In step 1106, a drive control strategy corresponding to parking state (P) is performed.

Specifically, if it is determined that the gear state is in a parking state (P) according to the gear signal, the drive control strategy corresponding to park (P) will be performed.

In step 1107, it is determined whether the speed of the vehicle is less than or equal to a second speed threshold.

Specifically, if it is determined that the gear state is not in a parking state (P) according to the gear signal, a corresponding drive control strategy will be performed. That is, it is determined whether the speed V of the vehicle is less than or equal to the second speed threshold V2. If it is determined that the speed V of the vehicle is less than or equal to the second speed threshold V2, an EV-eco low-speed mode of the vehicle will be entered, and step 1108 is executed; otherwise, step 1113 is executed.

In step 1108, it is determined whether the required torque of the vehicle is less than or equal to a first torque threshold.

Specifically, if it is determined that the speed V of the vehicle is less than or equal to the second speed threshold V2, it is determined whether the required torque T of the vehicle is less than or equal to the first torque threshold T1, in which T1 is a predetermined torque of the second motor generator. If it is determined that the required torque T of the vehicle is less than or equal to the first torque threshold T1, step 1109 is executed; otherwise, step 1110 is executed.

In step 1109, the synchronizer is controlled to disengage, and the second motor generator operates with the required torque.

Specifically, if $V \leq V2$ and $T \leq T1$, the synchronizer is disengaged, the drive torque of the second motor generator reaches the required torque T, and the drive torque of the first motor generator equals zero, such that the second motor generator, on its own, drives the vehicle to run.

In step 1110, if the required torque of the vehicle is greater than the first torque threshold, it is determined whether the required torque of the vehicle is less than or equal to a sum of the first torque threshold and a second torque threshold.

Specifically, it is determined whether the required torque T is greater than the first torque threshold T1 and less than or equal to the sum of the first torque threshold T1 and the second torque threshold T2, i.e. $T1 < T \leq T1+T2$, where T2 is a predetermined torque of the first motor generator. If yes, step 1111 is executed; otherwise, step 1112 is executed.

In step 1111, the synchronizer is controlled to engage, the second motor generator operates with the first torque threshold T1, and the first motor generator operates with a torque difference between the required torque T and the first torque threshold T1, i.e. (T−T1).

Specifically, if $V \leq V2$ and $T1 < T \leq T1+T2$, the synchronizer will be engaged, the drive torque of the second motor generator reaches the first torque threshold T1, and the drive torque of the first motor generator equals (T−T1), such that the vehicle runs in a four-wheel drive mode.

In step 1112, if the required torque T of the vehicle is greater than the sum of the first torque threshold T1 and the second torque threshold T2, the synchronizer will be controlled to engage, a first operation torque T11 of the second motor generator is calculated according to the required torque T, the first torque threshold T1 and the second torque threshold T2, the second motor generator operates with the first operation torque T11, and the first motor generator operates with a torque difference between the required torque T and the first operation torque T11, i.e. (T−T11).

Specifically, if $V \leq V2$ and $T > T1+T2$, the synchronizer is engaged, the drive torque of the second motor generator is the first operation torque T11, and the drive torque of the first motor generator is (T−T11), such that the vehicle runs in a four-wheel drive mode. In order to make the torque of the first motor generator and the torque of the second motor generator reach their respective peak values, it is assumed that $T11 = T1 + Pro1 \times (T-T1-T2)$, where T is the required torque, T1 is the first torque threshold, T2 is the second torque threshold, and Pro1 is a predetermined proportional coefficient.

In some embodiments, if the speed of the vehicle is greater than the second speed threshold, it is determined whether the required torque of the vehicle is less than or equal to the first torque threshold; if the required torque of the vehicle is less than or equal to the first torque threshold, the synchronizer is controlled to engage, and the second motor generator operates with the required torque; if the required torque of the vehicle is greater than the first torque threshold, it is determined whether the required torque of the vehicle is greater than the sum of the first torque threshold and the second torque threshold; if the required torque of the vehicle is less than or equal to the sum of the first torque threshold and the second torque threshold, the synchronizer is controlled to engage, the second motor generator operates with the first torque threshold, and the first motor generator operates with a difference between the required torque and the first torque threshold; if the required torque of the vehicle is greater than the sum of the first torque threshold and the second torque threshold, the synchronizer is controlled to engage, the first operation torque of the second motor generator is calculated according to the required torque, the first torque threshold and the second torque threshold, the second motor generator operates with the first operation torque, and the first motor generator operates with the difference between the required torque and the first operation torque.

In step 1113, if the speed V of the vehicle is greater than the second speed threshold V2, it is determined whether the required torque T of the vehicle is less than or equal to the first torque threshold T1.

Specifically, if the speed V of the vehicle is greater than the second speed threshold V2, it is determined whether the required torque T of the vehicle is less than or equal to the first torque threshold T1, i.e. $T \leq T1$, in which T1 is the predetermined torque of the second motor generator. If $T \leq T1$, step 1114 is executed; otherwise, step 1115 is executed.

In step 1114, the synchronizer is controlled to engage, and the second motor generator operates with the required torque T.

Specifically, if $V > V2$ and $T \leq T1$, the synchronizer is engaged, the drive torque of the second motor generator reaches the required torque T, and the drive torque of the first motor generator is zero, such that the second motor generator, on its own, drives the vehicle to run. In order to enable smooth engagement of the synchronizer, when the synchronizer is engaged, the first motor generator is in a follow-up state.

In step 1115, if the required torque T of the vehicle is greater than the first torque threshold T1, it is determined whether the required torque T of the vehicle is greater than the sum of the first torque threshold T1 and the second torque threshold T2.

Specifically, it is determined whether $T1 \leq T \leq T1+T2$. If yes, step 1116 is executed; otherwise, step 1117 is executed.

In step 1116, the synchronizer is controlled to engage, the second motor generator operates with the first torque threshold T1, and the first motor generator operates with a difference between the required torque T and the first torque threshold T1, i.e. (T−T1).

Specifically, if $V > V2$ and $T1 < T \leq T1+T2$, the synchronizer is engaged, the drive torque of the second motor generator is the first torque threshold T1, and the drive torque of the first motor generator is (T−T1), such that the vehicle runs in a four-wheel drive mode.

In step 1117, the synchronizer is controlled to engage, the first operation torque T11 of the second motor generator is calculated according to the required torque T, the first torque threshold T1 and the second torque threshold T2. The second motor generator operates with the first operation torque T11, and the first motor generator operates with the difference between the required torque T and the first operation torque T11, i.e. (T−T11).

Specifically, if $V > V2$ and $T > T1+T2$, the synchronizer is engaged, the drive torque of the second motor generator reaches the first operation torque T11, and the drive torque of the first motor generator reaches (T−T11), and the vehicle runs in a four-wheel drive mode. In order to make the torque of the first motor generator and the torque of the second motor generator reach their respective peak values, it is assumed that $T11 = T1 + Pro1 \times (T−T1−T2)$, where T is the required torque, T1 is the first torque threshold, T2 is the second torque threshold, and Pro 1 is the predetermined proportional coefficient.

The drive control process of the HEV mode will be described in detail below.

In some embodiments, when the selected operation mode is the HEV mode, the vehicle is controlled to switch to a HEV-eco low-electric-quantity mode, a HEV-eco medium-electric-quantity mode, or a HEV-eco high-electric-quantity mode. In some embodiments, the HEV mode includes a HEV-eco mode and a HEV-s mode. As used herein, the term "HEV-eco low-electric-quantity mode" refers to a control mode used when the vehicle is in the HEV mode and the electric quantity of the power battery is low. As used herein, the term "HEV-eco medium-electric-quantity mode" refers to a control mode used when the vehicle is in the HEV mode and the electric quantity of the power battery is medium. As used herein, the term "HEV-eco high-electric-quantity mode" refers to a control mode used when the vehicle is in the HEV mode and the electric quantity of the power battery is high. The selection of the HEV-eco low-electric-quantity mode, the HEV-eco medium-electric-quantity mode, or the HEV-eco high-electric-quantity mode is realized by setting different thresholds. The thresholds set for different vehicles are different.

Figure 24:
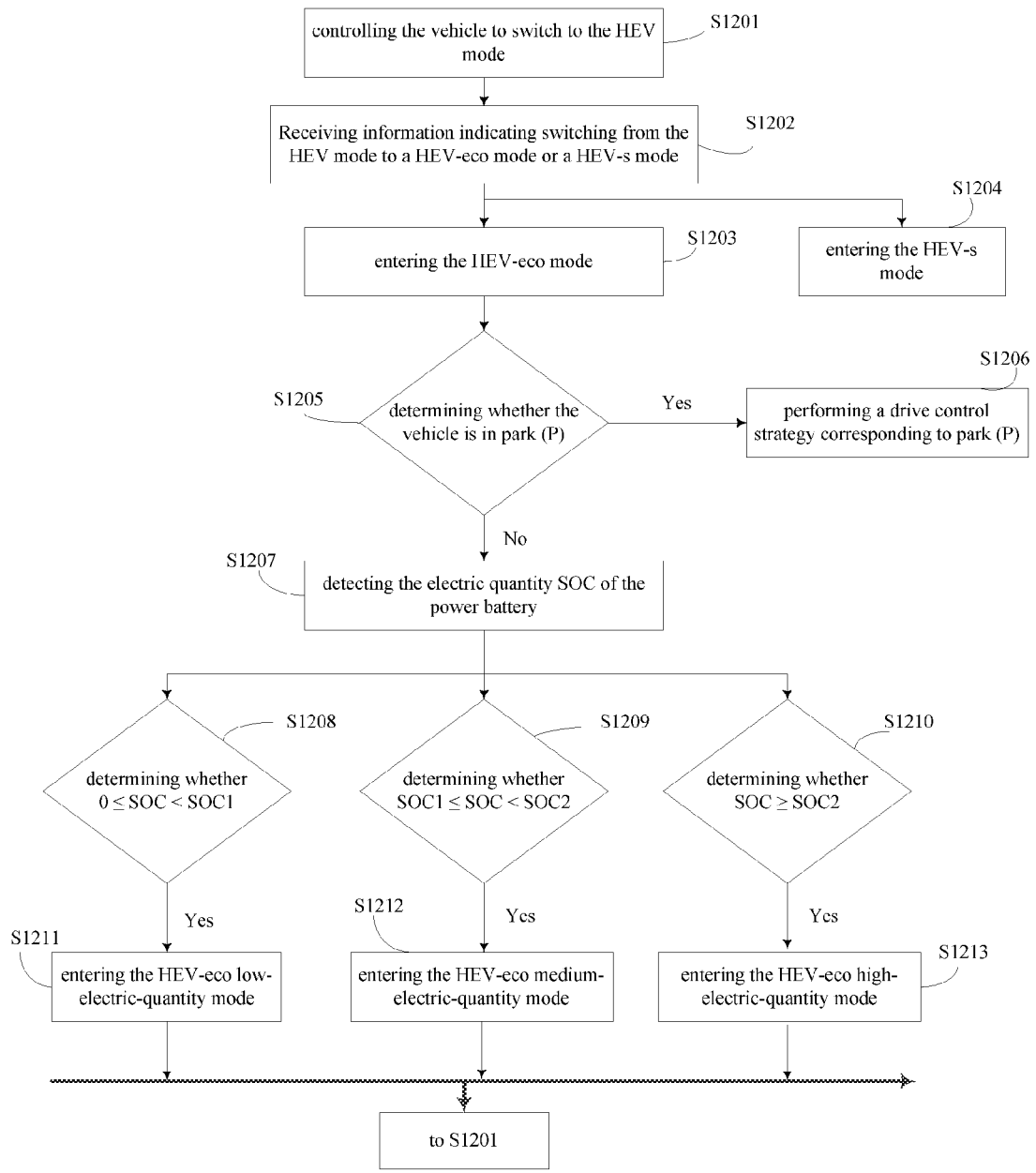
FIG. 24 is a flow chart illustrating an exemplary drive control method of a vehicle in a HEV mode, according to an embodiment of the present disclosure.

Specifically, as shown in FIG. 24, the drive control process of the HEV mode includes the following steps.

In step 1201, the vehicle is controlled to switch to the HEV mode.

In step 1202, information indicating switching from the HEV mode to a HEV-eco mode or a HEV-s mode is received.

Specifically, according to a manual switching button operation, a corresponding mode, i.e. the HEV-eco mode or the HEV-s mode, is entered. In the HEV mode, when the engine unit operates, the speed of the vehicle should be greater than a predetermined value (e.g., 20 Km/h). If the HEV-eco mode is selected, step 1203 is executed. If the HEV-s mode is selected, step 1204 is executed.

In step 1203, the HEV-eco mode is entered.

Specifically, a HEV-eco mode button is pressed manually to switch to the HEV-eco mode, and a corresponding drive control strategy is performed. In the HEV-eco mode, the economic efficiency of the vehicle is paid more attention, while the dynamic property of the vehicle is maximized. During the throttle loosing and braking, the engine unit is turned off. When the speed of the vehicle exceeds the predetermined value, e.g., 20 Km/h, the engine unit first attempts to reversely drag the first motor generator, and if the reverse drag is unsuccessful, a starter starts the engine unit. At the gear shifting moment, the first motor generator compensates for the torque of the engine unit.

In step 1204, the HEV-s mode is entered.

Specifically, a HEV-s mode button is pressed manually to switch to the HEV-s mode, and a corresponding drive control strategy is performed. In the HEV-s mode, the torque changes quickly. The drive control strategy of the HEV-s mode is the same as that of the HEV-eco mode. The synchronizer is always engaged, the engine unit is always operated, and the operating time of the engine unit is reduced.

The drive control process of the HEV-eco mode will be described in detail below. The drive control process of the HEV-s mode is substantially the same as that of the HEV-eco mode, so the detailed description thereof will be omitted here.

In step 1205, it is determined whether the vehicle is in a parking state (P).

Specifically, it is determined whether a gear state is in a parking state (P) according to a gear signal. If yes, step 1206 is executed; otherwise, step 1207 is executed.

In step 1206, a drive control strategy corresponding to parking state (P) is performed.

Specifically, if it is determined that the gear state is parking state (P) according to the gear signal, the drive control strategy corresponding to the parking state (P) is performed.

In step 1207, the electric quantity SOC of the power battery is detected.

Specifically, if it is determined that the gear state is not in parking state (P) according to the gear signal, a corresponding drive control strategy is performed. The electric quantity SOC of the power battery is detected, and step 1208 is executed.

In step 1208, it is determined whether 0≤SOC<SOC1, where SOC1 is a lower limit of the electric quantity of the power battery. If yes, step 1211 is executed.

In step 1209, it is determined whether SOC1≤SOC<SOC2, where SOC2 is an upper limit of the electric quantity of the power battery. If yes, step 1212 is executed.

In step 1210, it is determined whether SOC≥SOC2, if yes, step 1213 is executed.

In step 1211, the HEV-eco low-electric-quantity mode is entered.

Specifically, if 0≤SOC<SOC1, a HEV-eco low-electric-quantity strategy is performed. In this mode, the electric quantity of the power battery is low, the engine unit generates more electricity while maximizing the dynamic property and economic efficiency of the vehicle, so as to obtain extra electric quantity of the power battery, and the extra electric quantity of the power battery is output when the vehicle requires large power.

In step 1212, the HEV-eco medium-electric-quantity mode is entered.

Specifically, if SOC1≤SOC<SOC2, a HEV-eco medium-electric-quantity strategy is performed. In this mode, the electric quantity of the power battery is in a suitable range. In order to keep the electric quantity of the power battery in this range, it is necessary to keep a balance between a power generation amount of the engine unit and a power consumption amount of the motor generator.

In step 1213, the HEV-eco high-electric-quantity mode is entered.

Specifically, if SOC≥SOC2, a HEV-eco high-electric-quantity strategy is performed. In this mode, the electric quantity of the power battery is high. The motor generator first drives the vehicle to make the electric quantity of the power battery drop to the suitable range, so as to feed back the electric quantity of the power battery under the braking operating condition of the vehicle.

The control strategies of the HEV-eco low-electric-quantity mode, the HEV-eco medium-electric-quantity mode, and the HEV-eco high-electric-quantity mode in the HEV mode will be described in detail below.

Figure 25:
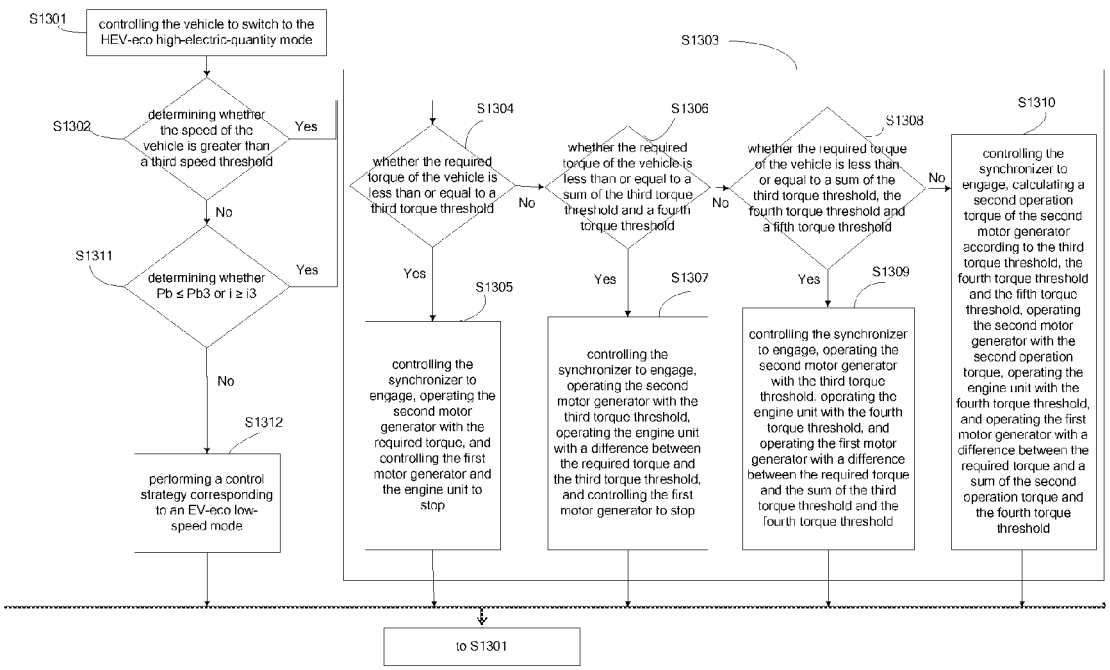
FIG. 25 is a flow chart illustrating an exemplary drive control method of a vehicle in a HEV-eco high-electric-quantity mode, according to an embodiment of the present disclosure.

As shown in FIG. 25, the drive control of the vehicle in the HEV-eco high-electric-quantity mode includes the following steps.

In step 1301, the vehicle is controlled to switch to the HEV-eco high-electric-quantity mode.

In step 1302, it is determined whether the speed of the vehicle is greater than a third speed threshold.

Specifically, it is determined whether the speed V of the vehicle is greater than a third speed threshold V3. If yes, step 1303 is executed; otherwise, step 1311 is executed.

In step 1303, a HEV-eco high-speed high-electric-quantity mode is entered.

Specifically, the HEV-eco high-speed high-electric-quantity mode includes steps 1304-1310.

In step 1304, it is determined whether the required torque of the vehicle is less than or equal to a third torque threshold.

Specifically, if V>V3, it is determined whether the required torque T of the vehicle is less than or equal to a third torque threshold T3, in which T3 is a rated torque of the second motor generator. If the required torque T of the vehicle is less than or equal to the third torque threshold T3, i.e. T≤T3, step 1305 is executed; otherwise, step 1306 is executed.

In step 1305, the synchronizer is controlled to engage. The second motor generator operates with the required torque, and the first motor generator and the engine unit are controlled to stop.

Specifically, if V>V3 and T≤T3, the drive torque of the second motor generator reaches the required torque T, the drive torque of the first motor generator equals zero, and the drive torque of the engine unit is zero, such that the second motor generator, on its own, drives the vehicle to run. In order to enable smooth engagement of the synchronizer, when the synchronizer is engaged, the first motor generator is in a follow-up state.

In step 1306, it is determined whether the required torque of the vehicle is less than or equal to a sum of the third torque threshold and a fourth torque threshold.

Specifically, it is determined whether T3<T≤T3+T4, where T is the required torque, T3 is the third torque threshold, and T4 is the fourth torque threshold. In some embodiments, T4 is an external characteristic torque of the engine unit. If T3<T≤T3+T4, step 1307 is executed; otherwise, step 1308 is executed.

In step 1307, the synchronizer is controlled to engage, the second motor generator operates with the third torque threshold, the engine unit operates with a torque difference between the required torque and the third torque threshold, and the first motor generator is controlled to stop.

Specifically, if V>V3 and T3<T≤T3+T4, the synchronizer is engaged, the drive torque of the second motor generator reaches the third torque threshold T3, the drive torque of the first motor generator equals zero, and the drive torque of the engine unit is the difference between the required torque T and the third torque threshold T3, i.e. (T−T3), and the vehicle runs in a four-wheel drive mode.

In step 1308, it is determined whether the required torque of the vehicle is less than or equal to a sum of the third torque threshold, the fourth torque threshold and a fifth torque threshold.

Specifically, it is determined whether $T3+T4<T\leq T3+T4+T5$, where T is the required torque, T3 is the third torque threshold, T4 is the fourth torque threshold, and T5 is the fifth torque threshold. In some embodiments, T5 is a rated torque of the first motor generator. If $T3+T4<T\leq T3+T4+T5$, step 1309 is executed; otherwise, step 1310 is executed.

In step 1309, the synchronizer is controlled to engage, the second motor generator operates with the third torque threshold, the engine unit operates with the fourth torque threshold, and the first motor generator operates with a difference between the required torque and the sum of the third torque threshold and the fourth torque threshold.

Specifically, if $V>V3$ and $T3+T4<T\leq T3+T4+T5$, the synchronizer is engaged, the drive torque of the second motor generator reaches the third torque threshold T3, the drive torque of the first motor generator is the difference between the required torque T and the sum of the third torque threshold T3 and the fourth torque threshold T4, i.e. (T−T3−T4), and the drive torque of the engine unit reaches the fourth torque threshold T4, and the vehicle runs in a four-wheel drive mode.

In step 1310, the synchronizer is controlled to engage, a second operation torque of the second motor generator is calculated according to the third torque threshold, the fourth torque threshold and the fifth torque threshold, the second motor generator operates with the second operation torque, the engine unit operates with the fourth torque threshold, and the first motor generator operates with a difference between the required torque and a sum of the second operation torque and the fourth torque threshold.

Specifically, if $V>V3$ and $T>T3+T4+T5$, the synchronizer is engaged. The drive torque of the second motor generator reaches the second operation torque T12, the drive torque of the first motor generator becomes the difference between the required torque T and the sum of the second operation torque T12 and the fourth torque threshold T4, i.e. (T−T12−T4), and the drive torque of the engine unit is the fourth torque threshold T4, and the vehicle runs in a four-wheel drive mode. In order to make the torque of the first motor generator and the torque of the second motor generator reach their respective peak values, it is assumed that $T12=T3+Pro2\times(T-T3-T4-T5)$, where T is the required torque, T3 is the third torque threshold, T4 is the fourth torque threshold, T5 is the fifth torque threshold, and Pro2 is a predetermined proportional coefficient.

In step 1311, it is determined whether $Pb\leq Pb3$ or $i\geq i3$, where Pb is the maximum discharge power of the power battery, Pb3 is a third discharge power threshold, i is the slope of the road where the vehicle runs on, and i3 is a third slope threshold.

Specifically, if $V\leq V3$, it is determined whether the maximum discharge power Pb of the power battery is less than or equal to the third discharge power threshold Pb3, or the slope i of the road where the vehicle runs on is greater than the third slope threshold i3. If yes, step 1303 is executed; otherwise, step 1312 is executed.

In step 1312, a control strategy corresponding to an EV-eco low-speed mode is performed.

Specifically, if the condition $Pb\leq Pb3$ or $i\geq i3$ is not satisfied, a control strategy corresponding to the EV-eco low-speed mode is performed.

Figure 26:
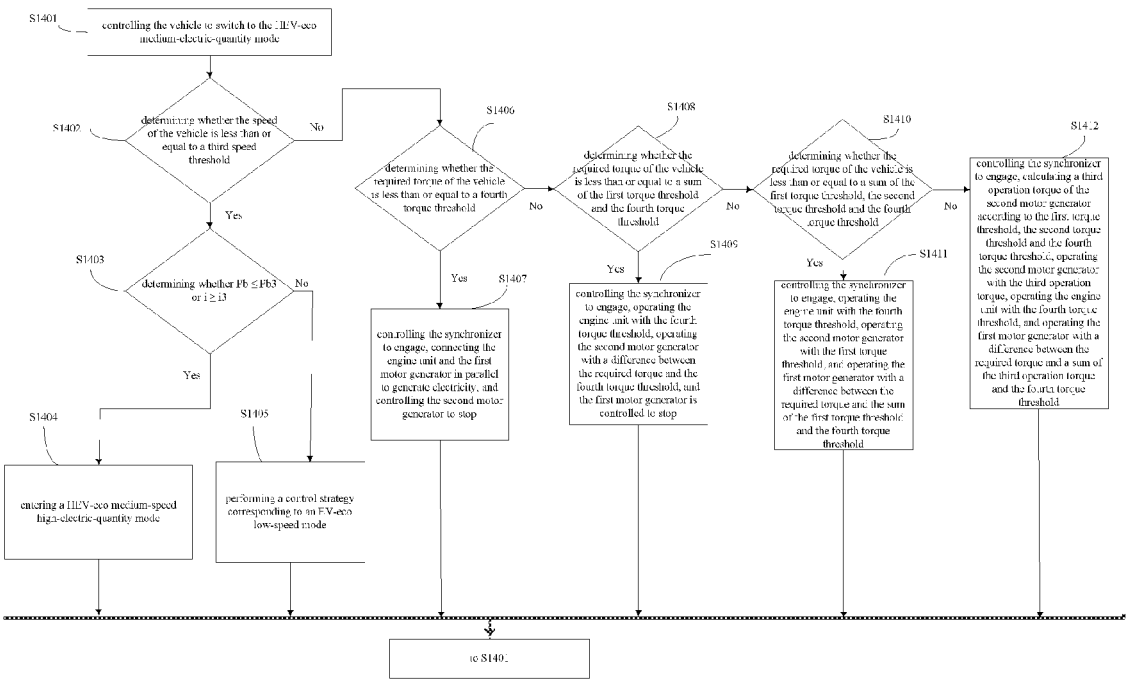
FIG. 26 is a flow chart illustrating an exemplary drive control method of a vehicle in a HEV-eco medium-electric-quantity mode, according to an embodiment of the present disclosure.

As shown in FIG. 26, the drive control of the vehicle in the HEV-eco medium-electric-quantity mode includes the following steps.

In step 1401, the vehicle is controlled to switch to the HEV-eco medium-electric-quantity mode.

In step 1402, it is determined whether the speed of the vehicle is less than or equal to a third speed threshold.

Specifically, it is determined whether the speed V of the vehicle is less than or equal to a third speed threshold V3. If yes, step 1403 is executed; otherwise, step 1404 is executed.

In step 1403, it is determined whether $Pb\leq Pb3$ or $i\geq i3$, where Pb is the maximum discharge power of the power battery, Pb3 is a third discharge power threshold, i is the slope of the road where the vehicle runs on, and i3 is a third slope threshold.

Specifically, if $V\leq V3$, it is determined whether the maximum discharge power Pb of the power battery is less than or equal to the third discharge power threshold Pb3, or the slope i of the road where the vehicle runs on is greater than the third slope threshold i3, if yes, step 1404 is executed; otherwise, step 1405 is executed.

In step 1404, a HEV-eco medium-speed high-electric-quantity mode is entered.

Specifically, the HEV-eco medium-speed high-electric-quantity mode includes steps 1406-1412.

In step 1405, a control strategy corresponding to an EV-eco low-speed mode is performed.

Specifically, if the condition $Pb\leq Pb3$ or $i\geq i3$ is not satisfied, a control strategy corresponding to the EV-eco low-speed mode is performed.

In step 1406, it is determined whether the required torque of the vehicle is less than or equal to a fourth torque threshold.

Specifically, if $V>V3$, it is determined whether the required torque T of the vehicle is less than or equal to the fourth torque threshold T4. If yes, step 1407 is executed; otherwise, step 1408 is executed.

In step 1407, the synchronizer is controlled to engage, the engine unit and the first motor generator are connected in parallel to generate electricity, and the second motor generator is controlled to stop.

Figure 28:
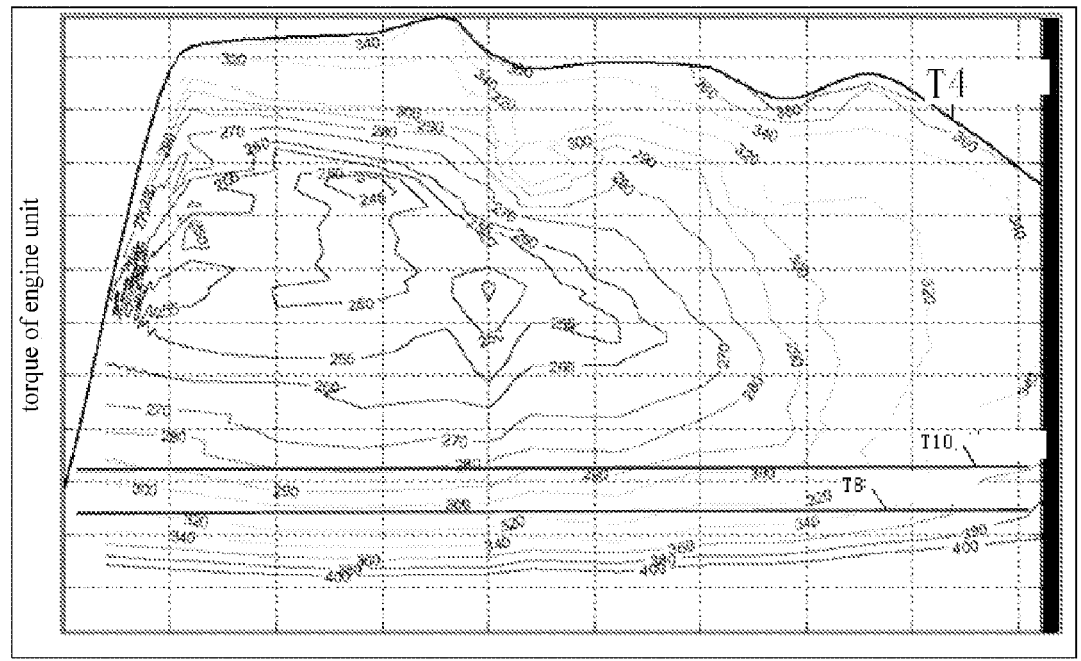
FIG. 28 is a diagram illustrating an operating range of an engine unit of a vehicle according to an embodiment of the present disclosure.

Specifically, if $V>V3$ and $T\leq T8$, where T8 is a lower limit of an operation torque of the engine unit, the synchronizer is engaged, the drive torque of the second motor generator is zero, the drive torque of the first motor generator is (T8−T), and the drive torque of the engine unit is T8, such that the engine unit, on its own, drives the vehicle to run, and the extra torque of the engine unit drives the first motor generator to generate electricity, and the electricity is stored in the power battery. When the synchronizer is engaged, and the second motor generator is in a follow-up state. Referring to FIG. 28, which shows an operating range of an engine unit of a vehicle according to an embodiment of the present disclosure, the operating range of the engine unit can be determined according to parameters of the engine unit including, for example, a universal characteristic curve, a power system status and a vehicle demand. As shown in FIG. 28, when $T8<T\leq T4$, the torque of the engine unit is T, the torque of the first motor generator becomes zero, the torque of the second motor generator becomes zero, and the synchronizer is engaged, such that the engine unit, on its own, drives the vehicle to run, and the first and second motor generators are in a follow-up state.

In step 1408, it is determined whether the required torque of the vehicle is less than or equal to a sum of the first torque threshold and the fourth torque threshold.

Specifically, it is determined whether $T4<T\le T1+T4$, where T is the required torque, T1 is the first torque threshold, and T4 is the fourth torque threshold. If $T\le T1+T4$, step 1409 is executed; otherwise, step 1410 is executed.

In step 1409, the synchronizer is controlled to engage, the engine unit operates with the fourth torque threshold, the second motor generator operates with a torque difference between the required torque and the fourth torque threshold, and the first motor generator is controlled to stop.

Specifically, if $V>V3$ and $T4<T\le T1+T4$, the synchronizer is engaged, the drive torque of the second motor generator is the difference between the required torque T and the fourth torque threshold T4, i.e. (T−T4), the drive torque of the first motor generator is zero, the drive torque of the engine unit is the fourth torque threshold T4, and the vehicle runs in a four-wheel drive mode.

In step 1410, it is determined whether the required torque of the vehicle is less than or equal to a sum of the first torque threshold, the second torque threshold and the fourth torque threshold.

Specifically, it is determined whether $T1+T4<T\le T1+T2+T4$, where T is the required torque, T1 is the first torque threshold, T2 is the second torque threshold, and T4 is the fourth torque threshold. If $T\le T1+T2+T4$, step 1411 is executed; otherwise, step 1412 is executed.

In step 1411, the synchronizer is controlled to engage, the engine unit operates with the fourth torque threshold, the second motor generator operates with the first torque threshold, and the first motor generator operates with a difference between the required torque and the sum of the first torque threshold and the fourth torque threshold.

Specifically, if $V>V3$ and $T1+T4<T\le T1+T2+T4$, the synchronizer is engaged, the drive torque of the second motor generator is the first torque threshold T1, the drive torque of the first motor generator is the difference between the required torque T and the sum of the first torque threshold T1 and the fourth torque threshold T4, i.e. (T−T1−T4), the drive torque of the engine unit is the fourth torque threshold T4, and the vehicle runs in a four-wheel drive mode.

In step 1412, the synchronizer is controlled to engage, a third operation torque of the second motor generator is calculated according to the first torque threshold, the second torque threshold and the fourth torque threshold, the second motor generator operates with the third operation torque, the engine unit operates with the fourth torque threshold, and the first motor generator operates with a difference between the required torque and a sum of the third operation torque and the fourth torque threshold.

Specifically, if $V>V3$ and $T>T1+T2+T4$, the synchronizer is engaged, the drive torque of the second motor generator is the third operation torque T13, the drive torque of the first motor generator is the difference between the required torque T and the sum of the third operation torque T13 and the fourth torque threshold T4, i.e. (T−T13−T4), and the drive torque of the engine unit is the fourth torque threshold T4, such that the vehicle runs in a four-wheel drive mode. In order to make the torque of the first motor generator and the torque of the second motor generator reach their respective peak values, it is assumed that $T13=T1+Pro1\times(T-T1-T2-T4)$, where T is the required torque, T1 is the first torque threshold, T2 is the second torque threshold, T4 is the fourth torque threshold, and Pro 1 is a predetermined proportional coefficient.

Figure 27:
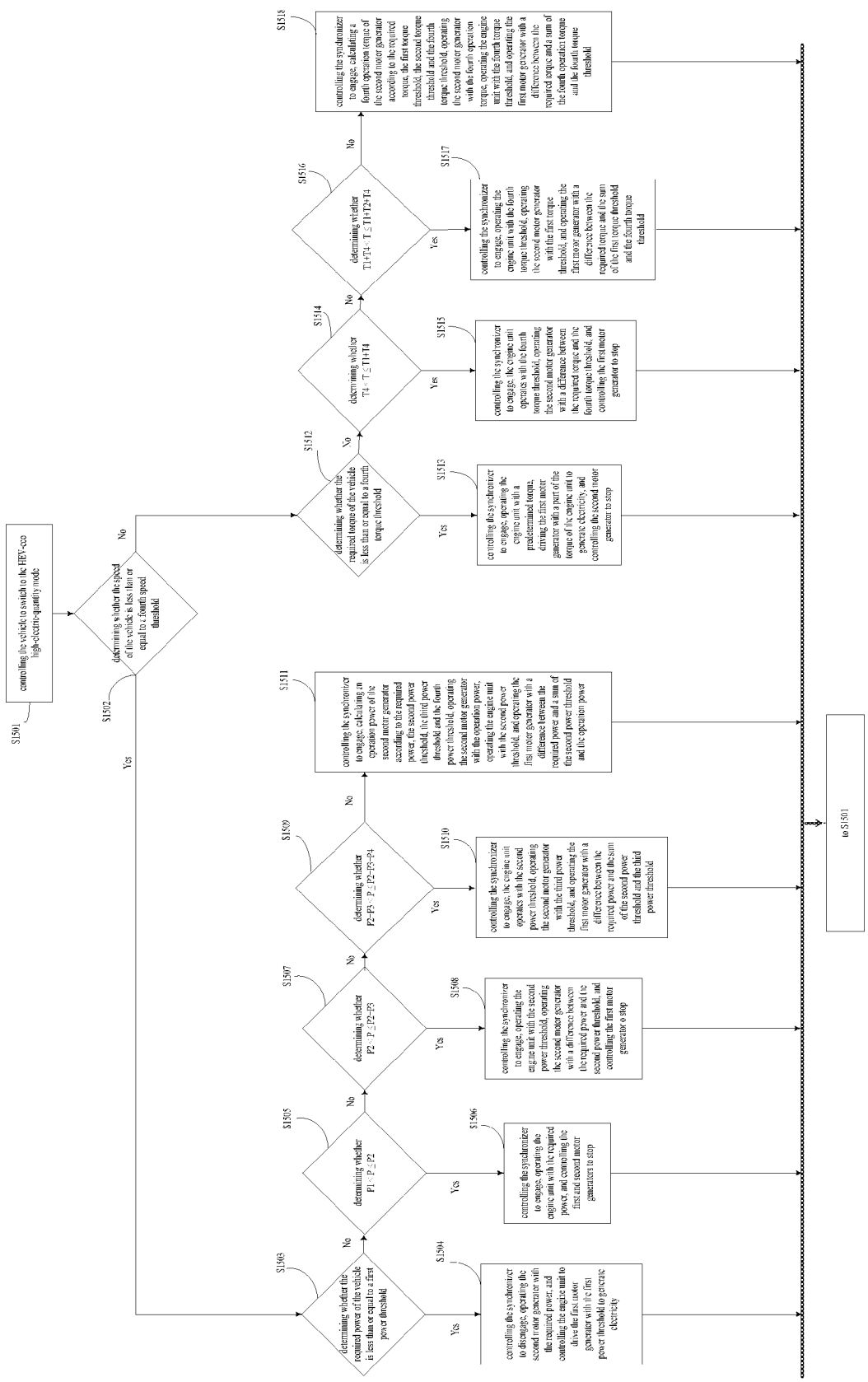
FIG. 27 is a flow chart illustrating an exemplary drive control of a vehicle in a HEV-eco low-electric-quantity mode, according to an embodiment of the present disclosure.

As shown in FIG. 27, the drive control of the vehicle in the HEV-eco low-electric-quantity mode includes the following steps.

In step 1501, the vehicle is controlled to switch to the HEV-eco high-electric-quantity mode.

In step 1502, it is determined whether the speed of the vehicle is less than or equal to a fourth speed threshold.

Specifically, it is determined whether the speed V of the vehicle is less than or equal to a fourth speed threshold V4. If yes, step 1503 is executed; otherwise, step 1512 is executed.

In step 1503, it is determined whether the required power of the vehicle is less than or equal to a first power threshold.

Specifically, if $V\le V4$, it is determined whether the required power P of the vehicle is less than or equal to the first power threshold P1. In some embodiments, P1 is a series generation power of the engine unit. If the required power P of the vehicle is less than or equal to the first power threshold P1, step 1504 is executed; otherwise, step 1505 is executed.

In step 1504, the synchronizer is controlled to disengage, the second motor generator operates with the required power, and the engine unit is controlled to drive the first motor generator with the first power threshold to generate electricity.

Specifically, if $V\le V4$ and $P\le P1$, the synchronizer is disengaged, the drive power of the second motor generator is the required power P, the drive power of the first motor generator is the first power threshold P1, and the drive power of the engine unit is the first power threshold P1, such that the second motor generator drives the vehicle to run, the engine unit drives the first motor generator to generate electricity, and the electricity is stored in the power battery. At this time, the first motor generator and the engine unit are connected in series to generate electricity, and the second motor generator is in a driving state, i.e. drives the vehicle to run.

In step 1505, it is determined whether $P1<P\le P2$, where P is the required power, P1 is the first power threshold, and P2 is a second power threshold.

That is, if the required power of the vehicle is greater than the first power threshold, it is determined whether the required power of the vehicle is less than or equal to the second power threshold. Specifically, it is determined whether the required power P of the vehicle is greater than the first power threshold P1 and less than or equal to the second power threshold P2. In some embodiments, P2 is an external characteristic power of the engine unit. If $P1<P\le P2$, step 1506 is executed; otherwise, step 1507 is executed.

In step 1506, the synchronizer is controlled to engage, the engine unit operates with the required power, and the first and second motor generators are controlled to stop.

Specifically, if $V\le V4$ and $P1<P\le P2$, the synchronizer is engaged, the power of the engine unit reaches the required power P, the power of the first motor generator is zero, and the power of the second motor generator is zero, such that the engine unit, on its own, drives the vehicle to run, and the first and second motor generators are in a follow-up state.

In step 1507, it is determined whether $P2<P\le P2+P3$, where P is the required power, P2 is the second power threshold, and P3 is a third power threshold.

That is, if the required power P of the vehicle is greater than the second power threshold P2, it is determined whether the required power P of the vehicle is less than or equal to a sum of the second power threshold P2 and the third power threshold P3. Specifically, it is determined whether the required power P of the vehicle is greater than the second power threshold P2 and less than or equal to (P2+P3). In some embodiments, P3 is a predetermined power of the second motor generator. If $P2<P\leq P2+P3$, step 1508 is executed; otherwise, step 1509 is executed.

In step 1508, the synchronizer is controlled to engage, the engine unit operates with the second power threshold, the second motor generator operates with a difference between the required power and the second power threshold, and the first motor generator is controlled to stop.

Specifically, if $V\leq V4$ and $P2<P\leq P2+P3$, the synchronizer is engaged, the drive power of the second motor generator is the difference between the required power P and the second power threshold P2, i.e. (P−P2), the drive power of the first motor generator is 0, and the drive power of the engine unit is the second power threshold P2, such that the vehicle runs in a four-wheel drive mode.

In step 1509, it is determined whether $P2+P3<P\leq P2+P3+P4$, where P is the required power, P2 is the second power threshold, P3 is the third power threshold, and P4 is a fourth power threshold.

That is, if the required power P of the vehicle is greater than the sum of the second power threshold P2 and the third power threshold P3, it is determined whether the required power of the vehicle is less than or equal to a sum of the second power threshold P2, the third power threshold P3 and the fourth power threshold P4. Specifically, it is determined whether the required power of the vehicle is greater than (P2+P3) and less than or equal to (P2+P3+P4). In some embodiments, P4 is a predetermined power of the first motor generator. If $P2+P3<P\leq P2+P3+P4$, step 1510 is executed; otherwise, step 1511 is executed.

In step 1510, the synchronizer is controlled to engage, the engine unit operates with the second power threshold, the second motor generator operates with the third power threshold, and the first motor generator operates with a difference between the required power and the sum of the second power threshold and the third power threshold.

Specifically, if $V\leq V4$ and $P2+P3<P\leq P2+P3+P4$, the synchronizer is engaged, the drive power of the second motor generator is the third power threshold P3, the drive power of the first motor generator is the difference between the required power P and the sum of the second power threshold P2 and the third power threshold P3, i.e. (P−P2−P3), and the drive power of the engine unit is the second power threshold P2, such that the vehicle runs in a four-wheel drive mode.

In step 1511, the synchronizer is controlled to engage, an operation power of the second motor generator is calculated according to the required power, the second power threshold, the third power threshold and the fourth power threshold, the second motor generator operates with the operation power, the engine unit operates with the second power threshold, and the first motor generator operates with an output power difference between the required power and a sum of the second power threshold and the operation power.

Specifically, if $V\leq V4$ and $P>P2+P3+P4$, the synchronizer is engaged, the drive power of the second motor generator is the operation power P5, the drive power of the first motor generator is the difference between the required power P and the sum of the second power threshold P2 and the operation power P5, i.e. (P−P2−P5), and the drive power of the engine unit is the second power threshold P2, such that the vehicle runs in a four-wheel drive mode. In order to make the torque of the first motor generator and the torque of the second motor generator reach their respective peak values, it is assumed that $P5=P3+Pro1\times(T-P2-P2-P4)$, where P is the required power, P2 is the second power threshold, P3 is the third power threshold, P4 is the fourth power threshold, and Pro 1 is a predetermined proportional coefficient.

In step 1512, it is determined whether the required torque of the vehicle is less than or equal to a fourth torque threshold.

That is, if the speed V of the vehicle is greater than the fourth speed threshold V4, it is determined whether the required torque T of the vehicle is less than or equal to the fourth torque threshold T4. Specifically, if $V>V4$, it is determined whether $T\leq T4$. If $T\leq T4$, step 1513 is executed; otherwise, step 1514 is executed.

In step 1513, the synchronizer is controlled to engage, the engine unit operates with a predetermined torque, the first motor generator is driven with a part of the torque of the engine unit to generate electricity, and the second motor generator is controlled to stop.

Specifically, if $V>V4$ and $T\leq T10$, where T10 is a lower limit of an operation torque of the engine unit, as shown in FIG. 28, the synchronizer is engaged, the drive torque of the second motor generator is zero, the drive torque of the first motor generator is (T10−T), and the drive torque of the engine unit is T10, such that the engine unit drives the vehicle to run, the extra torque of the engine unit drives the first motor generator to generate electricity, and the electricity is stored in the power battery. When the synchronizer is engaged, the second motor generator is in a follow-up state. As shown in FIG. 28, when $T10<T\leq T4$, the synchronizer is engaged, the torque of the engine unit is T, the torque of the first motor generator is zero, and the torque of the second motor generator is zero, such that the engine unit separately drives the vehicle to run, and the first and second motor generators are in a follow-up state.

In step 1514, it is determined whether $T4<T\leq T1+T4$, where T is the required torque, T1 is the first torque threshold, and T4 is the fourth torque threshold.

That is, if the required torque T of the vehicle is greater than the fourth torque threshold T4, it is determined whether the required torque T of the vehicle is less than or equal to a sum of the first torque threshold T1 and the fourth torque threshold T4, if yes, step 1515 is executed; otherwise, step 1516 is executed.

In step 1515, the synchronizer is controlled to engage, the engine unit operates with the fourth torque threshold, the second motor generator operates with a difference between the required torque and the fourth torque threshold, and the first motor generator is controlled to stop.

Specifically, if $V>V4$ and $T4<T\leq T1+T4$, the synchronizer is engaged, the drive torque of the second motor generator is the difference between the required torque T and the fourth torque threshold T4, i.e. (T−T4), the drive torque of the first motor generator is zero, and the drive torque of the engine unit is the fourth torque threshold T4, such that the vehicle runs in a four-wheel drive mode.

In step 1516, it is determined whether $T1+T4<T\leq T1+T2+T4$, where T is the required torque, T1 is the first torque threshold, T2 is the second torque threshold, and T4 is the fourth torque threshold.

That is, if the required torque T of the vehicle is greater than the sum of the first torque threshold T1 and the fourth torque threshold T4, it is determined whether the required torque T of the vehicle is less than or equal to a sum of the first torque threshold T1, the second torque threshold T2 and the fourth torque threshold T4. If yes, step 1517 is executed; otherwise, step 1518 is executed.

In step 1517, the synchronizer is controlled to engage, the engine unit operates with the fourth torque threshold, the second motor generator operates with the first torque threshold, and the first motor generator operates with a difference between the required torque and the sum of the first torque threshold and the fourth torque threshold.

Specifically, if V>V4 and T1+T4<T≤T1+T2+T4, the synchronizer is engaged, the drive torque of the second motor generator is the first torque threshold T1, the drive torque of the first motor generator is the difference between the required torque T and the sum of the first torque threshold T1 and the fourth torque threshold T4, i.e. (T−T1−T4), and the drive torque of the engine unit is the fourth torque threshold T4, such that the vehicle runs in a four-wheel drive mode.

In step 1518, the synchronizer is controlled to engage, a fourth operation torque of the second motor generator is calculated according to the required torque, the first torque threshold, the second torque threshold and the fourth torque threshold, the second motor generator operates with the fourth operation torque, the engine unit operates with the fourth torque threshold, and the first motor generator operates with a difference between the required torque and a sum of the fourth operation torque and the fourth torque threshold.

Specifically, if V>V4 and T>T1+T2+T4, the synchronizer is engaged, the drive torque of the second motor generator is the fourth operation torque T14, the drive torque of the first motor generator is the difference between the required torque T and the sum of the fourth operation torque T14 and the fourth torque threshold T4, i.e. (T−T14−T4), and the drive torque of the engine unit is the fourth torque threshold T4, such that the vehicle runs in a four-wheel drive mode. In order to make the torque of the first motor generator and the torque of the second motor generator reach their respective peak values, it is assumed that T14=T1+Pro1×(T−T1−T2−T4), where T is the required torque, T1 is the first torque threshold, T2 is the second torque threshold, T4 is the fourth torque threshold, and Pro1 is a predetermined proportional coefficient.

In some embodiments, the drive mode (e.g., a front-wheel drive mode, a rear-wheel drive mode, or a four-wheel drive mode) is selected according to the required power of the vehicle, the required torque of the vehicle, the electric quantity of the power battery, the speed of the vehicle, operating conditions of the drive system, slipping and turning of the vehicle, and the like.

When the required torque or power of the vehicle is small, the second motor generator, on its own, drives the vehicle to run. At this time, if the electric quantity of the power battery is less than a predetermined value, the engine unit drives the first motor generator to generate electricity, the electricity is supplied to the second motor generator, and extra electricity is stored in the power battery.

When the required torque or power of the vehicle exceeds a predetermined value, the engine unit, on its own, drives the vehicle to run, while the first motor generator is in a follow-up state, and the second motor generator does not operate. At this time, if the electric quantity of the power battery is less than a predetermined value, the first motor generator is driven with extra power of the engine unit to generate electricity, which is stored in the power battery. When the required torque or power of the vehicle exceeds the maximum power of the engine unit, the second motor generator operates to help the engine unit drive the vehicle to run.

When the required torque or power of the vehicle exceeds a larger predetermined value, the engine unit and the first motor generator simultaneously drive the vehicle to run. At this time, if the electric quantity of the power battery is less than a predetermined value, the first motor generator is driven with a part of the power from the engine unit to generate electricity, and the electricity is supplied to the second motor generator for operation, thus exploiting the large-torque characteristics of the second motor generator.

When the vehicle encounters a low-adhesion road or climbs a slope, the driving force distribution is performed according to the slipping of front and rear wheels, so as to make use of the maximum adhesion of each wheel. When the rear wheels slide, the front-wheel drive part operates to drive the vehicle to run, the rear-wheel drive part performs a speed-reducing torque-limiting control according to the rotating speed of the front wheels. When the front wheels slide, the rear-wheel drive part operates to drive the vehicle to run, the front-wheel drive part performs a speed-reducing torque-limiting control according to the rotating speed of the rear wheels. When the front and rear wheels slide, the speed-reducing torque-limiting control is performed on the front-wheel drive part and the rear-wheel drive part according to the actual measured speed of the vehicle so as to ensure the stability and ride comfort of the vehicle.

When the vehicle is in a decelerating state, the energy feedback is performed according to an accelerator pedal, a brake pedal, the state of the power system and the like, the energy feedback is allocated according to the braking force requirements and wheel adhesion proportion, so as to optimize control of energy recovery.

In some embodiments, the drive mode (e.g., a series operation mode, a parallel operation mode, or a series-parallel operation mode) is selected according to the required power of the vehicle, the required torque of the vehicle, the electric quantity of the power battery, the speed of the vehicle, the operating range of the drive system, and the like, as is the case with the drive control method for the series-parallel four-wheel electric vehicle.

When the speed of the vehicle is low, the vehicle operates mainly in the series operation mode, the rotating speed of the engine unit is low, the economic efficiency of the operating range is poor, and the second motor generator separately drives the vehicle to run. When the required torque or power of the vehicle increases, the first motor generator helps the second motor generator drive the vehicle to run. If the electric quantity of the power battery is less than a predetermined value, the engine unit drives the first motor generator to generate electricity, and the electricity is supplied to the second motor generator.

When the speed of the vehicle is high, the vehicle operates mainly in the parallel operation mode, and the engine unit entirely drives the vehicle to run, or the second motor generator helps the engine unit drive the vehicle. If the electric quantity of the power battery is less than a predetermined value, the first motor generator is driven with a part of the power from the engine unit to generate electricity, and the electricity is supplied to the second motor generator for operation, thus exploiting the large-torque characteristics of the second motor generator.

When the speed of the vehicle is higher, the vehicle operates mainly in the series-parallel operation mode, the engine unit and the second motor generator operate to drive the vehicle to run, the first motor generator is driven with a part of the power from the engine unit to generate electricity, and the electricity is supplied to the second motor generator for operation. The series-parallel operation mode combines the advantages of the series operation mode and the parallel operation mode, and it is possible to enable optimal matching between the engine unit, the generator and the motor, so that the system operates in an optimal state, and the control target of emissions and fuel consumption is easier to achieve.

With the drive control method for the vehicle according to embodiments of the present disclosure, the power output by at least one of the engine unit and the first motor generator may be output to the output unit via the power switching device, and then output by the output unit to at least one of the front and rear wheels of the vehicle, and then the drive control of the vehicle is performed based on the operation parameter and the operation mode selected from operation modes of the vehicle. Meanwhile, by the provision of the second motor generator, the second motor generator may compensate for the torque of the front wheels or the rear wheels, and may also cooperate with the engine unit and the first motor generator to drive the vehicle, thus increasing the types of the operation modes of the vehicle. Therefore, the vehicle may adapt to different operating conditions, thus achieving better fuel economic efficiency, and in the premise of ensuring the dynamic property of the vehicle, enhancing the economic efficiency, ride and steering capability of the vehicle while reducing the emissions of harmful gases.

Figure 30:
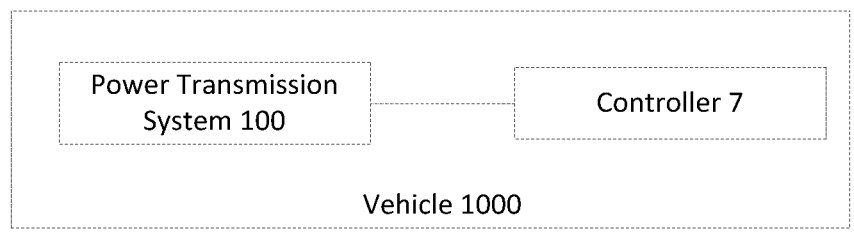
FIG. 30 is a block view of a vehicle according to an embodiment of the present disclosure.

Embodiments of the present disclosure further provide a vehicle 1000 including the above-identified power transmission system 100. As shown in FIG. 30, the vehicle 1000 also includes a controller 7 configured to acquire an operation parameter of the vehicle; and perform a drive control of the vehicle based on the operation parameter and an operation mode selected from operation modes of the vehicle. The vehicle according to embodiments of the present disclosure will be described below with reference to the drawings. The vehicle according to embodiments of the present disclosure will be described below with reference to the drawings.

The vehicle according to embodiments of the present disclosure includes an engine unit; a transmission unit configured to selectively coupled with the engine unit; a first motor generator coupled with the transmission unit; an output unit configured to transmit a power transmitted by the transmission unit to at least one of front and rear wheels of the vehicle; a power switching device configured to adjust a power transmission between the transmission unit and the output unit; a second motor generator configured to drive the at least one of the front and rear wheels of the vehicle; a power battery coupled with the first and second motor generators respectively; and a controller configured to acquire an operation parameter of the vehicle, and to perform a drive control of the vehicle based on the operation parameter and an operation mode selected from operation modes of the vehicle.

In some embodiments, the power switching device is configured as a synchronizer configured to selectively synchronize the output unit and the transmission unit.

Figure 29:
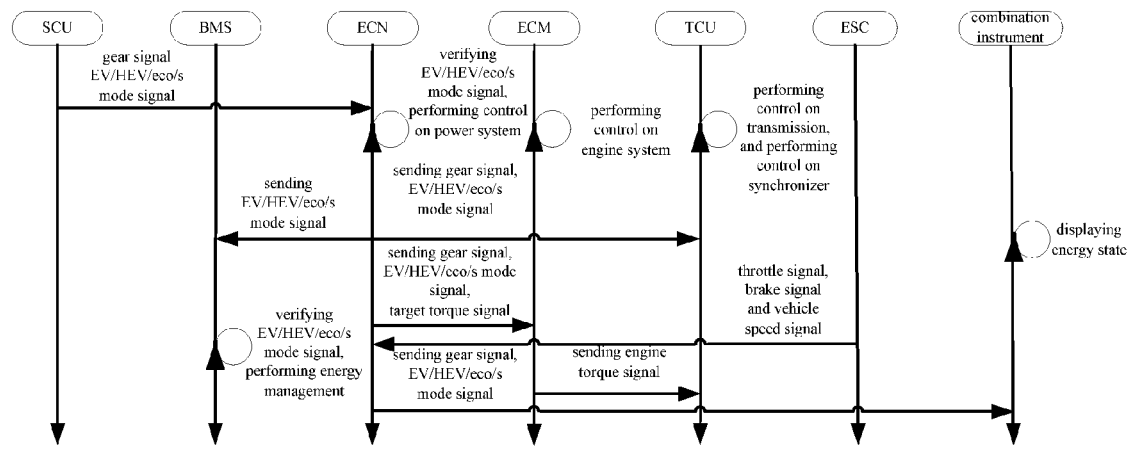
FIG. 29 is a schematic diagram illustrating information transfer between individual controllers in a vehicle according to an embodiment of the present disclosure.

The controller may include individual control components in the vehicle for controlling the operation of the vehicle. FIG. 29 is a schematic diagram illustrating information transfer between individual controllers in a vehicle according to an embodiment of the present disclosure. Specifically, as shown in FIG. 29, a shift control unit (SCU) is configured to acquire and send a gear signal and an EV/HEV/eco/Sport mode signal to a motor generator controller (ECN). A vehicle electronic stability controller (ESC) sends a throttle signal, a brake signal and a vehicle speed signal to the motor generator controller (ECN). The motor generator controller (ECN) verifies and sends the received EV/HEV/eco/Sport mode signal and the like to a battery management system (BMS), an engine control module (ECM), a transmission control unit (TCU), and a combination instrument, and performs a control on the power system according to different mode strategies, so as to send an engine start/stop command and a target torque signal to the engine control module (ECM). The battery management system (BMS) verifies the received EV/HEV/eco/Sport mode signal, and performs an energy management strategy. The engine control module (ECM) performs a control on an engine system, and sends an engine torque signal to the transmission control unit (TCU). The transmission control unit (TCU) receives the EV/HEV/eco/Sport mode signal, performs gear shift according to a gear shift strategy of the transmission, and performs a control on the synchronizer. The combination instrument is configured to display a current energy state.

In some embodiments, the operation modes of the vehicle may include an EV (electric vehicle) mode and a HEV (hybrid electric vehicle) mode. For example, the EV mode is the above pure EV operating conditions of the power transmission system of the vehicle. The HEV mode is a hybrid mode, where for example the engine unit and the motor generator supply energy simultaneously. The EV mode and the HEV mode include at least one of a series operation mode, a parallel operation mode, a series-parallel operation mode, a front-wheel drive operation mode, a rear-wheel drive operation mode, and a four-wheel drive operation mode. The HEV mode includes a series operation mode, a parallel operation mode, and a series-parallel operation mode. The operation modes of the vehicle may also include a front-wheel drive operation mode, a rear-wheel drive operation mode, and a four-wheel drive operation mode. For example, the EV mode includes an EV-eco (electric-vehicle-economic efficiency) mode and an EV-s (electric-vehicle-sport) mode, and the HEV mode includes a HEV-eco (hybrid-electric-vehicle-economic efficiency) mode and a HEV-s (hybrid-electric-vehicle-sport) mode. Specifically, according to the intentions of a driver, operating conditions of individual systems of the vehicle and road conditions, it is possible to automatically select one operation mode among the series operation mode, the parallel operation mode, and the series-parallel operation mode; to automatically select one operation mode among the front-wheel drive operation mode, the rear-wheel drive operation mode, and the four-wheel drive operation mode; and to manually switch between the EV-eco mode, the EV-s mode, the HEV-eco mode, and the HEV-s mode.

In some embodiments, the operation parameter of the vehicle includes at least one of an electric quantity of the power battery, a speed of the vehicle, a maximum discharge power of the power battery, a slope of a road where the vehicle runs on, a required torque of the vehicle, and a required power of the vehicle.

The drive control process of the controller of the vehicle based on the operation parameter and the operation mode selected from operation modes of the vehicle will be described in detail below.

In some embodiments, the controller is further configured to: when an instruction of switching from the EV mode to the HEV mode is received, control the vehicle to switch to the HEV mode; when the instruction of switching from the EV mode to the HEV mode is not received, if the electric quantity of the power battery is less than or equal to a first electric quantity threshold, or the maximum discharge power of the power battery is less than or equal to a first discharge power threshold, or the slope of the road where the vehicle runs on is greater than or equal to a first slope threshold, control the vehicle to switch to the HEV mode, otherwise, control the vehicle to be kept in the EV mode.

In some embodiments, the controller is further configured to: when an instruction of switching from the HEV mode to the EV mode is received, if the electric quantity of the power battery is greater than a second electric quantity threshold, and the maximum discharge power of the power battery is greater than a second discharge power threshold, and the slope of the road where the vehicle runs on is less than a second slope threshold, and the speed of the vehicle is less than a first speed threshold, control the vehicle to switch to the EV mode, otherwise, control the vehicle to be kept in the HEV mode.

The EV mode and the HEV mode of the vehicle will be described in detail below.

In some embodiments, the controller performs the drive control of the vehicle based on the operation parameter and the selected operation mode of the vehicle by: when the selected operation mode is the EV mode, determining whether the speed of the vehicle is greater than a second speed threshold; if the speed of the vehicle is less than or equal to the second speed threshold, determining whether the required torque of the vehicle is less than or equal to a first torque threshold; if the required torque of the vehicle is less than or equal to the first torque threshold, controlling the synchronizer to disengage and operating the second motor generator with the required torque; if the required torque of the vehicle is greater than the first torque threshold, determining whether the required torque of the vehicle is greater than a sum of the first torque threshold and a second torque threshold; if the required torque of the vehicle is less than or equal to the sum of the first torque threshold and the second torque threshold, controlling the synchronizer to engage, operating the second motor generator with the first torque threshold, and operating the first motor generator with a difference between the required torque and the first torque threshold; if the required torque of the vehicle is greater than the sum of the first torque threshold and the second torque threshold, controlling the synchronizer to engage, calculating a first operation torque of the second motor generator according to the required torque, the first torque threshold and the second torque threshold, operating the second motor generator with the first operation torque, and operating the first motor generator with a difference between the required torque and the first operation torque.

In some embodiments, the controller performs the drive control of the vehicle based on the operation parameter and the selected operation mode of the vehicle by: if the speed of the vehicle is greater than the second speed threshold, determining whether the required torque of the vehicle is less than or equal to the first torque threshold; if the required torque of the vehicle is less than or equal to the first torque threshold, controlling the synchronizer to engage and operating the second motor generator with the required torque; if the required torque of the vehicle is greater than the first torque threshold, determining whether the required torque of the vehicle is greater than the sum of the first torque threshold and the second torque threshold; if the required torque of the vehicle is less than or equal to the sum of the first torque threshold and the second torque threshold, controlling the synchronizer to engage, operating the second motor generator with the first torque threshold, and operating the first motor generator with a difference between the required torque and the first torque threshold; if the required torque of the vehicle is greater than the sum of the first torque threshold and the second torque threshold, controlling the synchronizer to engage, calculating the first operation torque of the second motor generator according to the required torque, the first torque threshold and the second torque threshold, operating the second motor generator with the first operation torque, and operating the first motor generator with the difference between the required torque and the first operation torque.

In some embodiments, the controller performs the drive control of the vehicle based on the operation parameter and the selected operation mode of the vehicle by: when the selected operation mode is the HEV mode, controlling the vehicle to switch to a HEV-eco low-electric-quantity mode, a HEV-eco medium-electric-quantity mode, or a HEV-eco high-electric-quantity mode.

In some embodiments, the controller performs the drive control of the vehicle based on the operation parameter and the selected operation mode of the vehicle by: after entering the HEV-eco high-electric-quantity mode, if the speed of the vehicle is greater than a third speed threshold, or the maximum discharge power of the power battery is less than or equal to a third discharge power threshold, or the slope of the road where the vehicle runs on is greater than a third slope threshold, controlling the vehicle to switch to a HEV-eco high-speed high-electric-quantity mode; determining whether the required torque of the vehicle is less than or equal to a third torque threshold; if the required torque of the vehicle is less than or equal to the third torque threshold, controlling the synchronizer to engage, operating the second motor generator with the required torque, and controlling the first motor generator and the engine unit to stop; if the required torque of the vehicle is greater than the third torque threshold, determining whether the required torque of the vehicle is less than or equal to a sum of the third torque threshold and a fourth torque threshold; if the required torque of the vehicle is less than or equal to the sum of the third torque threshold and the fourth torque threshold, controlling the synchronizer to engage, operating the second motor generator with the third torque threshold, operating the engine unit with a difference between the required torque and the third torque threshold, and controlling the first motor generator to stop; if the required torque of the vehicle is greater than the sum of the third torque threshold and the fourth torque threshold, determining whether the required torque of the vehicle is less than or equal to a sum of the third torque threshold, the fourth torque threshold and a fifth torque threshold; if the required torque of the vehicle is less than or equal to the sum of the third torque threshold, the fourth torque threshold and the fifth torque threshold, controlling the synchronizer to engage, operating the second motor generator with the third torque threshold, operating the engine unit with the fourth torque threshold, and operating the first motor generator with a difference between the required torque and the sum of the third torque threshold and the fourth torque threshold; if the required torque of the vehicle is greater than the sum of the third torque threshold, the fourth torque threshold and the fifth torque threshold, controlling the synchronizer to engage, calculating a second operation torque of the second motor generator according to the third torque threshold, the fourth torque threshold and the fifth torque threshold, operating the second motor generator with the second operation torque, operating the engine unit with the fourth torque threshold, and operating the first motor generator with a difference between the required torque and a sum of the second operation torque and the fourth torque threshold.

In some embodiments, the controller performs the drive control of the vehicle based on the operation parameter and the selected operation mode of the vehicle by: after entering the HEV-eco medium-electric-quantity mode, if the speed of the vehicle is greater than a third speed threshold, or the maximum discharge power of the power battery is less than or equal to a third discharge power threshold, or the slope of the road where the vehicle runs on is greater than a third slope threshold, controlling the vehicle to switch to a HEV-eco high-speed medium-electric-quantity mode; determining whether the required torque of the vehicle is less than or equal to a fourth torque threshold; if the required torque of the vehicle is less than or equal to the fourth torque threshold, controlling the synchronizer to engage, connecting the engine unit and the first motor generator in parallel to generate electricity, and controlling the second motor generator to stop; if the required torque of the vehicle is greater than the fourth torque threshold, determining whether the required torque of the vehicle is less than or equal to a sum of the first torque threshold and the fourth torque threshold; if the required torque of the vehicle is less than or equal to the sum of the first torque threshold and the fourth torque threshold, controlling the synchronizer to engage, operating the engine unit with the fourth torque threshold, operating the second motor generator with a difference between the required torque and the fourth torque threshold, and controlling the first motor generator to stop; if the required torque of the vehicle is greater than the sum of the first torque threshold and the fourth torque threshold, determining whether the required torque of the vehicle is less than or equal to a sum of the first torque threshold, the second torque threshold and the fourth torque threshold; if the required torque of the vehicle is less than or equal to the sum of the first torque threshold, the second torque threshold and the fourth torque threshold, controlling the synchronizer to engage, operating the engine unit with the fourth torque threshold, operating the second motor generator with the first torque threshold, and operating the first motor generator with a difference between the required torque and the sum of the first torque threshold and the fourth torque threshold; if the required torque of the vehicle is greater than the sum of the first torque threshold, the second torque threshold and the fourth torque threshold, controlling the synchronizer to engage, calculating a third operation torque of the second motor generator according to the first torque threshold, the second torque threshold and the fourth torque threshold, operating the second motor generator with the third operation torque, operating the engine unit with the fourth torque threshold, and operating the first motor generator with a difference between the required torque and a sum of the third operation torque and the fourth torque threshold.

In some embodiments, the controller performs the drive control of the vehicle based on the operation parameter and the selected operation mode of the vehicle by: after entering the HEV-eco low-electric-quantity mode, determining whether the speed of the vehicle is less than or equal to a fourth speed threshold; if the speed of the vehicle is less than or equal to the fourth speed threshold, determining whether the required power of the vehicle is less than or equal to a first power threshold; if the required power of the vehicle is less than or equal to the first power threshold, controlling the synchronizer to disengage, operating the second motor generator with the required power, and controlling the engine unit to drive the first motor generator with the first power threshold to generate electricity; if the required power of the vehicle is greater than the first power threshold, determining whether the required power of the vehicle is less than or equal to a second power threshold; if the required power of the vehicle is less than or equal to the second power threshold, controlling the synchronizer to engage, operating the engine unit with the required power, and controlling the first and second motor generators to stop; if the required power of the vehicle is greater than the second power threshold, determining whether the required power of the vehicle is less than or equal to a sum of the second power threshold and a third power threshold; if the required power of the vehicle is less than or equal to the sum of the second power threshold and the third power threshold, controlling the synchronizer to engage, operating the engine unit with the second power threshold, operating the second motor generator with a difference between the required power and the second power threshold, and controlling the first motor generator to stop; if the required power of the vehicle is greater than the sum of the second power threshold and the third power threshold, determining whether the required power of the vehicle is less than or equal to a sum of the second power threshold, the third power threshold and a fourth power threshold; if the required power of the vehicle is less than or equal to the sum of the second power threshold, the third power threshold and the fourth power threshold, controlling the synchronizer to engage, operating the engine unit with the second power threshold, operating the second motor generator with the third power threshold, and operating the first motor generator with a difference between the required power and the sum of the second power threshold and the third power threshold; if the required power of the vehicle is greater than the sum of the second power threshold, the third power threshold and the fourth power threshold, controlling the synchronizer to engage, calculating an operation power of the second motor generator according to the required power, the second power threshold, the third power threshold and the fourth power threshold, operating the second motor generator with the operation power, operating the engine unit with the second power threshold, and operating the first motor generator with a difference between the required power and a sum of the second power threshold and the operation power.

In some embodiments, the controller performs the drive control of the vehicle based on the operation parameter and the selected operation mode of the vehicle by: if the speed of the vehicle is greater than the fourth speed threshold, determining whether the required torque of the vehicle is less than or equal to a fourth torque threshold; if the required torque of the vehicle is less than or equal to the fourth torque threshold, controlling the synchronizer to engage, operating the engine unit with a predetermined torque, driving the first motor generator with a part of the torque of the engine unit to generate electricity, and controlling the second motor generator to stop; if the required torque of the vehicle is greater than the fourth torque threshold, determining whether the required torque of the vehicle is less than or equal to a sum of the first torque threshold and the fourth torque threshold; if the required torque of the vehicle is less than or equal to the sum of the first torque threshold and the fourth torque threshold, controlling the synchronizer to engage, operating the engine unit with the fourth torque threshold, operating the second motor generator with a difference between the required torque and the fourth torque threshold, and controlling the first motor generator to stop; if the required torque of the vehicle is greater than the sum of the first torque threshold and the fourth torque threshold, determining whether the required torque of the vehicle is less than or equal to a sum of the first torque threshold, the second torque threshold and the fourth torque threshold; if the required torque of the vehicle is less than or equal to the sum of the first torque threshold, the second torque threshold and the fourth torque threshold, controlling the synchronizer to engage, operating the engine unit with the fourth torque threshold, operating the second motor generator with the first torque threshold, and operating the first motor generator with a difference between the required torque and the sum of the first torque threshold and the fourth torque threshold; if the required torque of the vehicle is greater than the sum of the first torque threshold, the second torque threshold and the fourth torque threshold, controlling the synchronizer to engage, calculating a fourth operation torque of the second motor generator according to the required torque, the first torque threshold, the second torque threshold and the fourth torque threshold, operating the second motor generator with the fourth operation torque, operating the engine unit with the fourth torque threshold, and operating the first motor generator with a difference between the required torque and a sum of the fourth operation torque and the fourth torque threshold.

With the vehicle according to embodiments of the present disclosure, the power output by at least one of the engine unit and the first motor generator may be output to the output unit via the power switching device, and then output by the output unit to at least one of the front and rear wheels of the vehicle, and then the drive control of the vehicle is performed based on the operation parameter and the operation mode selected from operation modes of the vehicle. Meanwhile, by the provision of the second motor generator, the second motor generator may compensate for the torque of the front wheels or the rear wheels, and may also cooperate with the engine unit and the first motor generator to drive the vehicle, thus increasing the types of the operation modes of the vehicle. Therefore, the vehicle may adapt to different operating conditions, thus achieving better fuel economic efficiency, and in the premise of ensuring the dynamic property of the vehicle, enhancing the economic efficiency, ride and steering capability of the vehicle while reducing the emissions of harmful gases.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A drive control method for a vehicle, the vehicle comprising an engine unit, a transmission unit configured to be selectively coupled with the engine unit, a first motor generator coupled with the transmission unit, an output unit configured to transmit power transmitted by the transmission unit to at least one of front and rear wheels of the vehicle, a power switching device configured to enable or interrupt power transmission between the transmission unit and the output unit, a second motor generator configured to drive the at least one of the front and rear wheels, and a power battery coupled with the first and second motor generators respectively, the drive control method comprising:

acquiring an operation parameter of the vehicle;

performing a drive control of the vehicle based on the operation parameter and an operation mode selected from operation modes of the vehicle, wherein the operation modes comprise an electrical vehicle (EV) mode and a hybrid electrical vehicle (HEV) mode, and the HEV mode comprises at least one of a series operation mode, a parallel operation mode, or a series-parallel operation mode, and each of the EV mode and the HEV mode comprises at least one of a front-wheel drive operation mode, a rear-wheel drive operation mode, or a four-wheel drive operation mode;

and wherein the operation parameter of the vehicle comprises at least one of an electric quantity of the power battery, a speed of the vehicle, a maximum discharge power of the power battery, a slope of a road where the vehicle runs on, a required torque of the vehicle, or a required power of the vehicle;

when receiving an instruction of switching from an EV mode to a HEV mode, controlling the vehicle to switch to the HEV mode;

when not receiving the instruction of switching from an EV mode to a HEV mode, if the electric quantity of the power battery is less than or equal to a first electric quantity threshold, or the maximum discharge power of the power battery is less than or equal to a first discharge power threshold, or the slope of the road where the vehicle runs on is greater than or equal to a first slope threshold, controlling the vehicle to switch to a HEV mode, otherwise, controlling the vehicle to be kept in an EV mode; and when receiving an instruction of switching from a HEV mode to an EV mode, if the electric quantity of the power battery is greater than a second electric quantity threshold, and the maximum discharge power of the power battery is greater than a second discharge power threshold, and the slope of the road where the vehicle runs on is less than a second slope threshold, and the speed of the vehicle is less than a first speed threshold, controlling the vehicle to switch to an EV mode, otherwise, controlling the vehicle to be kept in a HEV mode.

2. The method according to claim 1, wherein the power switching device is configured as a synchronizer configured to selectively synchronize the output unit and the transmission unit.

3. A drive control method for a vehicle, comprising:

acquiring an operation parameter of the vehicle, the vehicle comprising an engine unit, a transmission unit configured to be selectively coupled with the engine unit, a first motor generator coupled with the transmission unit, an output unit configured to transmit power transmitted by the transmission unit to at least one of front and rear wheels of the vehicle, a power switching device configured to enable or interrupt power transmission between the transmission unit and the output unit, a second motor generator configured to drive the at least one of the front and rear wheels, and a power battery coupled with the first and second motor generators respectively;

performing a drive control of the vehicle based on the operation parameter and an operation mode selected from operation modes of the vehicle, wherein the operation modes comprise an electrical vehicle (EV) mode and a hybrid electrical vehicle (HEV) mode, and the HEV mode comprises at least one of a series operation mode, a parallel operation mode, or a series-parallel operation mode, and each of the EV mode and the HEV mode comprises at least one of a front-wheel drive operation mode, a rear-wheel drive operation mode, or a four-wheel drive operation mode; and wherein the operation parameter of the vehicle comprises at least one of an electric quantity of the power battery, a speed of the vehicle, a maximum discharge power of the power battery, a slope of a road where the vehicle runs on, a required torque of the vehicle, or a required power of the vehicle;

wherein performing the drive control of the vehicle based on the operation parameter and the selected operation mode of the vehicle comprises:

when the selected operation mode is an EV mode, determining whether the speed of the vehicle is greater than a second speed threshold;

if the speed of the vehicle is less than or equal to the second speed threshold, determining whether the required torque of the vehicle is less than or equal to a first torque threshold;

if the required torque of the vehicle is less than or equal to the first torque threshold, controlling the synchronizer to disengage and operating the second motor generator with the required torque;

if the required torque of the vehicle is greater than the first torque threshold, determining whether the required torque of the vehicle is greater than a sum of the first torque threshold and a second torque threshold;

if the required torque of the vehicle is less than or equal to the sum of the first torque threshold and the second torque threshold, controlling the synchronizer to engage, operating the second motor generator with the first torque threshold, and operating the first motor generator with a difference between the required torque and the first torque threshold;

if the required torque of the vehicle is greater than the sum of the first torque threshold and the second torque threshold, controlling the synchronizer to engage, calculating a first operation torque of the second motor generator according to the required torque, the first torque threshold and the second torque threshold, operating the second motor generator with the first operation torque, and operating the first motor generator with a difference between the required torque and the first operation torque;

if the speed of the vehicle is greater than the second speed threshold, determining whether the required torque of the vehicle is less than or equal to the first torque threshold;

if the required torque of the vehicle is less than or equal to the first torque threshold, controlling the synchronizer to engage and operating the second motor generator with the required torque;

if the required torque of the vehicle is greater than the first torque threshold, determining whether the required torque of the vehicle is greater than the sum of the first torque threshold and the second torque threshold;

if the required torque of the vehicle is less than or equal to the sum of the first torque threshold and the second torque threshold, controlling the synchronizer to engage, operating the second motor generator with the first torque threshold, and operating the first motor generator with a difference between the required torque and the first torque threshold;

if the required torque of the vehicle is greater than the sum of the first torque threshold and the second torque threshold, controlling the synchronizer to engage, calculating the first operation torque of the second motor generator according to the required torque, the first torque threshold and the second torque threshold, operating the second motor generator with the first operation torque, and operating the first motor generator with the difference between the required torque and the first operation torque.

4. The method according to claim 3, wherein performing the drive control of the vehicle based on the operation parameter and the selected operation mode of the vehicle further comprises:

when the selected operation mode is the HEV mode, controlling the vehicle to switch to a HEV-eco low-electric-quantity mode, a HEV-eco medium-electric-quantity mode, or a HEV-eco high-electric-quantity mode based on an electric quantity of the power battery.

5. The method according to claim 4, wherein performing the drive control of the vehicle based on the operation parameter and the selected operation mode of the vehicle further comprises:

after entering the HEV-eco high-electric-quantity mode, if the speed of the vehicle is greater than a third speed threshold, or the maximum discharge power of the power battery is less than or equal to a third discharge power threshold, or the slope of the road where the vehicle runs on is greater than a third slope threshold, controlling the vehicle to switch to a HEV-eco high-speed high-electric-quantity mode;

determining whether the required torque of the vehicle is less than or equal to a third torque threshold;

if the required torque of the vehicle is less than or equal to the third torque threshold, controlling the synchronizer to engage, operating the second motor generator with the required torque, and controlling the first motor generator and the engine unit to stop;

if the required torque of the vehicle is greater than the third torque threshold, determining whether the required torque of the vehicle is less than or equal to a sum of the third torque threshold and a fourth torque threshold;

if the required torque of the vehicle is less than or equal to the sum of the third torque threshold and the fourth torque threshold, controlling the synchronizer to engage, operating the second motor generator with the third torque threshold, operating the engine unit with a difference between the required torque and the third torque threshold, and controlling the first motor generator to stop;

if the required torque of the vehicle is greater than the sum of the third torque threshold and the fourth torque threshold, determining whether the required torque of the vehicle is less than or equal to a sum of the third torque threshold, the fourth torque threshold and a fifth torque threshold;

if the required torque of the vehicle is less than or equal to the sum of the third torque threshold, the fourth torque threshold and the fifth torque threshold, controlling the synchronizer to engage, operating the second motor generator with the third torque threshold, operating the engine unit with the fourth torque threshold, and operating the first motor generator with a difference between the required torque and the sum of the third torque threshold and the fourth torque threshold;

if the required torque of the vehicle is greater than the sum of the third torque threshold, the fourth torque threshold and the fifth torque threshold, controlling the synchronizer to engage, calculating a second operation torque of the second motor generator based on the third torque threshold, the fourth torque threshold and the fifth torque threshold, operating the second motor generator with the second operation torque, operating the engine unit with the fourth torque threshold, and operating the first motor generator with a difference between the required torque and a sum of the second operation torque and the fourth torque threshold.

6. The method according to claim 4, wherein performing the drive control of the vehicle based on the operation parameter and the selected operation mode of the vehicle further comprises:

after entering the HEV-eco medium-electric-quantity mode, if the speed of the vehicle is greater than a third speed threshold, or the maximum discharge power of the power battery is less than or equal to a third discharge power threshold, or the slope of the road where the vehicle runs on is greater than a third slope threshold, controlling the vehicle to switch to a HEV-eco high-speed medium-electric-quantity mode;

determining whether the required torque of the vehicle is less than or equal to a fourth torque threshold;

if the required torque of the vehicle is less than or equal to the fourth torque threshold, controlling the synchronizer to engage, controlling the engine unit and the first motor generator to generate electricity in parallel, and controlling the second motor generator to stop;

if the required torque of the vehicle is greater than the fourth torque threshold, determining whether the required torque of the vehicle is less than or equal to a sum of the first torque threshold and the fourth torque threshold;

if the required torque of the vehicle is less than or equal to the sum of the first torque threshold and the fourth torque threshold, controlling the synchronizer to engage, operating the engine unit with the fourth torque threshold, operating the second motor generator with a difference between the required torque and the fourth torque threshold, and controlling the first motor generator to stop;

if the required torque of the vehicle is greater than the sum of the first torque threshold and the fourth torque threshold, determining whether the required torque of the vehicle is less than or equal to a sum of the first torque threshold, the second torque threshold and the fourth torque threshold;

if the required torque of the vehicle is less than or equal to the sum of the first torque threshold, the second torque threshold and the fourth torque threshold, controlling the synchronizer to engage, operating the engine unit with the fourth torque threshold, operating the second motor generator with the first torque threshold, and operating the first motor generator with a difference between the required torque and the sum of the first torque threshold and the fourth torque threshold;

if the required torque of the vehicle is greater than the sum of the first torque threshold, the second torque threshold and the fourth torque threshold, controlling the synchronizer to engage, calculating a third operation torque of the second motor generator according to the first torque threshold, the second torque threshold and the fourth torque threshold, operating the second motor generator with the third operation torque, operating the engine unit with the fourth torque threshold, and operating the first motor generator with a difference between the required torque and a sum of the third operation torque and the fourth torque threshold.

7. The method according to claim 4, wherein performing the drive control of the vehicle based on the operation parameter and the selected operation mode of the vehicle further comprises:

after entering the HEV-eco low-electric-quantity mode, determining whether the speed of the vehicle is less than or equal to a fourth speed threshold;

if the speed of the vehicle is less than or equal to the fourth speed threshold, determining whether the required power of the vehicle is less than or equal to a first power threshold;

if the required power of the vehicle is less than or equal to the first power threshold, controlling the synchronizer to disengage, operating the second motor generator with the required power, and controlling the engine unit to drive the first motor generator with the first power threshold to generate electricity;

if the required power of the vehicle is greater than the first power threshold, determining whether the required power of the vehicle is less than or equal to a second power threshold;

if the required power of the vehicle is less than or equal to the second power threshold, controlling the synchronizer to engage, operating the engine unit with the required power, and controlling the first and second motor generators to stop;

if the required power of the vehicle is greater than the second power threshold, determining whether the required power of the vehicle is less than or equal to a sum of the second power threshold and a third power threshold;

if the required power of the vehicle is less than or equal to the sum of the second power threshold and the third power threshold, controlling the synchronizer to engage, operating the engine unit with the second power threshold, operating the second motor generator with a difference between the required power and the second power threshold, and controlling the first motor generator to stop;

if the required power of the vehicle is greater than the sum of the second power threshold and the third power threshold, determining whether the required power of the vehicle is less than or equal to a sum of the second power threshold, the third power threshold and a fourth power threshold;

if the required power of the vehicle is less than or equal to the sum of the second power threshold, the third power threshold and the fourth power threshold, controlling the synchronizer to engage, operating the engine unit with the second power threshold, operating the second motor generator with the third power threshold, and operating the first motor generator with a difference between the required power and the sum of the second power threshold and the third power threshold;

if the required power of the vehicle is greater than the sum of the second power threshold, the third power threshold and the fourth power threshold, controlling the synchronizer to engage, calculating an operation power of the second motor generator based on the required power, the second power threshold, the third power threshold and the fourth power threshold, operating the second motor generator with the operation power, operating the engine unit with the second power threshold, and operating the first motor generator with a difference between the required power and a sum of the second power threshold and the operation power.

8. The method according to claim 7, wherein performing the drive control of the vehicle based on the operation parameter and the selected operation mode of the vehicle further comprises:

if the speed of the vehicle is greater than the fourth speed threshold, determining whether the required torque of the vehicle is less than or equal to a fourth torque threshold;

if the required torque of the vehicle is less than or equal to the fourth torque threshold, controlling the synchronizer to engage, operating the engine unit with a predetermined torque, driving the first motor generator with a part of the torque of the engine unit to generate electricity, and controlling the second motor generator to stop;

if the required torque of the vehicle is greater than the fourth torque threshold, determining whether the required torque of the vehicle is less than or equal to a sum of the first torque threshold and the fourth torque threshold;

if the required torque of the vehicle is less than or equal to the sum of the first torque threshold and the fourth torque threshold, controlling the synchronizer to engage, operating the engine unit with the fourth torque threshold, operating the second motor generator with a difference between the required torque and the fourth torque threshold, and controlling the first motor generator to stop;

if the required torque of the vehicle is greater than the sum of the first torque threshold and the fourth torque threshold, determining whether the required torque of the vehicle is less than or equal to a sum of the first torque threshold, the second torque threshold and the fourth torque threshold;

if the required torque of the vehicle is less than or equal to the sum of the first torque threshold, the second torque threshold and the fourth torque threshold, controlling the synchronizer to engage, operating the engine unit with the fourth torque threshold, operating the second motor generator with the first torque threshold, and operating the first motor generator with a difference between the required torque and the sum of the first torque threshold and the fourth torque threshold;

if the required torque of the vehicle is greater than the sum of the first torque threshold, the second torque threshold and the fourth torque threshold, controlling the synchronizer to engage, calculating a fourth operation torque of the second motor generator according to the required torque, the first torque threshold, the second torque threshold and the fourth torque threshold, operating the second motor generator with the fourth operation torque, operating the engine unit with the fourth torque threshold, and operating the first motor generator with a difference between the required torque and a sum of the fourth operation torque and the fourth torque threshold.

9. A vehicle, comprising:
an engine unit;
a plurality of wheels;
a transmission unit configured to be selectively coupled with the engine unit;
a first motor generator coupled with the transmission unit;
an output unit configured to transmit a power transmitted by the transmission unit to at least one of front and rear wheels of the vehicle;
a power switching device configured to adjust a power transmission between the transmission unit and the output unit;
a second motor generator configured to drive the at least one of the wheels of the vehicle;
a power battery coupled with the first and second motor generators respectively; and
a controller configured to acquire an operation parameter and an operation mode from operation modes of the vehicle, and to perform a drive control of the vehicle based on the operation parameter and the operation mode of the vehicle;
wherein the operation modes of the vehicle comprise an electrical vehicle (EV) mode and a hybrid electrical vehicle (HEV) mode, and the HEV mode comprises at least one of a series operation mode, a parallel operation mode, or a series-parallel operation mode, and each of the EV mode and the HEV mode comprises at least one of a front-wheel drive operation mode, a rear-wheel drive operation mode, or a four-wheel drive operation mode; and wherein the operation parameter of the vehicle comprises at least one of an electric quantity of the power battery, a speed of the vehicle, a maximum discharge power of the power battery, a slope of a road where the vehicle runs on, a required torque of the vehicle, or a required power of the vehicle;
wherein the controller is further configured to:
when receiving an instruction of switching from an EV mode to a HEV mode, controll the vehicle to switch to the HEV mode;
when not receiving the instruction of switching from an EV mode to a HEV mode, if the electric quantity of the power battery is less than or equal to a first electric quantity threshold, or the maximum discharge power of the power battery is less than or equal to a first discharge power threshold, or the slope of the road where the vehicle runs on is greater than or equal to a first slope threshold, controll the vehicle to switch to a HEV mode, otherwise, controll the vehicle to be kept in an EV mode;
when receiving an instruction of switching from a HEV mode to an EV mode, if the electric quantity of the power battery is greater than a second electric quantity threshold, and the maximum discharge power of the power battery is greater than a second discharge power threshold, and the slope of the road where the vehicle runs on is less than a second slope threshold, and the speed of the vehicle is less than a first speed threshold, controll the vehicle to switch to an EV mode, otherwise, controll the vehicle to be kept in a HEV mode.

10. The vehicle according to claim 9, wherein the power switching device is configured as a synchronizer configured to selectively synchronize the output unit and the transmission unit.

11. A vehicle, comprising:
an engine unit;
a plurality of wheels;
a transmission unit configured to be selectively coupled with the engine unit;
a first motor generator coupled with the transmission unit;
an output unit configured to transmit a power transmitted by the transmission unit to at least one of front and rear wheels of the vehicle;
a power switching device configured to adjust a power transmission between the transmission unit and the output unit;
a second motor generator configured to drive the at least one of the wheels of the vehicle;
a power battery coupled with the first and second motor generators respectively; and
a controller configured to acquire an operation parameter and an operation mode selected from operation modes of the vehicle, and to perform a drive control of the vehicle based on the operation parameter and the operation mode of the vehicle;
wherein the operation modes of the vehicle comprise an electrical vehicle (EV) mode and a hybrid electrical vehicle (HEV) mode, and the HEV mode comprises at least one of a series operation mode, a parallel operation mode, or a series-parallel operation mode, and each of the EV mode and the HEV mode comprises at least one of a front-wheel drive operation mode, a rear-wheel drive operation mode, or a four-wheel drive operation mode; and wherein the operation parameter of the vehicle comprises at least one of an electric quantity of the power battery, a speed of the vehicle, a maximum discharge power of the power battery, a slope of a road where the vehicle runs on, a required torque of the vehicle, or a required power of the vehicle;
wherein the controller performs the drive control of the vehicle based on the operation parameter and the selected operation mode of the vehicle by:
when the selected operation mode is an EV mode, determining whether the speed of the vehicle is greater than a second speed threshold;
if the speed of the vehicle is less than or equal to the second speed threshold, determining whether the required torque of the vehicle is less than or equal to a first torque threshold;
if the required torque of the vehicle is less than or equal to the first torque threshold, controlling the synchronizer to disengage and operating the second motor generator with the required torque;
if the required torque of the vehicle is greater than the first torque threshold, determining whether the required torque of the vehicle is greater than a sum of the first torque threshold and a second torque threshold;
if the required torque of the vehicle is less than or equal to the sum of the first torque threshold and the second torque threshold, controlling the synchronizer to engage, operating the second motor generator with the first torque threshold, and operating the first motor generator with a difference between the required torque and the first torque threshold;

if the required torque of the vehicle is greater than the sum of the first torque threshold and the second torque threshold, controlling the synchronizer to engage, calculating a first operation torque of the second motor generator according to the required torque, the first torque threshold and the second torque threshold, operating the second motor generator with the first operation torque, and operating the first motor generator with a difference between the required torque and the first operation torque;

if the speed of the vehicle is greater than the second speed threshold, determining whether the required torque of the vehicle is less than or equal to the first torque threshold;

if the required torque of the vehicle is less than or equal to the first torque threshold, controlling the synchronizer to engage and operating the second motor generator with the required torque;

if the required torque of the vehicle is greater than the first torque threshold, determining whether the required torque of the vehicle is greater than the sum of the first torque threshold and the second torque threshold;

if the required torque of the vehicle is less than or equal to the sum of the first torque threshold and the second torque threshold, controlling the synchronizer to engage, operating the second motor generator with the first torque threshold, and operating the first motor generator with a difference between the required torque and the first torque threshold;

if the required torque of the vehicle is greater than the sum of the first torque threshold and the second torque threshold, controlling the synchronizer to engage, calculating the first operation torque of the second motor generator according to the required torque, the first torque threshold and the second torque threshold, operating the second motor generator with the first operation torque, and operating the first motor generator with the difference between the required torque and the first operation torque.

12. The vehicle according to claim 11, wherein the controller performs the drive control of the vehicle based on the operation parameter and the selected operation mode of the vehicle by:

when the selected operation mode is the HEV mode, controlling the vehicle to switch to a HEV-eco low-electric-quantity mode, a HEV-eco medium-electric-quantity mode, or a HEV-eco high-electric-quantity mode based on the electric quantity of the power battery.

13. The vehicle according to claim 12, wherein the controller performs the drive control of the vehicle based on the operation parameter and the selected operation mode of the vehicle by:

after entering the HEV-eco high-electric-quantity mode, if the speed of the vehicle is greater than a third speed threshold, or the maximum discharge power of the power battery is less than or equal to a third discharge power threshold, or the slope of the road where the vehicle runs on is greater than a third slope threshold, controlling the vehicle to switch to a HEV-eco high-speed high-electric-quantity mode;

determining whether the required torque of the vehicle is less than or equal to a third torque threshold;

if the required torque of the vehicle is less than or equal to the third torque threshold, controlling the synchronizer to engage, operating the second motor generator with the required torque, and controlling the first motor generator and the engine unit to stop;

if the required torque of the vehicle is greater than the third torque threshold, determining whether the required torque of the vehicle is less than or equal to a sum of the third torque threshold and a fourth torque threshold;

if the required torque of the vehicle is less than or equal to the sum of the third torque threshold and the fourth torque threshold, controlling the synchronizer to engage, operating the second motor generator with the third torque threshold, operating the engine unit with a difference between the required torque and the third torque threshold, and controlling the first motor generator to stop;

if the required torque of the vehicle is greater than the sum of the third torque threshold and the fourth torque threshold, determining whether the required torque of the vehicle is less than or equal to a sum of the third torque threshold, the fourth torque threshold and a fifth torque threshold;

if the required torque of the vehicle is less than or equal to the sum of the third torque threshold, the fourth torque threshold and the fifth torque threshold, controlling the synchronizer to engage, operating the second motor generator with the third torque threshold, operating the engine unit with the fourth torque threshold, and operating the first motor generator with a difference between the required torque and the sum of the third torque threshold and the fourth torque threshold;

if the required torque of the vehicle is greater than the sum of the third torque threshold, the fourth torque threshold and the fifth torque threshold, controlling the synchronizer to engage, calculating a second operation torque of the second motor generator according to the third torque threshold, the fourth torque threshold and the fifth torque threshold, operating the second motor generator with the second operation torque, operating the engine unit with the fourth torque threshold, and operating the first motor generator with a difference between the required torque and a sum of the second operation torque and the fourth torque threshold.

14. The vehicle according to claim 12, wherein the controller performs the drive control of the vehicle based on the operation parameter and the selected operation mode of the vehicle by:

after entering the HEV-eco medium-electric-quantity mode, if the speed of the vehicle is greater than a third speed threshold, or the maximum discharge power of the power battery is less than or equal to a third discharge power threshold, or the slope of the road where the vehicle runs on is greater than a third slope threshold, controlling the vehicle to switch to a HEV-eco high-speed medium-electric-quantity mode;

determining whether the required torque of the vehicle is less than or equal to a fourth torque threshold;

if the required torque of the vehicle is less than or equal to the fourth torque threshold, controlling the synchronizer to engage, connecting the engine unit and the first motor generator in parallel to generate electricity, and controlling the second motor generator to stop;

if the required torque of the vehicle is greater than the fourth torque threshold, determining whether the required torque of the vehicle is less than or equal to a sum of the first torque threshold and the fourth torque threshold;

if the required torque of the vehicle is less than or equal to the sum of the first torque threshold and the fourth torque threshold, controlling the synchronizer to engage, operating the engine unit with the fourth torque threshold, operating the second motor generator with a difference between the required torque and the fourth torque threshold, and controlling the first motor generator to stop;

if the required torque of the vehicle is greater than the sum of the first torque threshold and the fourth torque threshold, determining whether the required torque of the vehicle is less than or equal to a sum of the first torque threshold, the second torque threshold and the fourth torque threshold;

if the required torque of the vehicle is less than or equal to the sum of the first torque threshold, the second torque threshold and the fourth torque threshold, controlling the synchronizer to engage, operating the engine unit with the fourth torque threshold, operating the second motor generator with the first torque threshold, and operating the first motor generator with a difference between the required torque and the sum of the first torque threshold and the fourth torque threshold;

if the required torque of the vehicle is greater than the sum of the first torque threshold, the second torque threshold and the fourth torque threshold, controlling the synchronizer to engage, calculating a third operation torque of the second motor generator according to the first torque threshold, the second torque threshold and the fourth torque threshold, operating the second motor generator with the third operation torque, operating the engine unit with the fourth torque threshold, and operating the first motor generator with a difference between the required torque and a sum of the third operation torque and the fourth torque threshold.

15. The vehicle according to claim 12, wherein the controller performs the drive control of the vehicle based on the operation parameter and the selected operation mode of the vehicle by:

after entering the HEV-eco low-electric-quantity mode, determining whether the speed of the vehicle is less than or equal to a fourth speed threshold;

if the speed of the vehicle is less than or equal to the fourth speed threshold, determining whether the required power of the vehicle is less than or equal to a first power threshold;

if the required power of the vehicle is less than or equal to the first power threshold, controlling the synchronizer to disengage, operating the second motor generator with the required power, and controlling the engine unit to drive the first motor generator with the first power threshold to generate electricity;

if the required power of the vehicle is greater than the first power threshold, determining whether the required power of the vehicle is less than or equal to a second power threshold;

if the required power of the vehicle is less than or equal to the second power threshold, controlling the synchronizer to engage, operating the engine unit with the required power, and controlling the first and second motor generators to stop;

if the required power of the vehicle is greater than the second power threshold, determining whether the required power of the vehicle is less than or equal to a sum of the second power threshold and a third power threshold;

if the required power of the vehicle is less than or equal to the sum of the second power threshold and the third power threshold, controlling the synchronizer to engage, operating the engine unit with the second power threshold, operating the second motor generator with a difference between the required power and the second power threshold, and controlling the first motor generator to stop;

if the required power of the vehicle is greater than the sum of the second power threshold and the third power threshold, determining whether the required power of the vehicle is less than or equal to a sum of the second power threshold, the third power threshold and a fourth power threshold;

if the required power of the vehicle is less than or equal to the sum of the second power threshold, the third power threshold and the fourth power threshold, controlling the synchronizer to engage, operating the engine unit with the second power threshold, operating the second motor generator with the third power threshold, and operating the first motor generator with a difference between the required power and the sum of the second power threshold and the third power threshold;

if the required power of the vehicle is greater than the sum of the second power threshold, the third power threshold and the fourth power threshold, controlling the synchronizer to engage, calculating an operation power of the second motor generator according to the required power, the second power threshold, the third power threshold and the fourth power threshold, operating the second motor generator with the operation power, operating the engine unit with the second power threshold, and operating the first motor generator with a difference between the required power and a sum of the second power threshold and the operation power.

16. The vehicle according to claim 12, wherein the controller performs the drive control of the vehicle based on the operation parameter and the selected operation mode of the vehicle by:

if the speed of the vehicle is greater than the fourth speed threshold, determining whether the required torque of the vehicle is less than or equal to a fourth torque threshold;

if the required torque of the vehicle is less than or equal to the fourth torque threshold, controlling the synchronizer to engage, operating the engine unit with a predetermined torque, driving the first motor generator with a part of the torque of the engine unit to generate electricity, and controlling the second motor generator to stop;

if the required torque of the vehicle is greater than the fourth torque threshold, determining whether the required torque of the vehicle is less than or equal to a sum of the first torque threshold and the fourth torque threshold;

if the required torque of the vehicle is less than or equal to the sum of the first torque threshold and the fourth torque threshold, controlling the synchronizer to engage, operating the engine unit with the fourth torque threshold, operating the second motor generator with a difference between the required torque and the fourth torque threshold, and controlling the first motor generator to stop;

if the required torque of the vehicle is greater than the sum of the first torque threshold and the fourth torque threshold, determining whether the required torque of the vehicle is less than or equal to a sum of the first torque threshold, the second torque threshold and the fourth torque threshold;

if the required torque of the vehicle is less than or equal to the sum of the first torque threshold, the second torque threshold and the fourth torque threshold, controlling the synchronizer to engage, operating the engine unit with the fourth torque threshold, operating the second motor generator with the first torque threshold, and operating the first motor generator with a difference between the required torque and the sum of the first torque threshold and the fourth torque threshold;

if the required torque of the vehicle is greater than the sum of the first torque threshold, the second torque threshold and the fourth torque threshold, controlling the synchronizer to engage, calculating a fourth operation torque of the second motor generator according to the required torque, the first torque threshold, the second torque threshold and the fourth torque threshold, operating the second motor generator with the fourth operation torque, operating the engine unit with the fourth torque threshold, and operating the first motor generator with a difference between the required torque and a sum of the fourth operation torque and the fourth torque threshold.

* * * * *